(12) United States Patent
Protheroe et al.

(10) Patent No.: US 8,001,004 B2
(45) Date of Patent: Aug. 16, 2011

(54) SYSTEM AND METHOD FOR BROKERING THE SALE OF INTERNET ADVERTISEMENT INVENTORY

(75) Inventors: Robert Llewellyn Protheroe, Falls Church, VA (US); Sung Hyun Shin, Germantown, MD (US); Wesley Edward Eugene Swogger, Fairfax Station, VA (US); Mark Edward Kahn, New York, NY (US); Dean Craig Vegliante, New York, NY (US); Jay Phillip Hirschson, New York, NY (US); Jarod Reed Caporino, River Edge, NJ (US); Daniel Jeffrey Ballister, New York, NY (US); Scott David Reinke, Brick, NJ (US); Christopher James Lange, Arlington, VA (US); Abhimanyu Chaudhuri, Fairfax, VA (US); Mary Neshetia Targia, Staten Island, NY (US); Elon Cohen, Charlottesville, VA (US); Sampath Kondam, Ellicott City, MD (US); Sudha Samrat Reddy Podduturi, Elkridge, MD (US)

(73) Assignee: Traffiq, Inc., New York, NY (US)

( * ) Notice: Subject to any disclaimer, the term of this patent is extended or adjusted under 35 U.S.C. 154(b) by 483 days.

(21) Appl. No.: 12/221,062

(22) Filed: Jul. 30, 2008

(65) Prior Publication Data
US 2009/0089151 A1     Apr. 2, 2009

Related U.S. Application Data

(63) Continuation-in-part of application No. 12/150,320, filed on Apr. 26, 2008, and a continuation-in-part of application No. 11/893,976, filed on Aug. 18, 2007.

(51) Int. Cl.
G06Q 30/00     (2006.01)

(52) U.S. Cl. .................................. 705/14.69
(58) Field of Classification Search .......... 705/14, 705/14.69
See application file for complete search history.

(56) References Cited

U.S. PATENT DOCUMENTS

2002/0010623 A1     1/2002 McCollom et al.
(Continued)

OTHER PUBLICATIONS

Emrich, Anne Bond. "Adtegrity.com Plans to Build Additional Networks," Grand Rapids Business Journal, Jul. 3, 2000.*

(Continued)

Primary Examiner — Michelle Tarae
(74) Attorney, Agent, or Firm — Timothy P O'Hogan

(57) ABSTRACT

A dynamic vertical network management system is adapted to broker, between each publisher of a group of publishers and each advertiser of a group of advertisers, the sale of at least a portion of the each publisher's inventory of advertisement impressions. At least a portion of the advertisers are clients of a dynamic vertical network operator (DVN) with the DVN purchasing inventory from the publisher and utilizing such purchased inventory to fulfill advertising orders placed by the client with the DVN (network orders). A publisher data store stores, for each publisher of the group of publishers, a group of segmented ad placements. Each segmented ad placement comprises: i) a placement ID identifying an advertisement placement region within a web page; and ii) at least one distinguishing traffic attribute parameter. An advertisement-order data store stores, for each segmented ad placement, a group of advertisement orders. Upon receiving an ad request from an end user system rendering the web page, an order delivery system: i) determines the selected ad placement, ii) determines an open order for the selected ad placement meeting selection criteria, and iii) if such order is a DVN order: a) determines a client network order meeting network order criteria, and b) delivers ad content associate with the selected network order.

20 Claims, 37 Drawing Sheets

U.S. PATENT DOCUMENTS

| | | |
|---|---|---|
| 2002/0128904 A1 | 9/2002 | Carruthers et al. |
| 2002/0194215 A1 | 12/2002 | Cantrell et al. |
| 2003/0171990 A1 | 9/2003 | Rao et al. |
| 2004/0103024 A1* | 5/2004 | Patel et al. ............. 705/14 |
| 2005/0027594 A1 | 2/2005 | Yasnovsky |
| 2005/0216547 A1 | 9/2005 | Foltz-Smith |
| 2006/0080171 A1 | 4/2006 | Jardins et al. |
| 2006/0259408 A1* | 11/2006 | Levy et al. ............. 705/37 |
| 2007/0027762 A1 | 2/2007 | Collins et al. |
| 2007/0174114 A1 | 7/2007 | Bigby et al. |
| 2007/0244760 A1 | 10/2007 | Bodnar et al. |
| 2007/0260514 A1* | 11/2007 | Burdick et al. ............. 705/14 |
| 2007/0271145 A1 | 11/2007 | Vest |
| 2008/0103903 A1* | 5/2008 | Flake et al. ............. 705/14 |
| 2008/0103952 A1* | 5/2008 | Flake et al. ............. 705/37 |
| 2008/0103969 A1* | 5/2008 | Flake et al. ............. 705/39 |
| 2009/0299799 A1* | 12/2009 | Racho et al. ............. 705/8 |
| 2009/0300031 A1* | 12/2009 | Lejano et al. ............. 707/100 |

OTHER PUBLICATIONS

"Quigo Takes to Niche Markets with Contextual Ads," eWeek, Jun. 22, 2004.*

McCandles, Michael. "Web advertising," IEEE, May/Jun. 1998.*

* cited by examiner

| Ad Placement Table 681 | | | | |
|---|---|---|---|---|
| AP ID 93 | URL 13 | Size 88 | Position 90 | Page Profile Group 232 |
| 93a | 13a | Size a | Banner | 232a |
| 93b | 13a | Size b | Pop Over | 232b |
| 93c | 13a | Size c | Below Fold | 232c |
| 93d | 13b,13c,13d | Size d | Banner | 232b |
| 93e | 13b | Size e | Pop Over | 232b |
| 93f | 13c,13d | Size f | Pop Over | 232b |

| Publisher ID 86 | Notification ID 362 |
|---|---|
| Publisher 86a | Email 362a |
| Publisher 86b | Email 362b |
| Publisher 86c | Email 362c |
| Publisher 86d | Email 362d |

Figure 6A

| Segmented Ad Placement Table 92 | | | |
|---|---|---|---|
| Segmented Ad Placement 95 | Ad Placement ID 93 | Segment Group | Inventory Statistics 94 |
| 95a | 93a | 11a | |
| 95b | 93a | 11b | |
| 95c | | | |
| 95d | | | |
| 95e | | | |
| 95f | | | |
| 95g | | | |
| 95h | | | |

Figure 6C

| Advertisement Orders 652 | | | Salable Event Volume 101 | | | Duration 96 | | Fulfillment Status 104 | | |
|---|---|---|---|---|---|---|---|---|---|---|
| Order ID 20 | Inventory ID 93 | Buyer ID 34 | Content ID 654 | Click 101a | Imp. 101b | Other 101c | Start 96a | End 96b | Click 104a | Imp. 104b | Other 104c |
| 20a | 95a | 34a | 654a | | | | | | | | |
| 20b | 95b | 34b | 654b | | | | | | | | |
| 20c | 95c | 34c | 654c | | | | | | | | |
| 20x | 95x | 34x | 654x | | | | | | | | |
| 20y | 95y | 34y | 654y | | | | | | | | |
| 20z | 95z | 34z | 654z | | | | | | | | |

Figure 7

| Attribute Library 70 | |
|---|---|
| INDX | Attribute Description (Tags) 72 |
| 1 | US |
| 2 | UK |
| ... | ... |
| 10 | New England (MA, RI, NH, VT, ME) |
| 11 | Mid-Atlantic |
| 12 | South East |
| 13 | Mid-West |
| 14 | Mountain |
| 15 | South West |
| 16 | North West |
| ... | ... |
| 100 | Male |
| 101 | Female |
| 102 | < 18 |
| 103 | 18 - 30 |
| 104 | 30 - 40 |
| 105 | 40 - 50 |
| 106 | 50 + |
| ... | ... |
| 207 | Income < 30K |
| 208 | Income 30 - 60K |
| 209 | Income 60 - 100K |
| 210 | Income 100K - 250K |
| 211 | Income 250K + |
| ... | ... |

Figure 8

| Traffic Template 76a | | Segments and Corresponding Blueprints 28 | | | | | | |
|---|---|---|---|---|---|---|---|---|
| Bit Location | Attribute 80 | Seg. 11a TABP 28a | Seg. 11b TABP 28b | Seg. 11c TABP 28c | Seg. 11d TABP 28d | Seg. 11e TABP 28e | Seg. 11f TABP 28f | Seg. 11g TABP 28g |
| 1 | US | X | X | X | X | X | X | X |
| 2 | New England (RI, MA, NH, VT, ME) | X | | | | | | |
| 3 | Mid-Atlantic | | X | | | | | |
| 4 | South East | | | X | | | | |
| 5 | Mid-West | | | | X | | | |
| 6 | Mountain | | | | | X | | |
| 7 | South West | | | | | | X | |

Figure 9A

| Traffic Template 76b | | Segment Blueprints 28 | | | | | |
|---|---|---|---|---|---|---|---|
| | | Seg. 11a | Seg. 11b | Seg. 11c | Seg. 11d | Seg. 11e | Seg. 11f |
| Bit Location | Attribute 80 | TABP 28a | TABP 28b | TABP 28c | TABP 28d | TABP 28e | TABP 28f |
| 1 | Male | | X | X | X | X | X |
| 2 | Female | X | | | | | |
| 3 | < 18 | | X | | | | |
| 4 | 18 - 29 | | | X | | | |
| 5 | 30 - 39 | | | | X | | |
| 6 | 40 - 49 | | | | | X | |
| 7 | 50 + | | | | | | X |

| Inventory Report 376 | | | | | |
|---|---|---|---|---|---|
| Date DD/MM/YYYY 378 | Delivered Orders 380 (thousands) | On Order (undelivered) 382 (thousands) | Committed Inventory 384 (thousands) | Listed, Not Yet Committed 386 (thousands) | Projected Unsold 388 (thousands) |
| 07/07/2009 | 0 | 1,071 | 0 | 0 | 595 |
| 08/07/2009 | 0 | 1,071 | 0 | 0 | 595 |
| 09/07/2009 | 0 | 1,071 | 0 | 0 | 595 |
| 10/07/2009 | 0 | 1,071 | 0 | 0 | 595 |
| 11/07/2009 | 0 | 1,071 | 0 | 0 | 595 |
| 12/07/2009 | 0 | 1,071 | 0 | 0 | 595 |
| 13/07/2009 | 0 | 1,071 | 0 | 0 | 595 |
| 14/07/2009 | 0 | 1,071 | 0 | 71 | 524 |
| 15/07/2009 | 0 | 1,071 | 0 | 71 | 524 |
| 16/07/2009 | 0 | 1,071 | 0 | 71 | 524 |
| 17/07/2009 | 0 | 1,071 | 0 | 71 | 524 |
| 18/07/2009 | 0 | 1,071 | 0 | 71 | 524 |
| 19/07/2009 | 0 | 1,071 | 0 | 71 | 524 |
| 20/07/2009 | 0 | 1,071 | 0 | 71 | 524 |
| 21/07/2009 | 0 | 1,071 | 0 | 71 | 524 |
| Totals | 0 | 16,065 | 0 | 568 | 8,357 |
| Averages | 0 | 1,071 | 0 | 38 | 557 |

Inventory Listing 95

Figure 24A

| Expected Revenue Model 45 | Open Orders 20 / Network Order 661 | | |
|---|---|---|---|
| | Open Order 20a / 661a | Open Order 20b / 661b | Open Order 20c / 661c |
| Delivered Quantity | | | |
| Pace 472 | | | |
| % Below Low Threshold 474 | | | |
| CPM 476 (Impression Based Transaction) | | | |
| Event 478 (Other Transactional Unit) | | | |
| E.R. 480 | | | |

SYSTEM AND METHOD FOR BROKERING THE SALE OF INTERNET ADVERTISEMENT INVENTORY

TECHNICAL FIELD

The present invention relates to a network based system and method for brokering, between each publisher of a group of publishers and each advertiser of a group of advertisers, the sale of at least a portion of each publisher's inventory of advertisement impressions that the publisher can render within renderings of the publisher's Internet web pages to end users accessing such web pages.

BACKGROUND OF THE INVENTION

Users of the Internet are frequently presented with display advertisements within web pages. These advertisements may be in the form of banner advertisements, pop up ads, pop under ads, or other static or dynamic display advertisements within (or associated with) a web publisher's web site.

The goal of each of these advertisements is to entice the user to link to the advertiser's web site for additional information and/or ultimately to solicit the sale of a product or service to the user. As such, displayed advertisements may be associated with a link such that if the advertisement is clicked, the user's web browser is redirected to the advertiser's designated web page.

Because of the above described dynamics of Internet advertising, certain terminology has evolved in the Internet advertising industry. For example: i) the event of rendering an advertisement to an end user within a web publisher's web site is generally referred to as an advertisement "impression"; ii) the event of a user selecting an advertisement, or clicking on the advertisement, such that his/her browser is redirected to the advertiser's website is generally referred to as a "click" or "click-through"; iii) web publishers may be referred to as publishers of advertisement space, publishers of Internet traffic, or publishers; iv) advertisers may be referred to as buyers; v) the quantity of impressions that a web publisher is able to deliver during a period of time may be referred to as its inventory or inventory of Internet traffic, or traffic available for buyers to purchase; and vi) the distinct portions of a web publisher's inventory that can be delivered to end users distinguishable based on end user attributes such as geography, demographics, and/or behavioral patterns may be referred to as segmented inventory, traffic segments, or targeted traffic.

For example, a web publisher which has traffic of 10,000 "hits" per day has the ability to deliver 10,000 banner advertisements per day. Therefore the publisher has an inventory of 10,000 banner advertisement impressions per day which can be sold.

Further, if the impression is delivered on a web page where user registration is required to access the web page, and such registration requires the user to disclose his/her gender, then the inventory of 10,000 banner advertisements can be segmented into a male segment and a female segment. If, on average, the 10,000 hits are 50% male and 50% female, the publisher has segmented inventory of 5,000 banner advertisement impressions per day as its male traffic segment and 5,000 banner advertisement impressions per day as its female traffic segment.

Website publishers generally sell their inventory utilizing one of two dominant business models. The first dominant business model includes use of a continuous auction system. More specifically, an available impression may be sold via the continuous auction system to the advertiser offering the highest yielding advertisement (e.g. the highest remuneration expected to be received for the impression) at the time that the impression is to be rendered to the end user viewing the publisher's web page.

A continuous auction system may categorize the web sites of several publishers within a topical category using key words for purposes of defining available inventory associated with such topic. Advertisers would then place bids associated with such topic (i.e. bids associated with key words). As such, so long as the advertiser remains the highest bidder for such topical category, its advertisement content will be rendered over that of other advertisers placing lower bids.

The second dominant business model includes the negotiated purchase of blocks of inventory between publishers and advertisers. In one aspect the negotiated purchase may be led by a buyer initiating a request for proposal (RFP) outlining overall objectives of an advertising campaign. Publishers having available inventory meeting the overall objectives can then respond for purposes of commencing negotiation. In another aspect a publisher, typically a publisher of a well known website with significant inventory may have dedicated staff for soliciting buyers of advertisement inventory.

There exist several benefits of the negotiated purchase over the sale via an ad network. One of those benefits is that a negotiation purchase provides for delivery of a set quantity of impressions, clicks, or other saleable events within a certain time frame and for a certain monetary fee. This provides predictability to both the publisher and the advertiser. Because ad networks often operate in an auction environment that is continuous, there is little predictability as to the quantity of impressions that will be delivered, or the price for each impression. Bids may change at any time.

A second benefit is that blocks of segmented inventory sold through negotiated purchase may result in delivery of impressions on a more targeted basis. This results in a buyer being able to acquire more targeted inventory and the publisher realizing more value for its inventory.

On the other hand, some disadvantages of the negotiated process include the fact that the entire process is very time consuming and labor intensive process for all parties. Because of this, it may not be possible for publishers with limited inventory to use the negotiated purchase process in a cost effective manner.

In view of the foregoing, what is needed is a network based system which facilitates and automates the negotiated purchase process. More specifically, what is needed is a network based system and method for brokering, between each publisher of a group of publishers and each advertiser of a group of advertisers, the sale of at least a portion of each publisher's inventory of advertisement impressions that the publisher can render within renderings of the publisher's Internet web pages to end users accessing such web pages.

Further yet, it is recognized that large and sometimes well known publishers often experience a demand for impressions from buyers/advertisers that exceed the quantity of inventory impressions that the publisher has available. Therefore, it is useful for the networked based system to facilitate development of a dynamic network of publishers for purposes of building inventory of discreet traffic blocks of segmented ad placements of multiple sellers with related content and/or similar end user attribute profiles and to facilitate sales of inventory across such segmented add placement by a network operator utilizing a negotiated purchase process.

SUMMARY OF THE INVENTION

A first aspect of the present invention comprises a dynamic vertical network management system. The system is adapted to broker, between each publisher of a group of publishers and each advertiser of a group of advertisers, the sale of at least a portion of the each publisher's inventory of advertisement impressions. The publisher's inventory of advertisement impressions comprises the aggregate quantity of impressions of advertisement content that the publisher is able to render to unique end users when such end users direct their browser systems to URL's of the publisher for accessing the publisher's web pages.

At least a portion of the advertisers are clients of a dynamic vertical network operator (DVN) with the DVN purchasing inventory from the publisher and utilizing such purchased inventory to fulfill advertising orders placed by the client with the DVN (network orders).

The management system comprises at least a publisher data store, an advertisement order data store, a DVN client data store, and an order fulfillment system.

The publisher data store stores, for each publisher of the group of publishers, a group of segmented ad placements. Each segmented ad placement comprises: i) a placement ID identifying a web page (by its URL) and an advertisement placement region within the web page within which a selected advertisement impression is to be rendered; and ii) at least one distinguishing traffic attribute parameter.

The distinguishing traffic attribute parameters define to who, with what, where, when, or how the impression will be rendered within the ad placement. More specifically, the distinguishing traffic attribute parameters may include end user attributes, temporal attributes, and/or contextual attributes. End user attributes define geographic, demographic, or behavioral attributes of end users to which the advertisement impression will be rendered. Temporal attributes define distinct time periods within a larger time cycle during which the advertisement impression will be rendered (for example a time period within a day, a day within a week, or a time period within a year such as the day after Thanksgiving). The contextual attributes define subject matter of the publisher's web page (whether static or periodically changing) within which the advertisement impression will be rendered.

At least two segmented advertisement placements comprise the same placement ID, with mutually exclusive distinguishing attribute parameters.

The advertisement order data store stores, for each segmented ad placement, a group of advertisement orders. Each advertisement order comprises: i) a buyer ID identifying a buyer of the advertisement order, ii) a volume parameter defining a volume of saleable events required for fulfillment of the advertisement order; and iii) at least one duration parameter defining an active time period during which the volume of saleable events are scheduled to occur. The buyer ID indicates one of: i) the advertiser buyer; and ii) a DVN buyer.

Each advertisement order may further include: i) a fulfillment value indicating a quantity of saleable events resulting from the impressions rendered to end users (i.e. order status); and ii) a fee identifier defining a fee chargeable to the advertiser for fulfillment of the advertisement order.

Each advertisement order may further include (optionally) an advertisement content identifier identifying the advertiser's content to be rendered to end users for generation of the saleable events in fulfillment of the advertisement order. Inclusion of an advertisement content identifier is useful when the buyer ID indicates the buyer is one of the advertisers or when the buyer ID indicates the buyer is a DVN—but that the entire advertisement order is dedicated to a single client of the DVN. The advertisement content identifier would not be included in an embodiment where the advertisement order will be used to fulfill the DVN's multiple network orders.

For supporting use of an advertisement order to fulfill multiple network orders, the DVN client data store associates, with each DVN of a group of DVNs, a group of network orders for fulfillment through the DVN. Each network order comprises: i) a volume parameter defining a volume of saleable events required for fulfillment of the network order; ii) at least one duration parameter defining an active time period during which the volume of saleable events are scheduled to occur; and iii) an advertisement content identifier identifying the DVN client's advertisement content to be rendered to end users for generation of the saleable events in fulfillment of the network order.

The order fulfillment system comprises at least a segment determination system, an order balancing system, a network order balancing system, and an advertisement serving system.

An advertisement request is received from an end user system on which the publisher's web page will be rendered to the end user. The advertisement request comprises an advertisement placement identifier. The ad request further include and an indication of request attribute data. The request attribute data may be at least one attribute identifier defining to who, with what, where, when, or how the requested impression (i.e. the advertisement content that will be returned in response to the ad request) will be rendered. More specifically, the attribute data may include end user attributes, temporal attributes, and/or contextual attributes. In the case of attribute data included in the request, the user attributes define geographic, demographic, or behavioral attributes of the end users to which the advertisement impression will be rendered. Temporal attributes define when the advertisement request will be rendered to the end user (for example the date and time in the local time zone of the end user). The contextual attributes define subject matter of the publisher's web page (whether static or periodically changing) within which the advertisement impression will be rendered.

The segment determination system identifies a selected segmented ad placement. The selected segmented ad placement is both i) the segmented ad placement with a placement ID matching the advertisement placement identifier of the advertisement request; and ii) if the ad placement is segmented, the segmented ad placement with distinguishing traffic attribute parameters best matching the attribute data—or preferably exactly matching.

The attribute data used for determining the selected segmented ad placement may be a combination of the request attribute data included in the ad request plus other attributed data looked up, calculated, extracted from a cookie on the end user system, or otherwise determined by the segmented determination system.

The order balancing system is adapted to determine a selected advertisement order. The selected advertisement order is the advertisement order associated with the selected segmented ad placement which meets fulfillment criteria.

The network balancing system is adapted to, if the selected advertisement order is associated with a DVN and for use fulfilling one or more network orders, determine a selected network order. The selected network order is the network order associated with the DVN which meeting network order selection criteria.

The serving system is adapted to provide a reply to the advertisement request. The reply identifies selected advertisement content. The selected advertisement content is: i) if the selected advertisement order comprises a buyer ID identifying the advertiser buyer of the advertisement order, the content associated with the advertisement content identifier of the advertisement order; and ii) if the selected advertisement order comprises a buyer ID identifying a DVN, content associated with the advertisement content identifier of the selected network order.

For purposes of building a DVN network of advertisement orders for fulfilling its client's network orders, the system may further include an ad placement search system. For operation with the ad placement search system, each segmented ad placement may further comprise at least one content identifier tag identifying content of the web page and at least one notification identifier defining a means for providing a notification to the publisher.

The ad placement search system may be adapted to: i) obtain the DVN's search criteria; ii) determine whether each segmented ad placement (i.e. a candidate segmented ad placement) is a target segmented ad placement, and iii) generate a results display web page.

Each candidate segmented ad placement's content identifier tags or distinguishing traffic attributes are compared to the DVN's search criteria. The DVN's search criteria may be DVN target traffic attribute criteria. The DVN target traffic attribute criteria may be parameters define to who, with what, where, when, or how the DVN desires advertisement impressions to be rendered for fulfillment of its client's network orders. More specifically, the DVN target traffic attribute criteria may include end user attributes, temporal attributes, and/or contextual attributes. End user attributes define geographic, demographic, or behavioral attributes of end users to which the DVN desired advertisement impressions to be rendered. Temporal attributes define distinct time periods within a larger time cycle during which the DVN may desire advertisement impressions to be rendered (for example a time period within a day, a day within a week, or a time period within a year such as the day after Thanksgiving). The contextual attributes define subject matter of the publisher's web page (whether static or periodically changing) desirable to the DVN.

The candidate segmented ad placement is a target segmented ad placement only if the candidate segmented ad placement's content identifier tags and/or distinguishing traffic attribute parameters correspond to (i.e. match) the DVN's search criteria. The DVN's search criteria may be all, or a portion (i.e. a subset) of the DVN target traffic attribute criteria.

The results display web page comprises, for each target segmented ad placement, at least: i) identification of the segmented ad placement and/or the publisher making the segmented ad placement available; and ii) a control for selection of the target segmented ad placement and posting identification of the selected target segmented ad placement to the ad placement search system.

The ad placement search work flow may further launch a request for inventory work flow for purposes of generating a request notice to the publisher offering the selected target segmented ad placement—for example, by sending an email to a notification identifier (i.e. email address) associated with the publisher of the target segmented ad placement.

Upon receipt of an indication that a discrete traffic block of the selected target segmented ad placement has been committed, an additional advertisement order representing the discrete traffic block of the selected target segmented ad placement may be written to the advertisement order data store. The additional advertisement order may comprise: i) a buyer ID identifying the DVN as the buyer of the advertisement order; ii) a volume parameter defining a volume of saleable events required for fulfillment of the advertisement order; iii) at least one duration parameter defining an active time period during which the volume of saleable events are scheduled to occur; and iv) a fee identifier defining a fee chargeable to the DVN for fulfillment of the advertisement order.

In one aspect, the ad placement search workflow may obtain the search criteria by sending a web page for user entry of DVN target traffic attributes and posting of the entered DVN target traffic attributes back to the ad placement search workflow. Some of the target traffic attributes may be entered in the form of key work search tags.

In another aspect, the system may further comprise a DVN data store associating each DVN of the group of DVNs with one or more search criteria sets, each comprising predetermined DVN target traffic attribute criteria.

In this aspect, the ad placement search workflow may, for a selected search criteria set, obtain the search criteria by looking up the DVN target traffic attribute criteria from the DVN data store.

In yet another aspect, a portion of the search criteria may be obtained by user entry through a web page and posting to the ad placement work flow and a portion of the search criteria may be obtained by look up of DVN target traffic attribute criteria.

To facilitate the DVN managing a balance of its inventory expected to be available through purchased advertisement orders to its inventory expected to be required to fulfill client network orders, the system may further include an inventory management system.

The inventory management system may: i) calculate, for a candidate duration of time, the quantity of advertisement inventory expected to be required to fulfill each network order associated with the DVN; and ii) calculate, for the candidate duration of time, the quantity of advertisement inventory expected to be available through the advertisement orders associated with the DVN in the advertisement order data store.

If, for the candidate duration of time, the quantity of advertisement inventory expected to be available is less than the quantity of advertisement inventory expected to be required, the inventory management system may initiate the segmented ad placement search process.

A second aspect of the present invention comprises a method for operating a dynamic vertical network management system for brokering, between each publisher of a group of publishers and each advertiser of a group of advertisers, sale of at least a portion of the each publisher's inventory of advertisement impressions that the publisher can render within renderings of the publisher's web pages to end users.

Again, at least a portion of the advertisers are clients of a DVN with the DVN purchasing inventory from the publisher and utilizing such purchased inventory to fulfill network orders placed by the client with the DVN.

The method comprises storing, in a publisher data store, for each publisher of the group of publishers, a group of segmented ad placements. Each segmented ad placement may comprise: i) placement ID identifying a web page and an advertisement placement region within the web page within which a selected advertisement impression is to be rendered; and ii) at least distinguishing traffic attribute parameter.

Again, the distinguishing traffic attribute parameters define to who, with what, where, when, or how the impression will be rendered within the ad placement. More specifically, the distinguishing traffic attribute parameters may include end user attributes, temporal attributes, and/or contextual attributes. End user attributes define geographic, demographic, or behavioral attributes of end users to which the advertisement impression will be rendered. Temporal attributes define distinct time periods within a larger time cycle during which the advertisement impression will be rendered (for example a time period within a day, a day within a week, or a time period within a year such as the day after Thanksgiving). The contextual attributes define subject matter of the publisher's web page (whether static or periodically changing) within which the advertisement impression will be rendered.

Again, at least two segmented advertisement placements comprise the same placement ID, with mutually exclusive distinguishing attribute parameters.

The method further comprises storing, in an advertisement order data store, for each segmented ad placement, a group of advertisement orders. Each advertisement order comprises: i) a buyer ID identifying a buyer of the advertisement order, the buyer ID indicating one of: a) the advertisers; and b) a DVN; ii) a volume parameter defining a volume of saleable events required for fulfillment of the advertisement order; iii) at least one duration parameter defining an active time period during which the volume of saleable events are scheduled to occur; iv) if the buyer ID indicates one of the advertisers, an advertisement content identifier identifying the advertiser's content to be rendered to end users for generation of the saleable events in fulfillment of the advertisement order; v) a fulfillment value identifying the quantity of saleable events resulting from the impressions rendered to end users (i.e. order status); and vi) a fee identifier defining a fee chargeable to the advertiser for fulfillment of the advertisement order.

The method further comprises storing, in a DVN client data store and in association with each DVN of a group of DVNs, a group of network orders for fulfillment through the DVN. Each network order comprises: i) a volume parameter defining a volume of saleable events required for fulfillment of the network order; ii) at least one duration parameter defining an active time period during which the volume of saleable events are scheduled to occur; and iii) an advertisement content identifier identifying advertisement content to be rendered to end users for generation of the saleable events in fulfillment of the network order.

The method further comprises receiving an advertisement request from an end user system. The end user system comprises the end user's web browser system which will render the publisher's web page and render and advertisement impression within the web page. The request includes an advertisement placement identifier and may include request attribute data.

Again, the request attribute data may be at least one attribute identifier defining to who, with what, where, when, or how the requested impression (i.e. the advertisement content that will be returned in response to the ad request) will be rendered. More specifically, the attribute data may include end user attributes, temporal attributes, and/or contextual attributes. In the case of attribute data included in the request, the user attributes define geographic, demographic, or behavioral attributes of the end users to which the advertisement impression will be rendered. Temporal attributes define when the advertisement request will be rendered to the end user (for example the date and time in the local time zone of the end user). The contextual attributes define subject matter of the publisher's web page (whether static or periodically changing) within which the advertisement impression will be rendered.

In response to the request, the method includes: i) identifying a selected segmented ad placement; ii) order balancing to determine a selected advertisement order; iii) if the selected advertisement order is associated with a DVN, network order balancing to determine a selected network order; and iv) providing, in response to the advertisement request, the reply identifying selected advertisement content.

The selected segmented ad placement is the segmented ad placement with both: i) a placement ID matching the advertisement placement identifier of the advertisement request; and ii) traffic attribute parameters best matching attribute data—or preferably exactly matching.

Again, the attribute data used for determining the selected segmented ad placement may be a combination of the request attribute data included in the ad request plus other attributed data looked up, calculated, extracted from a cookie on the end user system, or otherwise determined by the segmented determination system.

The selected advertisement order is the advertisement order associated with the selected segmented ad placement which meets fulfillment criteria.

The selected network order is the network order associated with the DVN which meets network order selection criteria.

The selected advertisement content is: i) if the selected advertisement order comprises a buyer ID identifying the buyer of the advertisement order, content associated with the advertisement content identifier of the advertisement order; and ii) if the selected advertisement order comprises a buyer ID identifying a DVN, content associated with an advertisement content identifier of the selected network order.

For purposes of building a DVN network of advertisement orders for fulfilling its client's network orders, the method may further comprise an ad placement search process. For operation with the ad placement search process, each segmented ad placement: i) further comprises at least one content identifier tag identifying subject matter of the web page; and ii) is associated with at least one notification identifier defining a means for providing a notification to the publisher.

The ad placement search process comprises: i) obtaining search criteria; ii) determining whether a candidate segmented ad placement is a target segmented ad placement; iii) generating a results display; iv) generating a request notice to the notification identifier associated with the publisher offering the target segmented ad placement; and v) upon receipt of an indication that a discrete traffic block of the target segmented ad placement has been committed to the DVN, writing an additional advertisement order for the target segmented ad placement in the advertisement order data store.

The candidate segmented ad placement is the target segmented ad placement only if the candidate segmented ad placement's content identifier tags and/or distinguishing traffic attributes correspond to the search criteria.

The results display comprises, for each target segmented ad placement: i) identification of the publisher offering the target segmented ad placement; and ii) a control for selection of the target segmented ad placement and posting identification of the target segmented ad placement to the system.

The additional advertisement order comprises: i) a buyer ID identifying the DVN as the buyer of the advertisement order; ii) a volume parameter defining a volume of saleable events required for fulfillment of the advertisement order; iii) at least one duration parameter defining an active time period during which the volume of saleable events are scheduled to occur; and iv) a fee identifier defining a fee chargeable to the advertiser for fulfillment of the advertisement order.

In one sub aspect, the step of obtaining the search criteria comprises providing the DVN with a web page for DVN user entry of DVN target traffic attributes and posting of the DVM target traffic attributes back to the system. Some of the target traffic attributes may be entered in the form of key work search tags.

In another sub aspect, the system may further maintain a DVN data store associating each DVN of the group of DVNs with one or more search criteria sets, each comprising predetermined DVN target traffic attribute criteria.

In this sub aspect, the method may comprise obtaining, for a selected search criteria set, the search criteria by looking up the DVN target traffic attribute criteria from the DVN data store. The selected search criteria set may be a subset of DVN target traffic attributes identified by or selected by a DVN user for a specific search.

In yet another sub aspect, a portion of the search criteria may be obtained by user entry through a web page and posting to the ad placement work flow and a portion of the search criteria may be obtained by look up of DVN target traffic attribute criteria.

To facilitate the DVN managing a balance of its inventory expected to be available through purchased advertisement orders to its inventory expected to be required to fulfill client networks orders, the method may include an inventory management process.

The inventory management process comprises: i) calculating, for a candidate duration of time, the quantity of advertisement inventory expected to be required to fulfill each network order associated with the DVN; and ii) calculating, for the candidate duration of time, the quantity of advertisement inventory expected to be available through the advertisement orders associated with the DVN in the advertisement order data store.

If, for the candidate duration of time, the quantity of advertisement inventory expected to be available is less than the quantity of advertisement inventory expected to be required, initiate the segmented ad placement search process.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 6a represents exemplary data structure recording a publisher's advertisement placements within web pages of the publisher's website in accordance with an embodiment of the present invention;

FIG. 6c represents exemplary data structure recording a publisher's segmented ad placements in accordance with an embodiment of the present invention;

FIG. 7 represents further exemplary data structure recording information related to the sale of a publisher's segmented ad placements as individual advertisement orders in accordance with an embodiment of the present invention;

FIG. 8 is a table representing a global attribute library in accordance with an exemplary embodiment of the present invention;

FIG. 9a is a table representing a first traffic template for segmenting a publisher's Internet traffic in accordance with an exemplary embodiment of the present invention;

FIG. 9b is a table representing a second traffic template for segmenting a publisher's Internet traffic in accordance with an exemplary embodiment of the present invention;

FIG. 19 is a web page diagram representing a results display depicting target segmented ad placements matching search criteria in accordance with an embodiment of the present invention;

FIG. 24a is a diagram representing an exemplary inventory report in accordance with an embodiment of the present invention;

DETAILED DESCRIPTION OF THE EXEMPLARY EMBODIMENTS

Figure 1:
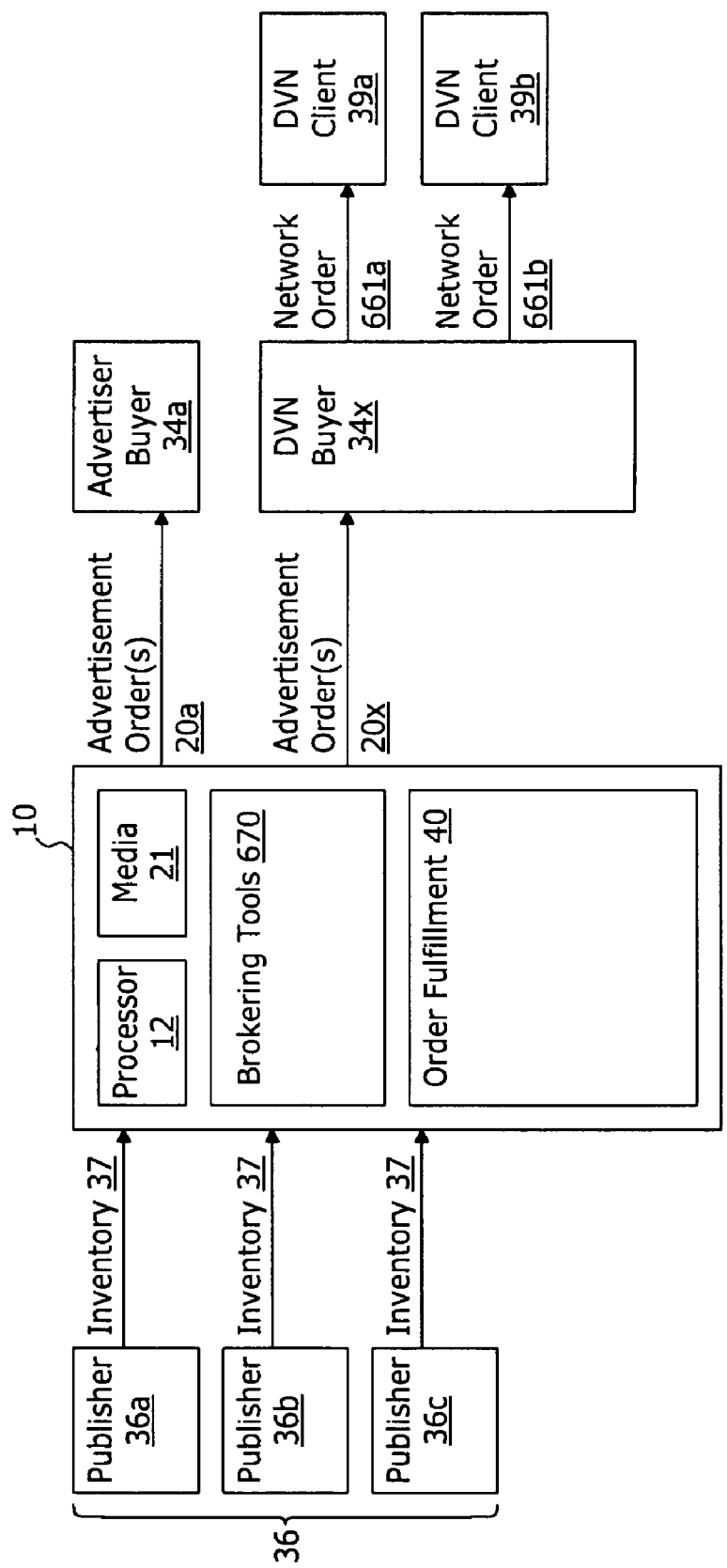
FIG. 1 is a block diagram representing a system for brokering between each publisher of a group of publishers and each advertiser of a group of advertisers, sale of at least a portion of each publisher's inventory of advertisement impressions that the publisher can render within renderings of the publisher's web pages to end users.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that table structures represented in this application are exemplary only and intended to show the mapping of relationships between various data elements. Other table structures may store similar data elements in a manner that maintains the relationships useful for the practice of the present invention. Further: i) the applicant's use of the term "plurality" is intended to indicate not just "at least one", but one, two, three, or any other quantity; and ii) the applicant's use of the term "group" is intended to indicate not just "at least one", but two, three, or more of the items within the group.

FIG. 1 represents a management system 10 adapted to broker, between each publisher 36a, 36b, 36c of a group of publishers 36, sale of at least a portion of the publisher's inventory 37 of advertisement impressions that the publisher 36 is able to render within renderings of the publisher's web pages to end users.

The system 10 may include one or more processors 12 coupled to a computer readable media 21. The computer readable media 21 (RAM, ROM, FLASH, magnetic media, etc.) may be encoded with the data structures, tools and work flows (i.e. computer programs) described herein. Those skilled in the art will appreciate that the one or more processors 12 and the computer readable media 21 are readily implemented: i) on a single hardware server; ii) on multiple interconnected hardware servers with each of the various data structures, tools and workflows being implemented on one or more distinct hardware servers; and/or iii) on multiple interconnected hardware servers with functions of each of the various data structures, tools and workflows being disturbed across multiple hardware servers.

In the exemplary embodiment, the system 10 is adapted to broker the inventory 37 of advertisement impressions as advertisement orders 20 by: i) brokering or selling an advertisement order 20a for a portion of the inventory 37 directly to one or more advertiser buyers 34a; or ii) brokering or selling to one or more advertisers (i.e. DVN clients) by way of brokering or selling an advertisement order 20x to a dynamic vertical network (DVN) buyer 34x. Each advertiser purchasing inventory through a DVN buyer 34x may be referred to as a DVN client 39a, 39b.

In the embodiment where an advertisement order 20x is brokered to a DVN 34x, fulfillment of the advertisement order 20x may be used for fulfillment of one or more network orders 661a, 661b placed by the DVN clients 39a, 39b.

Figure 2:
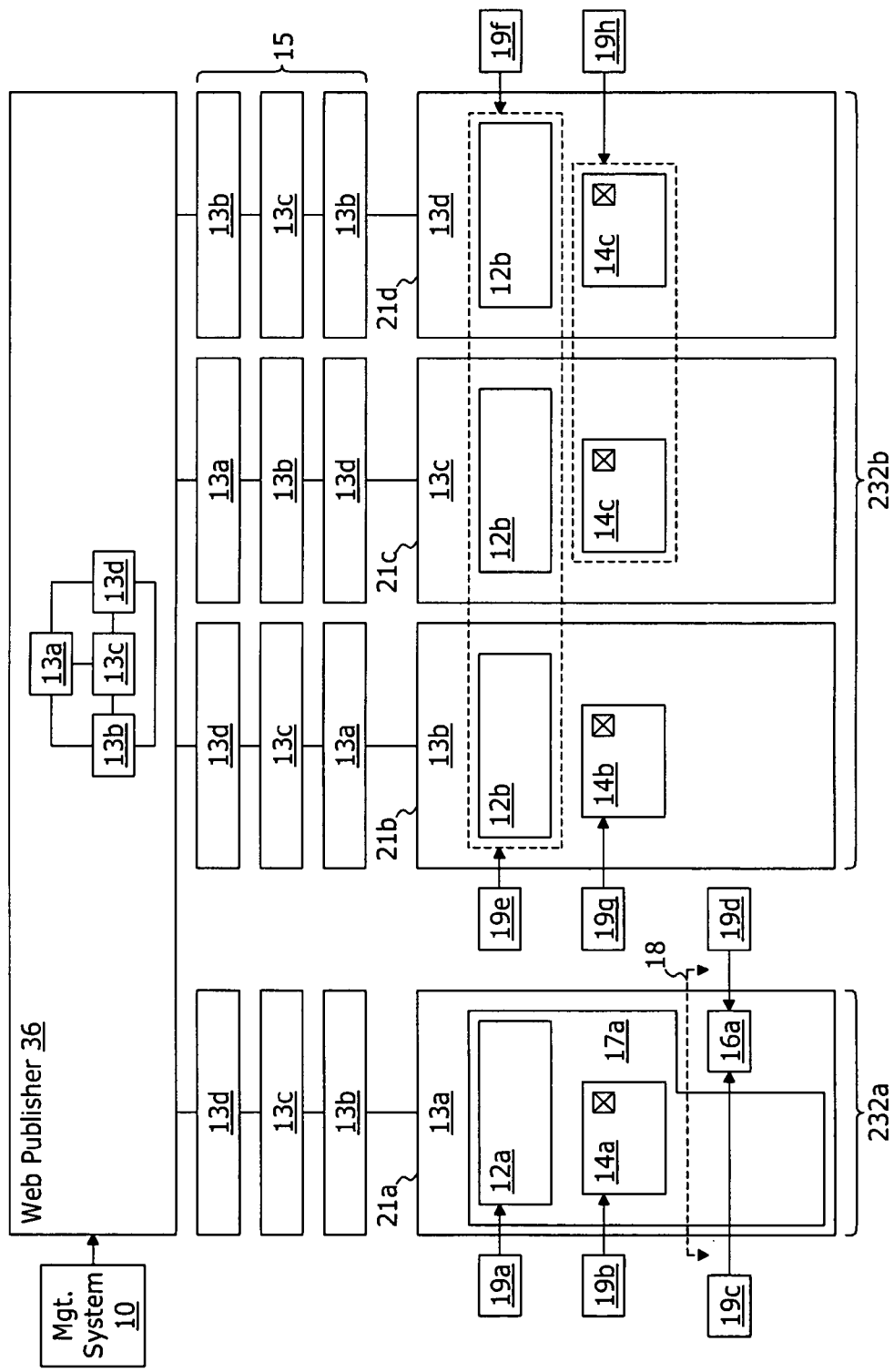
FIG. 2 is a block diagram representing more detailed architecture for implementing a network based system and method for brokering sale of at least a portion of the publisher's inventory of advertisement impressions in accordance with an embodiment of the present invention.

In more detail, and with reference to FIG. 2, the management system 10 is adapted to broker the sale of at least a portion of a publisher's inventory of advertisement impressions that the publisher 36 is able to render within advertisement placements to end user browser systems 21a, 21b within web pages 13 of the internet traffic 15 of the publisher 36.

The publisher 36 may operate a web site comprising a plurality of web page(s) 13a-13d which may be delivered to those end user browser systems 21a, 21b which establish a connection to the publisher's web server.

Each web page (for example web page 13a rendered on end user browser system 21a) may include an HTML, JAVA Script, or other file generated by the publisher's web server and which includes informational or other published content 17a which attracts or draws the end user to the website of the publisher 36. Each web page (again, for example web page 13a rendered on end user browser system 21a may further include one or more advertisement placement regions (also referred to as advertisement placements) 12a, 14a, 16a.

Each ad placement region 12a, 14a, 16a may include code driving the browser system 21 to obtain and render advertisement content (for example advertisement content 19a, 19b, and 19c) within the browser window to the end user as an advertisement impression. Similarly, web page 13b rendered on end user browser system 21b may include advertisement placements 12b, and 14b, web page 13c rendered on end user browser system 21c may include advertisement placements 12b, and 14c, and web page 13d rendered on end user browser system 21d may include advertisement placements 12b, and 14c.

Each exemplary advertisement placement 12, 14, and 16 within the web page(s) 13 may be code for obtaining and rendering a banner advertisement placement 12, a pop-up advertisement placement 14 which displays over the published content 17 until closed by the end user, and other advertisement placement(s) which are positioned for display on the web page(s) 13 above or below a fold line 18—for example advertisement placement 16 are rendered below the fold line 18. The fold line 18 distinguishes the portions of the web page 13a which are visible upon loading by the web browser (e.g. portions above the fold line 18) from portions that are only visible when the end user manually scrolls towards the bottom of the web page 13a (e.g. portions below the fold line 18).

The aggregate of all web pages 13 delivered to all end user browser systems 17 may be referred to as the publisher's internet traffic 15. The aggregate of all advertisement impressions that the publisher 36 is able to render through the advertisement placements 12, 14, 16 within its internet traffic 15 may be referred to as the publisher's inventory of advertisement impressions, or impression inventory.

Unlike conventional continuous auction advertisement brokering systems which broker placement of advertisement content as an advertisement impression on a single impression basis, the management system 10 may be adapted to: i) define the advertisement placements 12, 14, 16 (i.e. size and position of the advertisement placement) within one or more web pages; ii) define page profile groups wherein each page profile group comprises of one, two, or more web pages 13 with similar end user traffic patterns; iii) segment each page profile group into one, two, or more segments based on end user attributes (i.e. known attributes of the end user to which the advertisement impression will be rendered, including such attributes as geographic, demographic, behavioral) and/or classification of published content (in a web page where the published content is periodically altered between one, two, or more classifications); iv) associate each advertisement placement with a page profile group and one or more segments of the page profile group to define segmented ad placements of the ad placement; and v) broker the sale of discrete traffic blocks of each segmented ad placement either: i) by brokering or selling one or more advertisement orders directly to an advertiser; and/or ii) indirectly to advertisers (i.e. DVN clients) by way of brokering or selling one or more advertisement orders to a DVN buyer.

Figure 3:
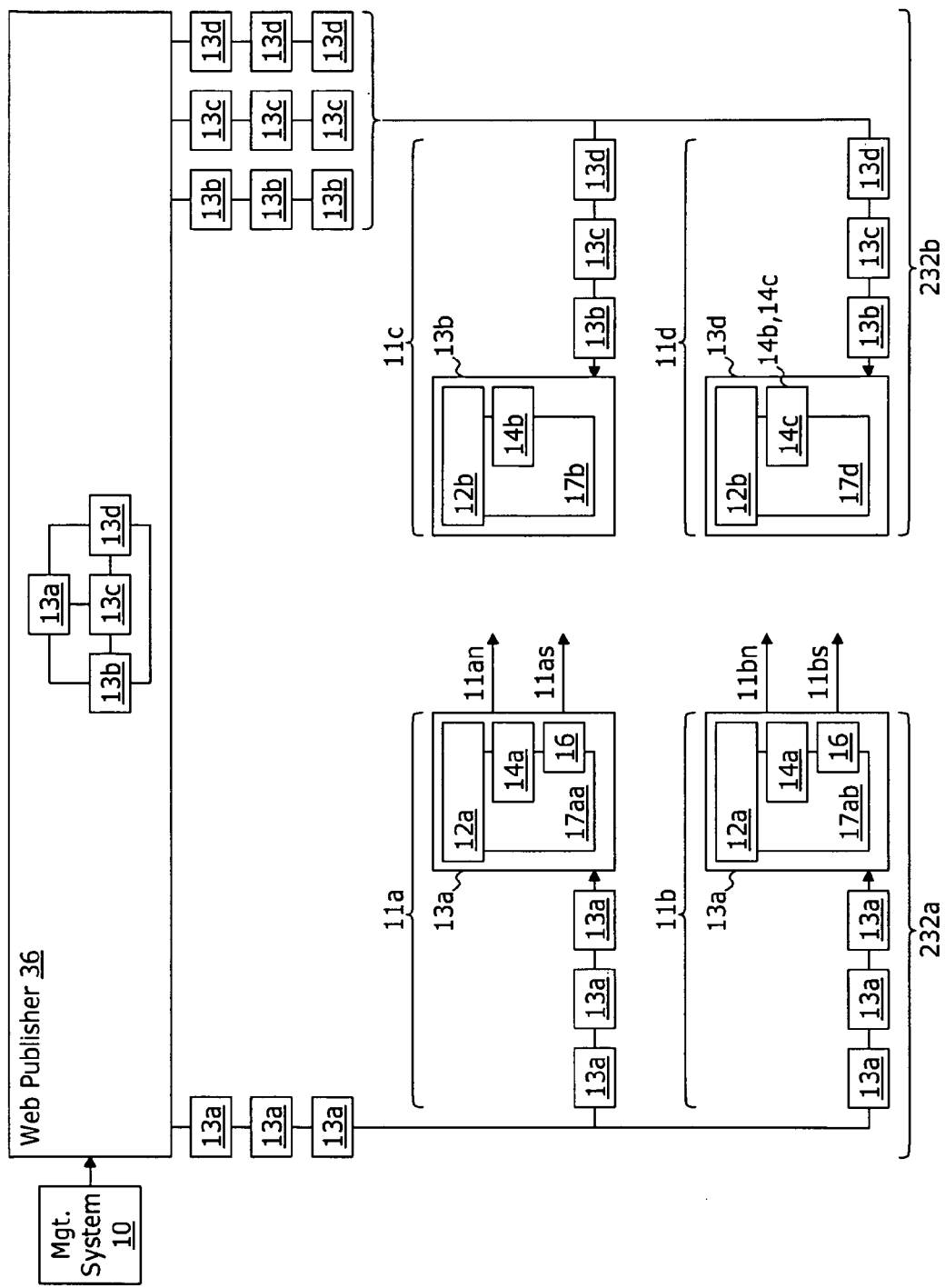
FIG. 3 is a block diagram representing more detailed architecture for implementing a network based system and method for brokering sale of at least a portion of the publisher's inventory of advertisement impressions in accordance with an embodiment of the present invention.

For example, the system 10 may include a page profile and segmentation tool 62 (FIG. 13) which is adapted to obtain a publisher's definition of its page profile groups 232 (FIG. 3). For example a publisher 36 may define a first page profile group (page profile group ID 232a) to include only a single web page 13a (for example the web sites landing page) and a second page profile group (page profile group ID 232b) which includes web pages 13b, 13c and 13d.

The inclusion of multiple web pages within a single page profile group is useful when the end user traffic patterns (i.e. attributes of end users linking to such pages) are consistent across all of those pages—meaning that the quantity or proportion of end user's with certain known end user attributes linking to each page of the pages within the traffic profile group is the same or similar for all pages within the traffic profile group.

As an example, it may be useful for a publisher operating a web site with multiple groupings of web pages—with each grouping being dedicated to a distinct topic such as finance, sports, or entertainment, etcetera—to group all pages related to a particular distinct topic into a single page profile group. For example, all pages relating to finance may be grouped to form a first page profile group because it is known that most end users accessing any page within the same profile group have a demographic characteristic such as household income falling within a certain income bracket—or behavioral characteristics such as a desire to read about finance. Similarly, all pages related to sports may be grouped to form a second page profile group because it is known that most end users accessing any page within the page profile group have demographic characteristics such as males within a certain age bracket—or behavioral characteristics such as a desire to read about sports or a certain sport. Each advertisement placement 12, 14, and 16 may be rendered in permutations of one or more of the web pages 13 associated with the page profile group 232.

Turning briefly to FIG. 3 in conjunction with FIG. 2, the page profile and segment tool 62 (FIG. 13) may be further adapted to obtain a publisher's segmentation of its page groups 232a and 232b into one or more segments, 11a, 11b, 11c, and 11d utilizing, for example, combinations of end user (or traffic) attribute segmentation and/or contextual attribute segmentation.

In general, if total web site traffic 15 for any page profile group includes a significantly large quantity of "hits" per day from diverse end users, it is reasonable to expect that certain advertisement content that would appeal to, or be effective with, one segment of those end users (for example male end users) may not be as appealing to, or effective with, another segment of those end users (for example female end users). Therefore, if end user attribute information is available, it may be beneficial for the publisher to segment the page profile group into multiple distinct end user attribute segments to allow for the sale of discrete traffic blocks targeting distinct end user attribute segments for purposes of maximizing the aggregate value of the traffic 15 (i.e. impression inventory).

As an example of end user attribute segmentation, page profile group 232*b* may be attribute segmented to yield traffic segments 11*c* (corresponding to instances of the web page 13*b*, 13*c*, or 13*d* rendered to female end users) and traffic segment 11*d* (corresponding to instances of the web page 13*b*, 13*c*, or 13*d* rendered to male end users).

Such exemplary segmentation may be beneficial to the publisher 36 because it can be reasonably expected that aggregate revenue from the sale of discrete traffic blocks to the two segments independently (for example a male segment being sold to an advertiser willing to pay for the male segment and a female segment being sold to an advertiser willing to pay for the female segment) will be greater than revenue from the sale of the entire traffic block 15 as single segment including both male and female end users.

It should be appreciated that the exemplary segmentation based on male/female end users is an example only. Segments may be defined based on any end user attributes that can be determined about an end user at the time the advertisement impression is to be rendered within the web page 13 provided to the end user. Examples include the end user's: i) geographic location, ii) demographic information such as end user's gender, age, and income bracket; and iii) behavioral patterns.

Similarly, regardless of what end user attribute data is known, it is reasonable to expect that certain advertisement content that would appeal to, or be effective with, end user readers selecting certain published content (for example users selecting to read a sports article) may not be as appealing to, or effective with, end users selecting different published content (for example end users selecting to read a political news article). Therefore, the segmentation tool 62 (FIG. 13) may be further adapted to, if web content is periodically changed for a particular web page, obtain the publisher's segmentation of page profile group into multiple distinct contextual attribute segments to allow for the sale of discrete traffic blocks targeting distinct contextual attribute segments for purposes of maximizing the aggregate value of the traffic 15.

As an example of contextual attribute segmentation, assume that the content of the publisher's published content 17*a* within web page 13*a* is periodically changed (for example it is a news story) between content of a first classification 17*aa* (a sports related news story for example) and content of a second classification 17*ab* (a weather related news story for example), the page profile group 232*a* may be contextually segmented to yield traffic segments 11*a* (corresponding to instances of the web page 13*a* rendered with content of the first classification 17*aa*) and traffic segment 11*b* (corresponding to instances of the web page 13*a* rendered with content of the second classification 17*ab*).

Again, it should be appreciated that these examples of end user attribute segmentation and contextual segmentation are exemplary only. It is envisioned that any page profile group 232 may be segmented into one, two, or more traffic attribute segments based on many permutations of both context and end user attributes to yield multiple traffic segments.

As an example, page profile group 232*a* may be contextually segmented based on content and further segmented based on known end user geographical attributes such that segments may be: i) instances of the web page with content of the first classification 17*aa* rendered to end users from the northeast United States (represented by arrow 11 an); ii) instances of the web page with content of the first classification 17*aa* rendered to end users from the southeast United States (represented by arrow 11 as); iii) instances of the web page with the second classification 17*ab* rendered to end users from the northeast United States (represented by arrow 11*bn*); and iv) instances of the web page with the second classification 17*ab* rendered to end users from the southeast United States (represented by arrow 11*bs*).

Returning to FIG. 2, the management system 10 may be further adapted to define one or more advertisement placements 12, 14, and 16 within one or more web pages 13 and segment such advertisement placement (i.e. define a segmented ad placement) by associating such advertisement placement 12, 14, 16 with one or more segments 11 (FIG. 3) of the page profile group 232.

For example, referring briefly to FIG. 6*a* in conjunction with FIG. 2, a first advertisement placement (with an advertisement placement ID 93 of "93*a*") may be the banner advertisement placement 12*a*, a second advertisement placement (with an advertisement placement ID 93 of "93*b*") may be the pop over advertisement placement 14*a*, and a third advertisement placement (with an advertisement placement ID 93 of "93*c*") may be a combination of both of the advertisement placements 16*a* and 16*b*, in each case, with the web page 13*a* associated with page profile group 232*a*.

A fourth advertisement placement (with an advertisement placement ID 93 of "93*d*") may be the banner advertisement placement 12*b* on each of pages 13*b*, 13*c* and 13*d*, and a fifth advertisement placement (with an advertisement placement ID 93 of "93*e*") may be the pop over advertisement placement 14*b* on only web page 13*b* of the page profile group 232*b* while a sixth advertisement placement (with an advertisement placement ID 93 of "93*f*") may be the pop over advertisement placement 14*c* on the remaining web pages 13*c* and 13*d*—in each case associated with the page profile group 232*b*.

Figure 4:
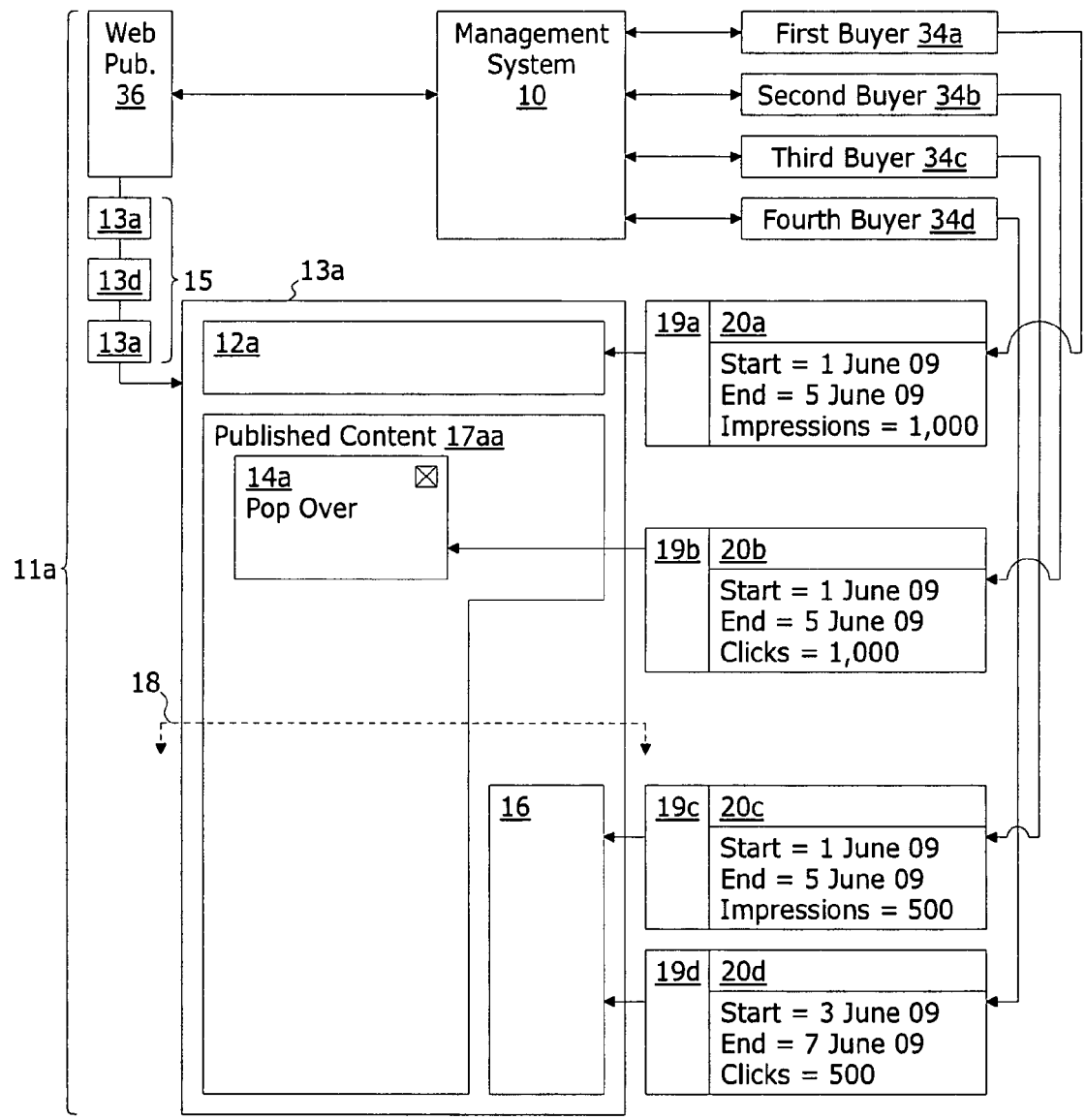
FIG. 4 is a block diagram representing more detailed architecture for implementing a network based system and method for brokering sale of at least a portion of the publisher's inventory of advertisement impressions in accordance with an embodiment of the present invention.

Turning to FIG. 4, the management system 10 may be adapted to broker the placement of advertisement content within the various advertisement placements 12, 14, and 16 as a plurality of discrete traffic blocks of saleable events during a specified duration of time—which may be referred to as advertisement orders, for example advertisement orders 20*a*-20*d*.

Each advertisement order 20*a*-20*d* may comprise a sufficient quantity of impressions rendered within the advertisement placement to yield a defined quantity of saleable events (for example, impressions, clicks (end user's selecting the advertisement impression to link through to the advertiser's website), leads, sales, etc) during a specified duration of time. If the saleable event is an impression, the sufficient quantity of impressions would be the included volume of impressions. The specified duration may be defined by a specified start time and a specified end time (i.e. an active time period during which the volume of saleable events is scheduled to occur).

For example, first buyer 34*a* may purchase a discrete traffic block 20*a* for advertisement placement 12*a* which comprises rendering of 1,000 impressions within banner advertisement placement 12*a* between 1 Jun. 2009 and 5 Jun. 2009. Each impression comprises a rendering of advertisement content 19a defined by the first buyer identified by buyer ID 34a (or brokered by the first buyer if the first buyer is a DVN) to a unique end user obtaining and viewing the web page 13 in the browser system of the end user.

As a second example, second buyer 34b may purchase a discrete traffic block 20b for advertisement placement 14a which comprises 1,000 clicks between 1 Jun. 2009 and 5 Jun. 2009. As such, advertisement content 19b defined by the second buyer defined by buyer ID 34b (or brokered by the second buyer if the second buyer is a DVN) will be rendered within advertisement placement 14a for a sufficient quantity of impressions to yield 1,000 clicks between 1 Jun. 2009 and 5 Jun. 2009.

As yet a third example: i) a third buyer identified by buyer ID 34c may purchase a discrete traffic block 20c for advertisement placement 16 which comprises rendering of 500 impressions within advertisement placement 16 between 1 Jun. 2009 and 5 Jun. 2009; and ii) a fourth buyer identified by buyer ID 34d may purchase a discrete traffic block 20d for advertisement placement 16 which comprises 500 clicks between 3 Jun. 2009 and 7 Jun. 2009.

As such, advertisement content 19c defined by the third buyer (or brokered by the third buyer if the third buyer is a DVN) is rendered within the advertisement placement 16 to a unique end user obtaining and viewing the web page 13 between 1 Jun. 2009 and 5 Jun. 2009 and advertisement content 19d defined by the fourth buyer (or brokered by the fourth buyer if the fourth buyer is a DVN) is rendered within the advertisement placement 16 for a sufficient quantity of impressions to yield 500 clicks between 3 Jun. 2009 and 7 Jun. 2009. During the time period between 3 Jun. 2009 and 5 Jun. 2009 when the two discrete traffic blocks overlap, order balancing systems (discussed herein) provide for selection of which advertisement content 19c or 19d to render within the advertisement placement 16 as an impression to each unique end user.

Figure 5:
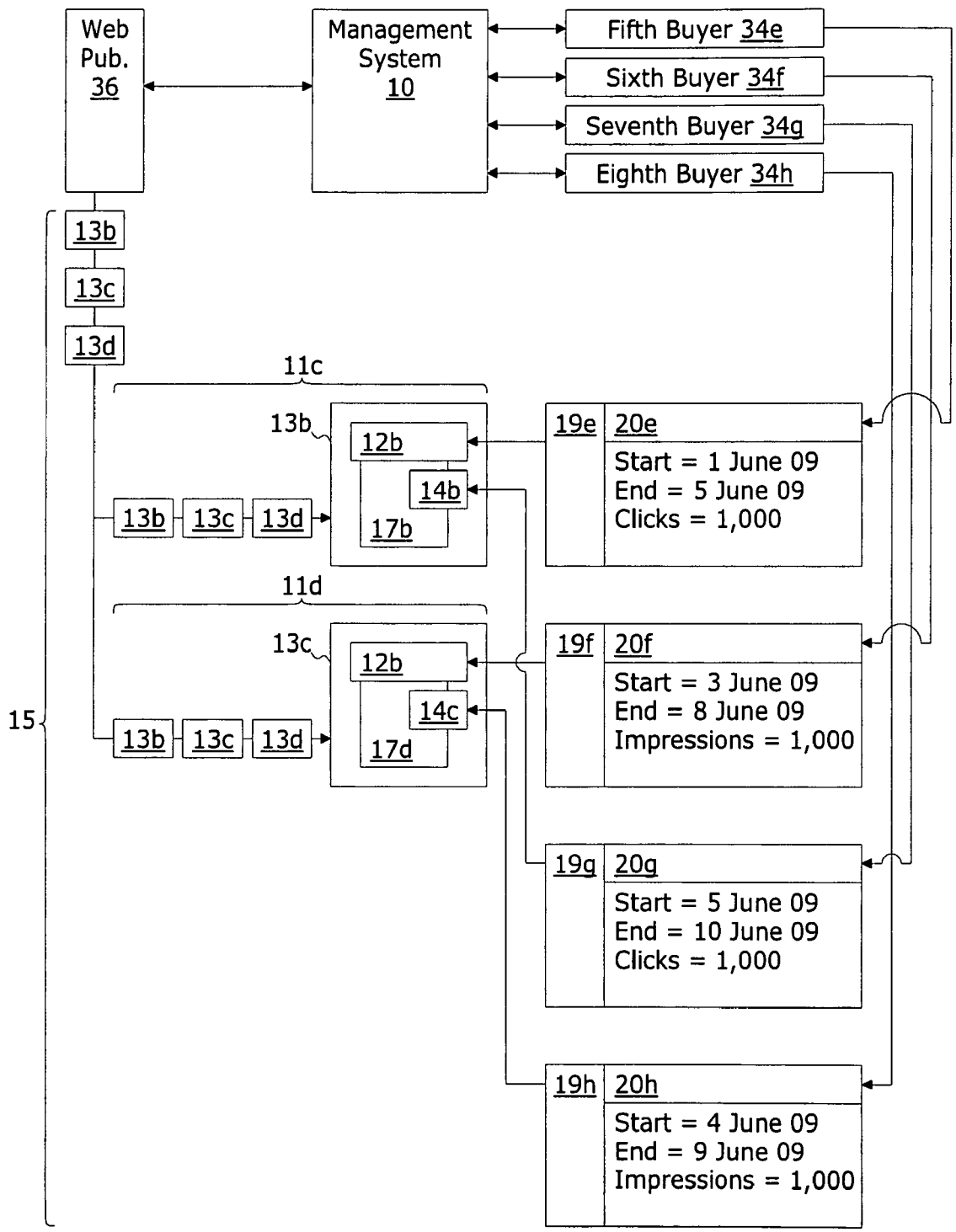
FIG. 5 is a block diagram representing more detailed architecture for implementing a network based system and method for brokering sale of at least a portion of the publisher's inventory of advertisement impressions in accordance with an embodiment of the present invention.

Turning to FIG. 5 in conjunction with FIG. 3, a fifth buyer 34e may purchase a discrete traffic block 20e for advertisement placement 12b within attribute segment 11c which, as discussed, comprises the male attribute segment of page profile group 232b such that each advertisement impression is rendered to a male end user. The discrete traffic block 20e may comprise rendering a volume of 1,000 clicks within advertisement placement 12b (on any of web pages 13b, 13c, or 13d) between 1 Jun. 2009 and 5 Jun. 2009.

Similarly, a sixth buyer 34f may purchase a discrete traffic block 20f for advertisement placement 12b which comprises rendering of 1,000 impressions within advertisement placement 12b (on any of web pages 13b, 13c, or 13d) between 3 Jun. 2009 and 8 Jun. 2009. The discrete traffic block 20f may comprise attribute segment 11d of page profile group 232b which, as discussed, comprises the female attribute segment such that each ad impression is rendered to a female end user.

Similarly, a seventh buyer 34g may purchase a discrete traffic block 20g for advertisement placement 14b which comprises rendering a volume of 1,000 clicks within advertisement placement 14b (on web page 13b) between 5 Jun. 2009 and 10 Jun. 2009. The discrete traffic block 20g may be within attribute segment 11c which, as discussed, comprises the male attribute segment such that each ad impression is rendered to a male end user.

Similarly, an eight buyer 34h may purchase a discrete traffic block 20h for advertisement placement 14c which comprises rendering of 1,000 impressions within advertisement placement 14c (on either web page 13c or 13d) between 4 Jun. 2009 and 9 Jun. 2009. The discrete traffic block 20h may be within attribute segment 11d which, as discussed, comprises the female attribute segment such that each ad impression is rendered to a female end user.

Publisher Data Relationships

Referring to FIG. 6a in conjunction with FIG. 2, the management system 10 may be adapted to maintain within the computer readable media 21 (FIG. 1) exemplary data relationships 84 defining a publisher's ad placements 12, 14, and 16 within its web pages 13, association of each ad placement 12, 14, and 16 with a publisher defined page profile group 232, and association of each ad placement 12, 14, 16 with one or more segments 11 of the page profile group 232.

More specifically, each publisher 36 may be represented by a publisher ID 86 in the exemplary data relationships 84. Associated with each publisher ID 86 (identifying one of multiple publishers 36) may be a plurality ad placements, each represented by a record 680 of an ad placement table 681. Each ad placement, represented by its ad placement ID 93a-93f represents an ad placement 12, 14, 16 within one or more of the publisher's web pages 13. Each ad placement 93 will associate with the URL(s) of the one or more web pages within which the ad placement 12, 14, 16 exists, its size designator 88 defining the size of the ad placement 12, 14, 16, (which may utilize Interactive Advertising Bureau standard sizes), and its position designator 90 defining its position within (or related to) content of the web page(s) 13. Also associated with the ad placement ID 93 will be the page profile group 232 to which the publisher chooses to assign the ad placement.

Figure 6B:
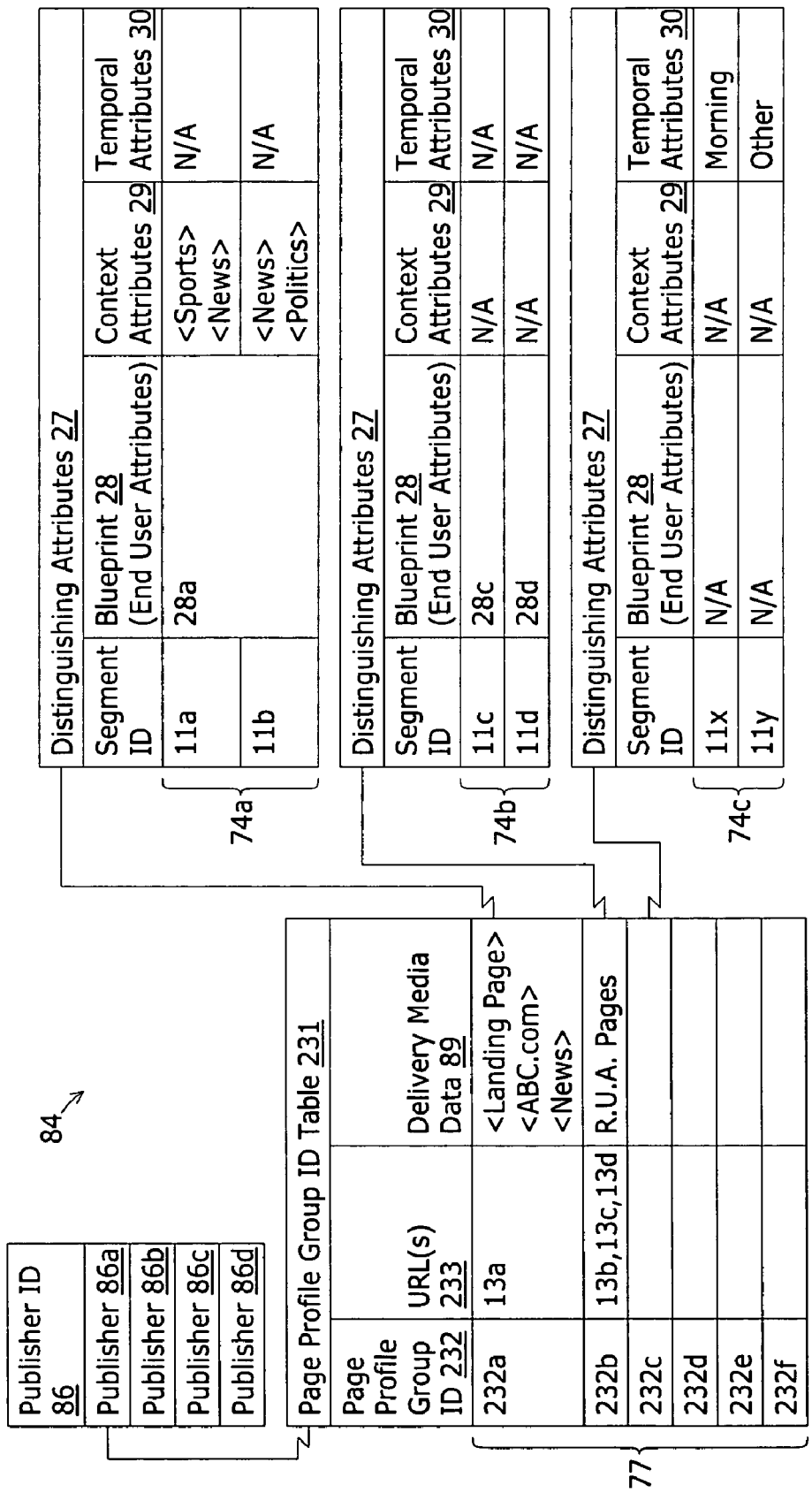
FIG. 6b represents exemplary data structure recording a publisher's segmentation of its inventory of advertisement impressions and recording distinguishing attributes of each segment in accordance with an embodiment of the present invention.

Turning to FIG. 6b, also associated with each publisher ID 86 are the publisher's page profile groups 232—each of which may be represented by a record 77 in a page profile group ID table 231.

Each record 77 associates the page profile group 232 with the URL 233 of each of the web pages 13 included in the page profile group 232. Each record 77 may further associate the page profile group 232 with its delivery media data 89. The delivery media data 89 may include information related to classification of the content (i.e. subject matter) of the web page(s), attributes of the web page(s) 13 (i.e. landing page, accessible only by registration, etc.), branding associated with the web page(s) 13, and other information related to the content of the web page(s) 13 which is useful to a potential buyer assessing whether the published content is sufficiently related to the buyer's potential advertisement for placement to be beneficial.

In an exemplary embodiment, the delivery media data 89 may include a group of content identifier tags defining the content, traffic attributes, and/or branding associated with the web page. The tags may be words within a defined dictionary of text words that may be used for defining such delivery media data 89.

Further associated with each page profile group 232 may be a definition of its segmentation into groups of one or more segments 11 based on distinguishing attributes 27. More specifically, each page profile group 232 may associate with one or more records 74a, 74b, 74c defining its segmentation. Each record 74 associates the segment 11a-11d with its distinguishing attributes 27.

The distinguishing attributes 27 define to who, with what, where, when, or how the impression will be rendered within the ad placement for the particular segment 11.

The distinguishing traffic attributes 27 may include end user attributes 28, temporal attributes 30, and/or contextual attributes 29 which distinguish a segment 11 from other segments.

End user attributes 28 define geographic, demographic, or behavioral attributes of end users for distinguishing the segment 11 from other segments 11 based on a group of such end user attributes 28.

Temporal attributes 30 defining distinct time periods within a larger time cycle during which the advertisement impression will be rendered for distinguishing the segment 11 from other segments 11 based on when the advertisement impression will be rendered (for example a time period within a day, a day within a week, or a time period within a year such as the day after Thanksgiving).

The contextual attributes 29 (which may be key word tags) define subject matter of the publisher's web page (whether static or periodically changing) within which the advertisement impression will be rendered. The contextual attributes may be the delivery media data 89 or a subset of only a portion of the delivery media data 89 for the traffic profile ID 232. Contextual attributes 29 distinguish the segment 11 from other segments 11 based on a contextual segmentation of differing web page content in a situation wherein web page content of a web page 13 is periodically altered between multiple subject matter classifications.

For example, page profile group 232a, which comprises web page 13a, may be contextually segmented into segments 11a and 11b associated with context patterns 29a and 29b respectively as the distinguishing attributes 27. Assuming no further segmentation of the page profile group 232a based on end user attributes, a single traffic attribute blueprint 28a may be associated with both segments 11a and 11b.

Page profile group 232b, which comprises web pages 13b, 13c and 13d, may be segmented based on end user attributes only. As such, traffic attribute blue prints 28c and 28d comprise the distinguishing attributes 27 distinguishing segment 11c from segment 11d.

Page profile group 232c may be segmented based on temporal attributers only distinguishing a segment 11x during which advertisements are rendered during the morning (local time) and segment comprising renderings at all other times.

It should be appreciated that although contextual segments 11a and 11b may be distinguished only by a context pattern 29, such segments may also further be associated with a single (or multiple) traffic attribute blueprint(s) (e.g. a single (or multiple) attribute segment(s)) 28 for purposes of facilitating matching of the context segments 11a and 11b with applicable buyers based on end user traffic attributes.

Further yet, any of such segments may be further segmented based on temporal segmentation. Segmentation may be based on any permutation of end user attributes 28, context attributes 29, and temporal attributes 30.

Referring briefly to FIG. 8 in conjunction with FIG. 6b, for purposes of defining a traffic attribute blue print 28 to distinguish segments by end user attributes, an exemplary embodiment of the system 10 may include a global attribute library 70 which includes a group of attributes 80 that may be used to define a traffic attribute blueprint 28 and distinguish a segment of internet traffic 15 by end user attributes.

The global attribute library 70 may include several thousand, or more, attributes 80, each with an attribute description 72. Examples include: i) geographical attributes such as United States, United Kingdom, regions of the United States such as New England, Mid Atlantic, and South East, and individual states and/or postal codes; ii) demographic attributes may include male/female, age brackets and income brackets; and iii) behavioral attributes (not shown).

Turning to FIG. 9a in conjunction with FIG. 8, an exemplary traffic template 76a may be defined as a selected subset of the end user attribute descriptions (or tags) 72 that are utilized for defining the traffic attribute blue prints 28 which segment the page profile group into multiple attribute segments.

For example, multiple attribute blue prints 28a-28g may be defined utilizing traffic template 76a. Each blue print 28a-28g is uniquely associated with, and defines, end user attributes of an attribute segment 11a-11g—and distinguishes such attribute segment from the other attribute segments. More specifically, each traffic attribute blue print is a unique permutation of end user attributes of the traffic template 76a.

For example, the exemplary traffic template 76a distinguishes segments 11a-11g based on end user-geography location. Such segmentation is useful for one or more web pages 13 for which heavy volume from geographically diverse end users is achieved—and for which other segmentation strategies based on demographic information may not be available.

The traffic template 76a may be based on an attribute subset 80 of the global attribute library 70. A first traffic segment 11a may include a traffic attribute blue print 28a in which attributes of United States and New England are identified as required. Similarly segments 11b through 11f, including traffic attribute blue prints 28b through 28f respectively, each identifying other regions of the United States as the applicable required attributes. Segment 11g includes a traffic attribute blue print 28g with no specified required geography and as such would be a segment that includes all non US end users by virtue of such end user's not being within any of the other segments 11a-11f, each of which requires a specific geography.

As another example, turning to FIG. 9b, an exemplary traffic template 76b comprising selected end user attributes 80 may be used to define traffic attribute blueprints 28a-28f distinguishing segments 11a-11f based on demographic information (e.g. users gender and age). The first segment 11a may include a traffic attribute blue print 28a identifying female end users as a required attribute without further attribute segmentation. Segments 11b through 11f may include traffic attribute blue prints 28b through 28f respectively, each identify male end users as a required attribute—with further segmentation by age group. As such, female end users will be within the first segment 11a, while male end users will be within the proper segment 11b through 11f—based on each segment being limited to an attribute defining a required age classification.

Although the above described examples relate to use of the attribute library 70 for defining end user attributes, it is also envisioned that selected attributes 80 may also include temporal attributes or contextual attributes.

As will be discussed in more detail herein, when an advertisement request is received by an order fulfillment system 40 (FIG. 13), the request may include a placement ID identifying the web page (i.e. URL) and an advertisement placement within the web page. The request may further include request attribute data identifying attributes know about to who, with what, where, when or how the advertisement content returned in response to the impression will be rendered. Such request attribute data may include end user attributes known about the end user to which the web page 13 will be rendered (i.e. geographic, demographic or behavioral attributes known about the end user), contextual attributes of the publisher's web page, and temporal attributes such as the time (in local time zone) in which the impression will be rendered.

As will be discussed, a segment determination system 53 of the order fulfillment system 40 may match the attribute data (inclusive of the request attribute data) to distinguishing attributes of the segments of the page profile group to which the ad placement is assigned to identify the traffic segment to which the request most closely, or exactly matches. The order fulfillment system 40 will then serve advertisement content of an active traffic block (e.g. an open advertisement order) for such identified traffic segment 11.

Figure 10:
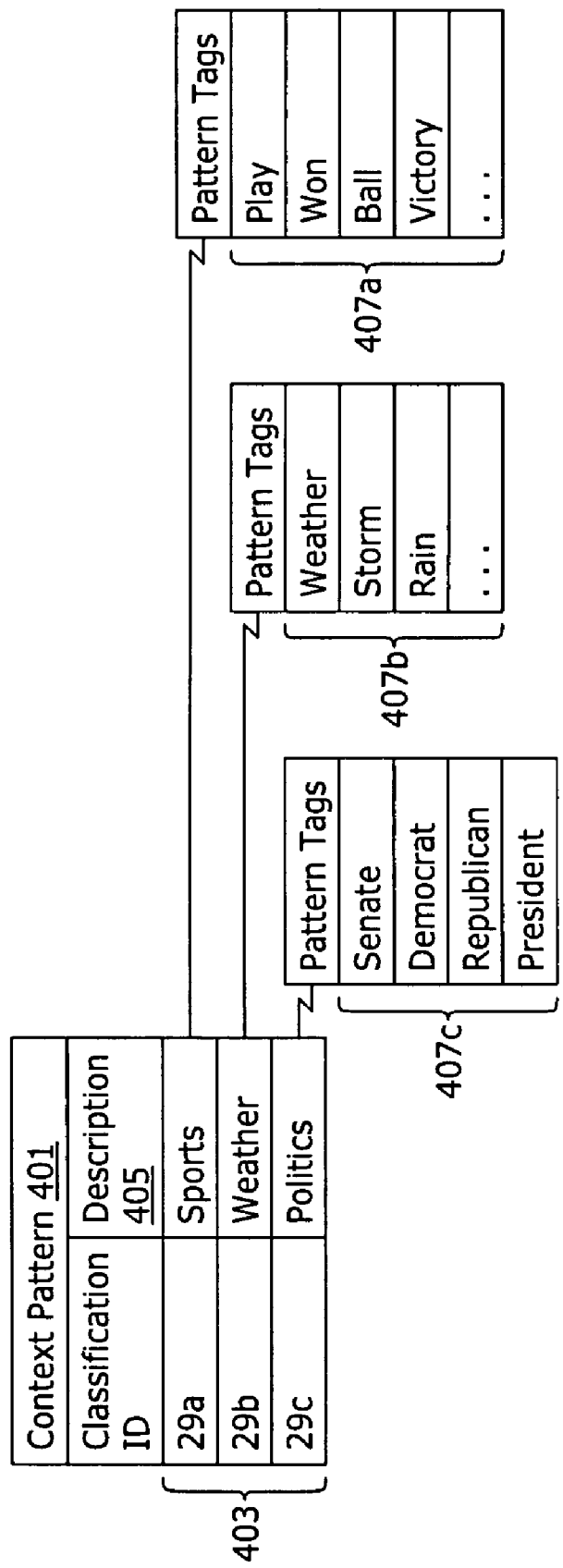
FIG. 10 is a data structure representing contextual segmentation patterns in accordance with an exemplary embodiment of the present invention.

Turning to FIG. 10 in conjunction with FIG. 6b and FIG. 2, exemplary contextual attributes or context classifications 29a-29c for distinguishing contextual segments 11 are represented. In the exemplary embodiment, each of a plurality of context classifications, represented by a context classification ID 29a, 29b, and 29c, may be recorded, for example, as a record 403 of a context pattern table 401. Each context classification ID 29a, 29b, and 29c may associate with: i) a context description 405 describing a particular classification of potential web page published content such as sports, weather, or politics; and ii) classification data, unique to the classification, useful for determining whether content of a web page matches or corresponds to the context classification, and distinguishing the published content from other classifications.

In one embodiment, such classification data may be a set of pattern tags 407a, 407b, and 407c. Preferably the pattern tags 407 represent words unique to or utilized more frequently in content within the context classification than content of other context classifications. As will be discussed in more detail herein, the order fulfillment system 40 (FIG. 13) may include a context determination system 47 for periodically accessing the publisher's web site to obtain web content for purposes of determining, if the web content periodically changes, its then current context classification.

Turning to FIG. 6c in conjunction with FIG. 2, the data relationships 84 may further include publisher defined segmented ad placements of each advertisement placement 93 utilizing, for example, a segmented ad placement table 92. More specifically, each of a plurality of records 409 may represent a segmented ad placement 95 and include: i) identification of the ad placement (by ad placement ID 93); ii) identification of a group of one or more segments 11 of a page profile group 232 grouped to form the segmented ad placement 95; and iii) inventory statistics 94.

The inventory statistics 94 may include values representative of the traffic for the segmented ad placement 95 such as: i) expected quantity of impressions per period of time (e.g. expected impressions per day); ii) historical quantity of impressions per period of time (e.g. historical impressions per day); iii) estimated yield factor (e.g. an estimated ratio of quantity of clicks per 1000 impressions); and iv) historical yield factor (e.g. a ratio of historical quantity of clicks per 1000 impressions).

Figure 13:
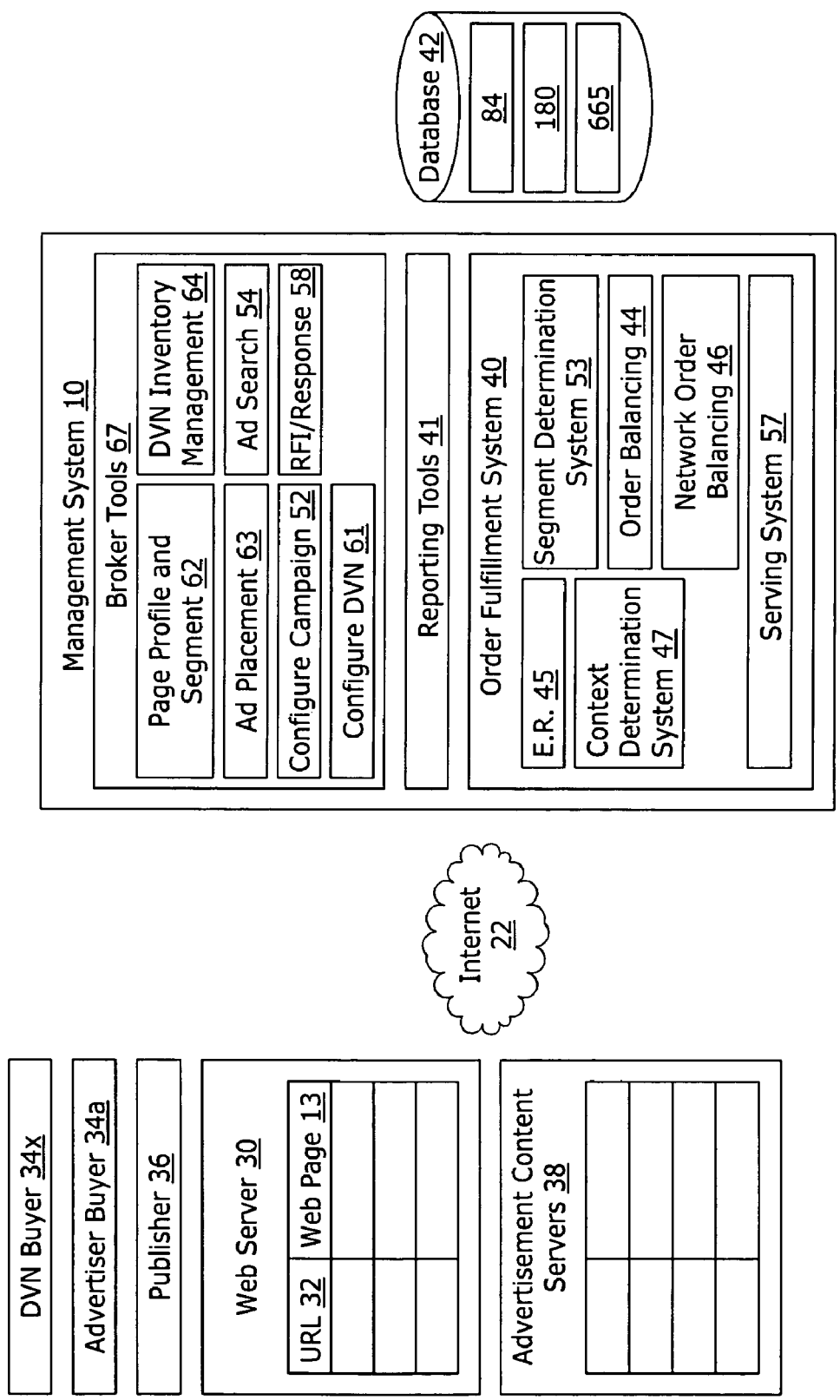
FIG. 13 is a block diagram representing exemplary architecture for implementing a network based system and method for brokering at least a portion of the publisher's inventory of advertisement impressions in accordance with an embodiment of the present invention.

The historical data may be tracked and accumulated by the order fulfillment system 40 (FIG. 13). Further, when a segmented ad placement 95 is first defined, initial historical data may be determined: i) based on historical data from similar web pages/segmented ad placements of the publisher; and/or ii) the web pages/segmented ad placements of the publisher which are replaced by the newly defined segmented ad placement.

Turning to FIG. 7 the data relationships 84 may further include information related to the publisher's sale or commitment of each segmented ad placement 95 as a discrete traffic block. For purposes of clarity each sold or committed discrete traffic block may be referred to as an advertisement order 20 and may be represented by a record 650 of an advertisement orders table 652.

The record 650 associates the advertisement order 20 with: i) the segmented ad placement ID 95 (which as discussed with respect to FIG. 6c represents an ad placement ID 93 and one or more segments of the traffic profile group 232 associated with the ad placement ID 93), ii) a buyer ID 34 identifying the buyer (whether an advertiser buyer 34a, 34b, 34c or a DVN buyer 34x, 34y, 34z) purchasing the advertisement order 20, and iii) a content ID 654 identifying, if the advertisement order 20 is purchased by an advertiser buyer 34a, 34b, 34c, the advertisement content to be rendered within the ad placement for purposes of fulfilling the advertisement order 20.

Also associated with the advertisement order 20 are definition of the advertisement order 20 in terms of its duration 96 (i.e. a start time 96a and an end time 96b defining the time period during which the volume of saleable events included in the traffic block will be delivered) and its volume 101 (e.g. a volume of saleable events such as clicks 101a, impressions 101b, or other saleable events 101c included in the advertisement order 20).

Further associated with the advertisement order 20 may be fulfillment fields 104 for tracking order fulfillment. The fulfillment fields 104 may include identification of the actual quantity of saleable events delivered against the advertisement order 20. For example, if the quantity of saleable events is defined in terms of clicks, fulfillment may be tracked in terms of the actual quantity of clicks 104a, if the quantity of saleable events is defined in terms of impressions, fulfillment may be tracked in terms of the actual quantity of impressions 104b, and if the quantity of saleable events is defined in terms of other saleable events, fulfillment may be tracked in terms such other saleable events 104c.

Such information will be updated by the order fulfillment system 40 (FIG. 13) each time an impression is delivered and/or a click-through or other saleable event achieved, against the advertisement order 20.

As is noted, and depicted in FIG. 4 and FIG. 5, multiple advertisement orders 20 may be sold for a single segmented ad placement 95—with concurrent (e.g. at least partially overlapping) active time periods for fulfillment. It is preferable that the multiple advertisement orders 20 sold for any segmented ad placement 95 include volumes such that impressions required for fulfillment of all discrete traffic blocks for any particular time period does not exceed the inventory of impressions expected to be available during that duration of time. For example, it would be disadvantageous to sell multiple advertisement orders 20 that, in the aggregate require an inventory of 20,000 impressions on a certain day when the expected quantity of impressions on such certain day is only 15,000.

It is envisioned that advertisement orders 20 may be sold by auction and/or a request for inventory process as described in U.S. patent application Ser. No. 11/893,976 filed on Aug. 18, 2007 and U.S. patent application Ser. No. 12/150,320 filed on Apr. 26, 2008 (both such applications are assigned to the same assignee as the present invention and the contents of both such applications is hereby incorporated herein by reference) and further by way of the processes described herein.

Data Relationships—Buyer Campaigns

Figure 11:
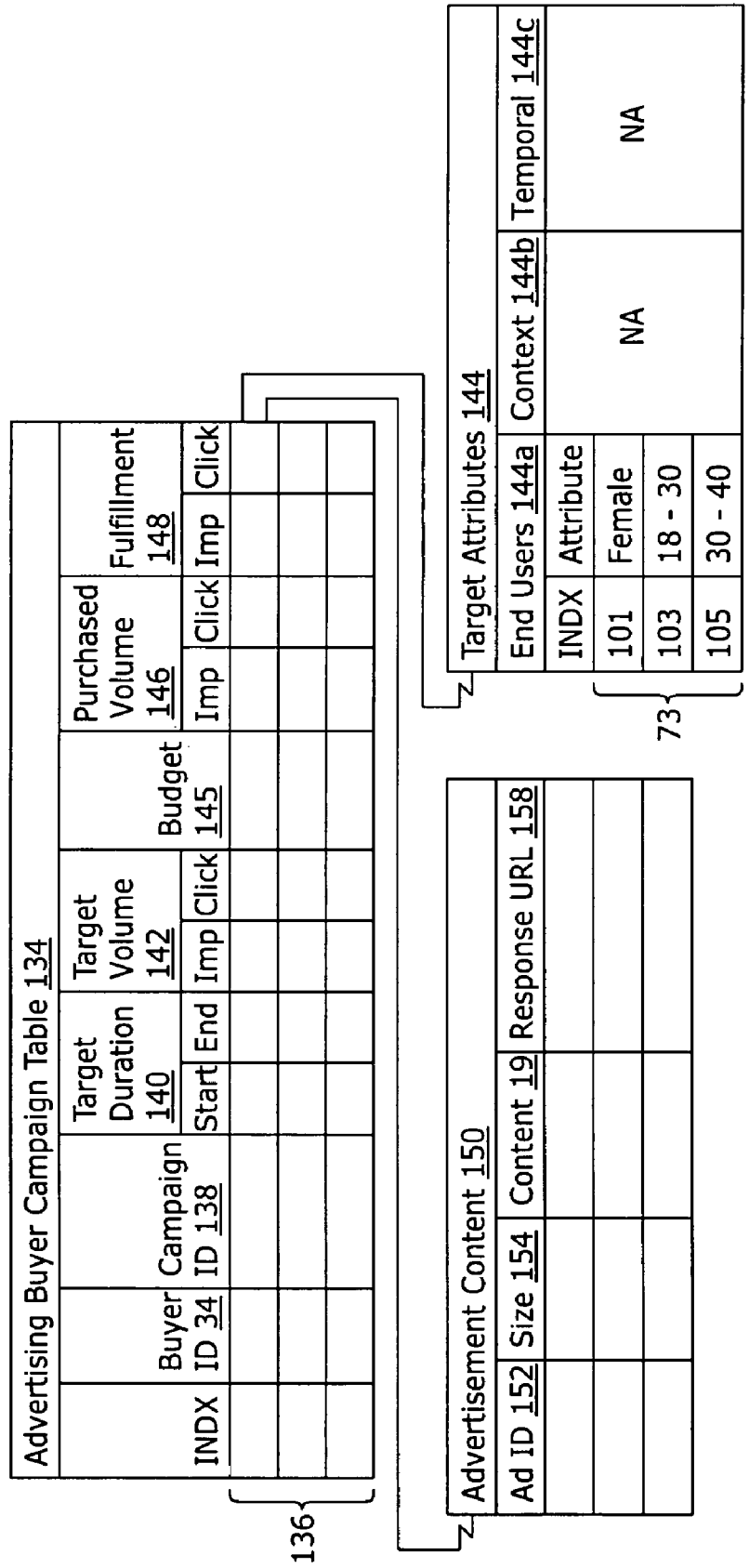
FIG. 11 is a diagram representing exemplary data structure recording data associated with a buyer's advertising campaign in accordance with an embodiment of the present invention.

Turning to FIG. 11, to facilitate the sale of advertisement orders 20 directly to advertisement buyers 34a, 34b, 34c, the system 10 may be adapted to maintain data relationships 180 within the computer readable media 21 (FIG. 1) related to a buyer's advertising campaign. A buyer's advertising campaign may be represented, at least in part, by a record 136 of a campaign table 134 and identified by a campaign ID number 138.

The record 136 associates identification of the buyer 34, a buyer defined campaign target duration 140 (including a target start date and a target end date), a target volume of saleable events 142 (which may be a target volume of impressions, a target volume of clicks, or a target volume of other saleable events or user action, for example user completion of a lead generation form), and a target advertising budget 145.

Throughout the campaign, broker tools 67 (FIG. 13) may populate additional campaign parameter data to the campaign table 134 such as: i) purchased volume data 146—for example data representing the quantity of impressions, clicks, or other saleable events purchased as discrete traffic blocks 20; and ii) fulfillment data 148 representing the actual volume—for example quantity of impressions, clicks or other saleable events delivered in fulfillment of the discrete traffic blocks (or as filler advertisements). These values may be updated by the order fulfillment system 40 (FIG. 13) when the buyer purchases a discrete traffic block and updated as volume is delivered—for example by advertisement content being placed as an impression and/or "clicks" are recorded.

Also associated with the campaign ID 138 are its target end user attributes 144. The target end user attributes 144 define to who, with what, where, when, or how the advertiser desires advertisement impressions to be rendered for fulfillment of its advertisement campaign. More specifically, the target end user attributes 144 may include end user attributes 144*a*, temporal attributes 144*c*, and/or contextual attributes 144*b*. Target end user attributes 144*a* define geographic, demographic, or behavioral attributes of end users to which the advertiser desires its content to be rendered. Target temporal attributes 144*c* define distinct time periods within a larger time cycle during which the advertiser may desire its content to be rendered. The contextual attributes 144*b* define subject matter of the publisher's web page (whether static or periodically changing) desirable to the DVN.

Turning briefly to FIG. 8 in conjunction with FIG. 11, the target end user attributes 144*a* (or even the target temporal attributes 144*c* or the target contextual attributes 144*b*) may comprise identification of a subset of attribute descriptions 80, from the attribute library 70, which the buyer desires in end users to which its advertisement content will be delivered. Such target end user attributes 144 may be utilized for searching and/or identifying those segmented ad placements 95 (FIG. 6*c*) with the traffic attributes which are the same or similar to the target end user attributes 144—for purposes of assuring that any purchased advertisement order is for a segmented ad placement with attributes that correspond to the target end user attributes 144.

Also associated with the campaign are the buyer's defined advertisement content in one or more rendering formats. The exemplary ad content table 150 includes records for one or more instances of buyer's creative advertisement content (i.e. graphic images or other advertisement material) that the buyer may define, create, upload, or otherwise associate with an advertisement campaign. Each record associates ad identification 152 with identification of its size 154 (again, for example, utilizing an Interactive Advertisement Bureau standard size), the creative content 19 (e.g. the image, video, or other creative rendering content that will be rendered with the web page content 13), and a response URL 158 which identifies the URL of the advertiser's web page to which the advertiser desires a user to be directed upon clicking the advertisement impression (i.e. the landing page). The size 154 may also be utilized for searching and/or matching of discrete traffic blocks to the advertisement campaign for purposes of assuring that any purchased discrete traffic block includes an advertisement placement matching the required size 154 of the buyer's creative content 19.

DVN client Data Relationships

Figure 12:
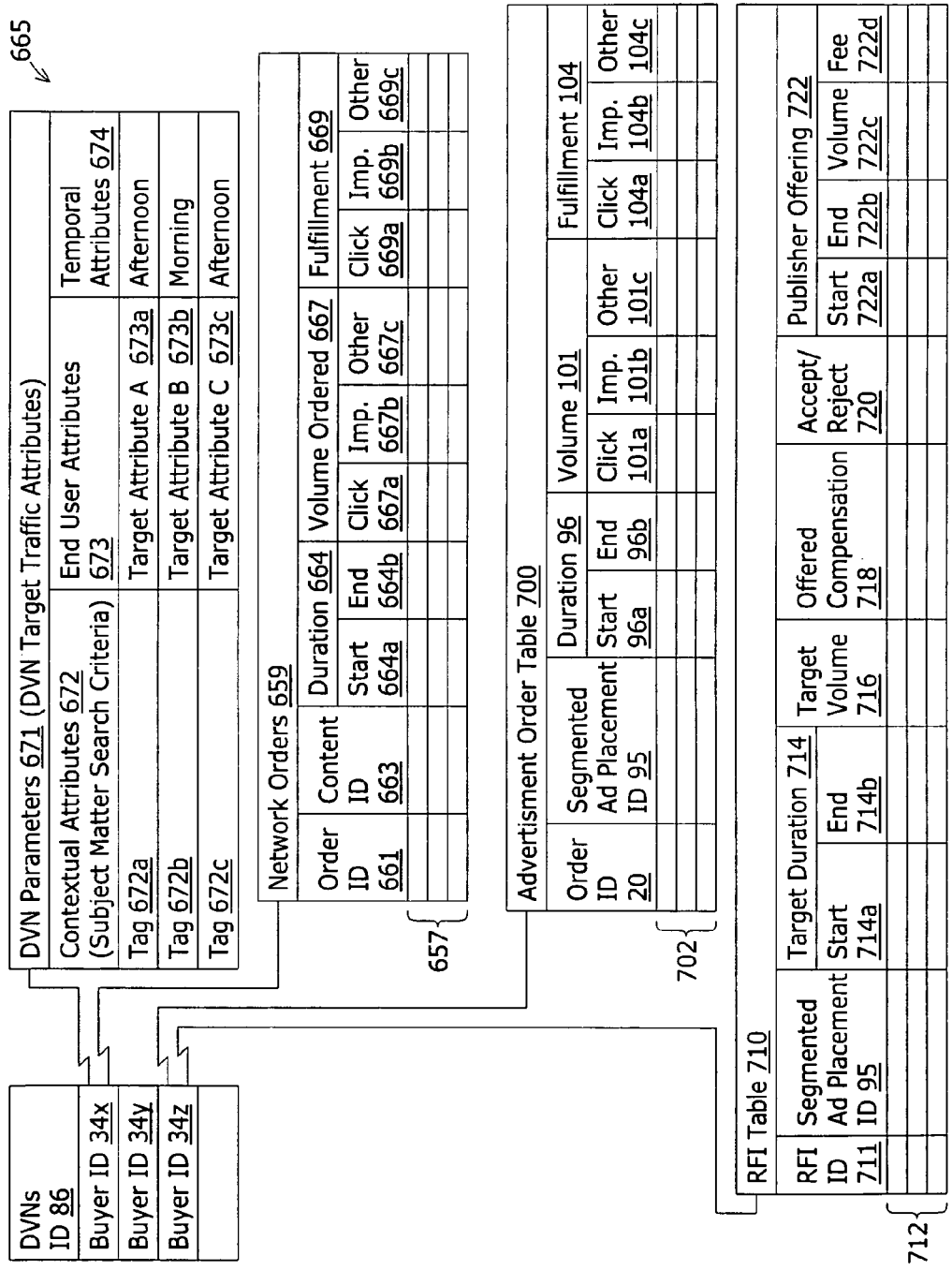
FIG. 12 is a diagram representing exemplary data structure recording data associated with a DVN in accordance with an embodiment of the present invention.

Referring to FIG. 12, to facilitate the sale and fulfillment of advertisement orders 20 through DVNs, the system 10 may be further adapted to maintain within the computer readable media 21 (FIG. 21*a*) data relationships 665 (FIG. 12) related each DVN buyer 34*x*, 34*y*, 34*z*, each DVN buyer's solicitation and purchase of advertisement orders 20, network orders for advertisements placed with the DVN by its clients; and actual fulfillment of the advertisement orders 20 and the network orders.

More specifically, each DVN buyer 34*x*, 34*y*, 34*z*, may be associated with: i) its network orders 661—each represented by a record 657 of a network orders table 659; ii) its purchased advertisement orders 20—each represented by a record 702 of an advertisement orders table 700; iii) its invitations 711 to publishers to commit inventory to the DVN—each represented by a record 712 in an invitations table 710; and iv) DVN parameters 671 (i.e. DVN target traffic attributes) including subject matter criteria 672 (i.e. contextual attributes), end user attributes 673, and, in certain circumstances, temporal attributes 674 utilized by the DVN for locating publishers with applicable segmented ad placements which conform to DVN target traffic attributes inclusive of the subject matter, end user attribute, and temporal objectives of the DVN. Such attributes are represented by fields and/or records of a DVN parameters table 671. Further, such table, or sub tables (not shown) may represent different, mutually exclusive, groups of DVN target traffic attributes as search criteria sets. For example, one record of the table 671 may represent a search criteria set with DVN target traffic attributes of a first set of contextual attributes 672*a*, a first set of end user attributes 672*b*, and a first temporal attribute 674 such as morning. A second search criteria set may include the same contextual attributes and end user attributes but include a temporal attribute of afternoon. As such, the two different search criteria sets may be used for developing inventory for the morning versus the afternoon with otherwise the same search criteria. Similarly, differing search criteria set may include open temporal parameters, matching contextual attributes, but differing end user attributes (for example differing by gender) for purposes of developing inventory of impressions for delivery to a specific gender of end users.

Each network order 661 may include: i) a content identifier 663 identifying the advertisers creative content for rendering in fulfillment of the network order 661; its duration 664 (i.e. a start time 664*a* and an end time 664*b* defining the time period during which the volume of saleable events included in the network order will be delivered) and its volume 667 (e.g. volume saleable events such as a quantity of clicks 667*a*, impressions 667*b*, or other saleable events 667*c*).

Further associated with the network order 661 may be fulfillment fields 669 for tracking order fulfillment. The fulfillment fields 669 may include identification of the actual quantity of saleable events delivered against the network order 661. For example, if the quantity of saleable events is defined in terms of clicks, fulfillment may be tracked in terms of the actual quantity of clicks 669*a*, if the quantity of saleable events is defined in terms of impressions, fulfillment may be tracked in terms the actual quantity of impressions 669*b*, and if the quantity of saleable events is defined in terms of other saleable events, fulfillment may be tracked in terms such other saleable events 669*c*.

Each advertisement order 20 is associated with: i) the segmented ad placement ID 95 (which, as discussed with respect to FIG. 6*c*, represents an ad placement ID 93 and one or more segments of the traffic profile group 232 associated with the ad placement ID 93), ii) the duration 96 of the advertisement order 20 (i.e. a start time 96*a* and an end time 96*b* defining the time period during which the volume of saleable events included in the advertisement order will be delivered); iii) its volume 101 (e.g. saleable events such as a quantity of clicks

101*a*, a quantity of impressions 101*b*, or a quantity of other saleable events 101*c*); and iv) its fulfillment 104 (i.e. the actual quantity of saleable events delivered against the advertisement order 20 in terms of the actual quantity of clicks 104*a*, impressions 104*b*, or other saleable events 104*c*).

It should be appreciated that all information of the advertisement order table 700 is also embodied in the advertisement orders table 652 of FIG. 7. Those skilled in the art will recognize that only a single such data store is needed. The representation of advertisement orders purchased by a specific DVN (i.e. table 700) is for purposes of facilitation description of an embodiment of the present invention.

A request for inventory table 710 associates each request for inventory 711. (represented by a record 712 of the request for inventory table 710) with identification of the segmented ad placement 95 requested by the DVN; ii) a target duration 714 for the requested inventory (i.e. a target start time 714*a* and a target end time 714*b*); iii) a target volume 716 (typically in terms of a target quantity of impressions to be delivered during the target duration 714); and iv) offered compensation 718 for the proposed target volume 716 during the target duration 714 if the DVN is proposing a specific compensation versus requesting a price quote from the publisher.

Each request for inventory 711 may also be associated with an indication of whether the publisher accepted/rejected 720 the request and publisher offering information 722. The publisher offering may include a proposed duration in the form of a proposed start time 722*a*, a proposed end time 722*b*, a proposed volume 722*c* and a proposed fee 722*d*.

It should be appreciated that the publisher offering information 722 is useful for either: i) the publisher providing a quote/fee for a request for inventory 711 in an embodiment where the DVN does not propose compensation; and ii) the publisher providing a counter offer in the event the publisher does not accept a request for inventory (including compensation) proposed by the DVN.

The DVN parameters 671 include subject matter criteria 672 and end user attribute criteria 673 which are utilized by the DVN for locating publishers with applicable segmented ad placements which conform to the subject matter and/or end user attribute objectives of the DVN—each represented by fields and/or records of a DVN parameters table 671.

More specifically, the subject matter criteria 672 may be a group of tags 672*a*, 672*b*, 672*c* (i.e. key word tags) representing the subject matter objectives of the DVN 34. Similarly, the end user attribute objectives 673 may be identification of certain attributes 80 from the attribute library 70 (FIG. 8) representing attributes of end users to which the DVN desires to render advertisement impressions.

Operation

Turning to FIG. 13, for purposes of brokering the sale of advertisement orders for segmented ad placements, the management system 10 may be coupled to the Internet 22 and operate as a web server for interacting with at least one advertiser buyer 34*a*, at least one DVN buyer 34*x*, and at least one publisher 36.

For purposes of interacting with the management system 10, the advertiser buyer 34*a* may comprise a computer system operating a traditional web browser (encoded on computer readable media therein) through which an advertiser buyer has accessed the management system 10 through an advertiser buyer account (e.g. logged on using defined advertiser buyer credentials such as a user name and password stored in a user credential data store (not shown) encoded on the computer readable media 21 (FIG. 1)).

Similarly, the DVN buyer 34*x* may comprise a computer system operating a traditional web browser (encoded on computer readable media therein) through which a DVN buyer has accessed the management system 10 through a DVN buyer account (e.g. logged on using defined DVN buyer credentials such as a user name and password stored in the user credential data store (not shown) encoded on the computer readable media 21 (FIG. 1)).

Similarly, the publisher 36 may comprise a computer system operating a traditional web browser (encoded on computer readable media therein) through which a publisher has accessed the management system 10 through a publisher account (e.g. logged on using defined publisher credentials such as a user name and password stored in the user credential data store (not shown) encoded on the computer readable media 21 (FIG. 1)).

The management system 10 may comprise a database application 42 encoded to the computer readable medium 21 (FIG. 1) wherein the database application 42 is adapted to store data representing the data relationships 84, 180, and 665 discussed with respect to FIGS. 6, 7, 11, and 12. The management system 10 may further include the broker tools 670, an order fulfillment system 40, and reporting tools 41 encoded within the computer readable medium 21 wherein such tools are adapted to provide, when executed by the processor 12, the functions described herein.

Broker Tools

In general, the broker tools 670 include work flows adapted to perform various tasks associated with brokering the sale of advertisement orders for segmented ad placements between the publishers 36, the advertiser buyers 34*a*, 34*b*, 34*c* and the DVN buyers 34*x*, 34*y*, 34*z*.

With respect to each publisher, the work flows are adapted to perform tasks inclusive of: i) defining advertisement placements within one or more web pages of the publisher's web site; ii) defining page profile groups; iii) segmenting the publisher's page profile groups into one or more segments; and iv) associating each advertisement placement with a page profile group and one or more segments to develop a saleable inventory of advertisement impressions; and v) negotiating the commitment of a discrete traffic block/advertisement order to a buyer in response to a request for inventory.

With respect to each advertiser buyer, the work flows are adapted to perform various tasks associated with: i) defining an advertisement campaign; ii) searching advertisement placements by matching campaign criteria with publisher's web content and traffic attributes, and iii) generating a request for inventory to solicit a publisher to proposer/commit a discrete traffic block/advertisement order in response thereto and negotiating the commitment of such discrete traffic block/advertisement order.

With respect to each DVN buyer, the work flows are adapted to perform various tasks associated with: i) defining a DVN parameters (subject matter criteria and end user attribute criteria); ii) managing DVN inventory (i.e. maintain a proper supply of available inventory for fulfillment of network orders) iii) searching advertisement placements by matching DVN parameters with publisher's web content and traffic attributes, and iv) generating a request for inventory to solicit a publisher to propose/commit a discrete traffic block/ advertisement order in response thereto and negotiating the commitment of such discrete traffic block/advertisement order.

The broker tools 670 may comprise a page profile and segmentation tool 62, an ad placement tool 63, a configure campaign tool 52, a configure DVN tool 61, a DVN inventory management tool 63, an ad placement search tool 54, request for inventory (RFI) and response tools 58.

Page Profile and Segmentation

In an exemplary aspect, the page profile and segmentation tool 62 is adapted to provide web pages for implementing a workflow to obtain a publisher's page profile grouping of one or more web pages(s) 13 into a defined page profile group and the publisher's segmentation of each page profile group into one or more segments.

Figure 14:
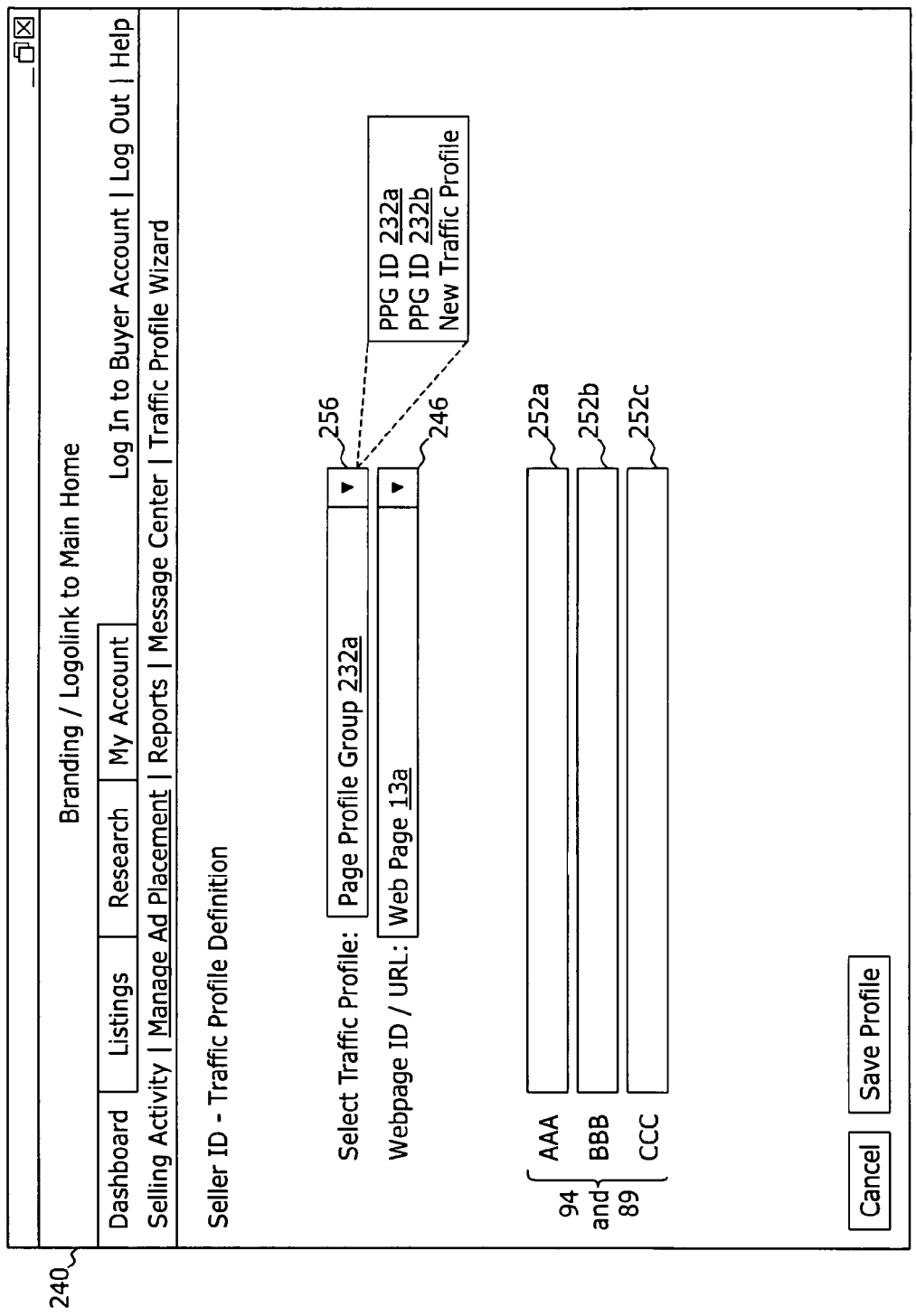
FIG. 14 is a web page diagram representing an exemplary Web page useful for obtaining a publisher's grouping of web pages within page profile groups in accordance with an embodiment of the present invention.

FIG. 14 represents an exemplary web page 240 that may be stored as a template in the computer readable media 21 (FIG. 1) and accessible by the page profile and segmentation tool 62. The page profile and segmentation tool 62 may be adapted to utilize the template to generate the web page 240 for, amongst other processes, obtaining the publisher's page profile grouping.

For purposes of defining a page profile group 232, the web page 240 may include a page profile group ID control 256, which may be a drop down menu, adapted to list existing page profile groups associated with the publisher (for example 232a and 232b as discussed with respect to FIG. 3) as well as a menu choice for defining a new page profile group. The list of existing page profile groups may be generated by the tool by reading existing page profile groups 232 associated with the publisher from the page profile group ID data store 231 (FIG. 6b).

The web page 240 further includes a web page ID control 246, which also may comprise a text box adapted to: i) display web pages 13 within the page profile group identified in the page profile group ID control 256; and ii) obtain user identification of web page(s) 13 for inclusion in the page profile group. Such identification and selection may be by way of identifying the URL of the web page or other identification of the publisher's traffic 15.

Various controls 252a-252c are adapted to obtain user input of, election of, or identification of various delivery media data 89 for the page profile group and/or inventory statistics 94 for the page profile group and segments thereof.

As discussed, delivery media data 89 may comprise information in the form of text tags related to attributes of the web page(s) 13, branding associated with the web page(s) 13, and other information related to the content of the web page(s) 13 which is useful to a potential buyer assessing whether the published content is sufficiently related to the buyer's potential advertisement for placement to be beneficial.

The inventory statistics 94 may include values such as: i) expected quantity of renderings of web pages within the page profile group and/or segment per period of time (e.g. expected "hits" per day); ii) historical quantity of renderings per period of time (e.g. historical hits per day); iii) estimated conversion factor for advertisement placements (e.g. an estimated ratio of quantity of clicks per 1000 impressions); and iv) historical conversion factor for advertisement placements (e.g. historical ratio of quantity of clicks per 1000 impressions).

As such, the tool 62 for purposes of obtaining delivery media data, the tool 62 may provide a selection (i.e. drop down menu) of text tags from a library of text tags that may be used to define the delivery media data for selection by the user; or provide for free form entry of text tags by the user.

For purposes of obtaining inventory statistics 94, the tool 62 may provide a selection (i.e. drop down menu) identifying inventory statistics 94 from historical data maintained by the order fulfillment system; or profile for free form entry of inventory statistics.

For each control, the web page 240 includes code adapted to post the publisher provided page profile group information, delivery media data, and inventory statistics back to the tool 62—which in turn may write the posted information to the appropriate records of the tables discussed with respect to FIGS. 6a, 6b, 6c.

More specifically, referring to FIG. 14 in conjunction with FIG. 6b and FIG. 13, upon the web page 240 posting a newly created page profile group, or a revision to a page profile group (inclusive of a page profile group ID and identification of web pages 13 included in the page profile group), back to the system 10, the page profile and segmentation tool 62 may be adapted to write such page profile group data to a record 77 (or update a record 77) of the page profile group table 231.

Figure 15:
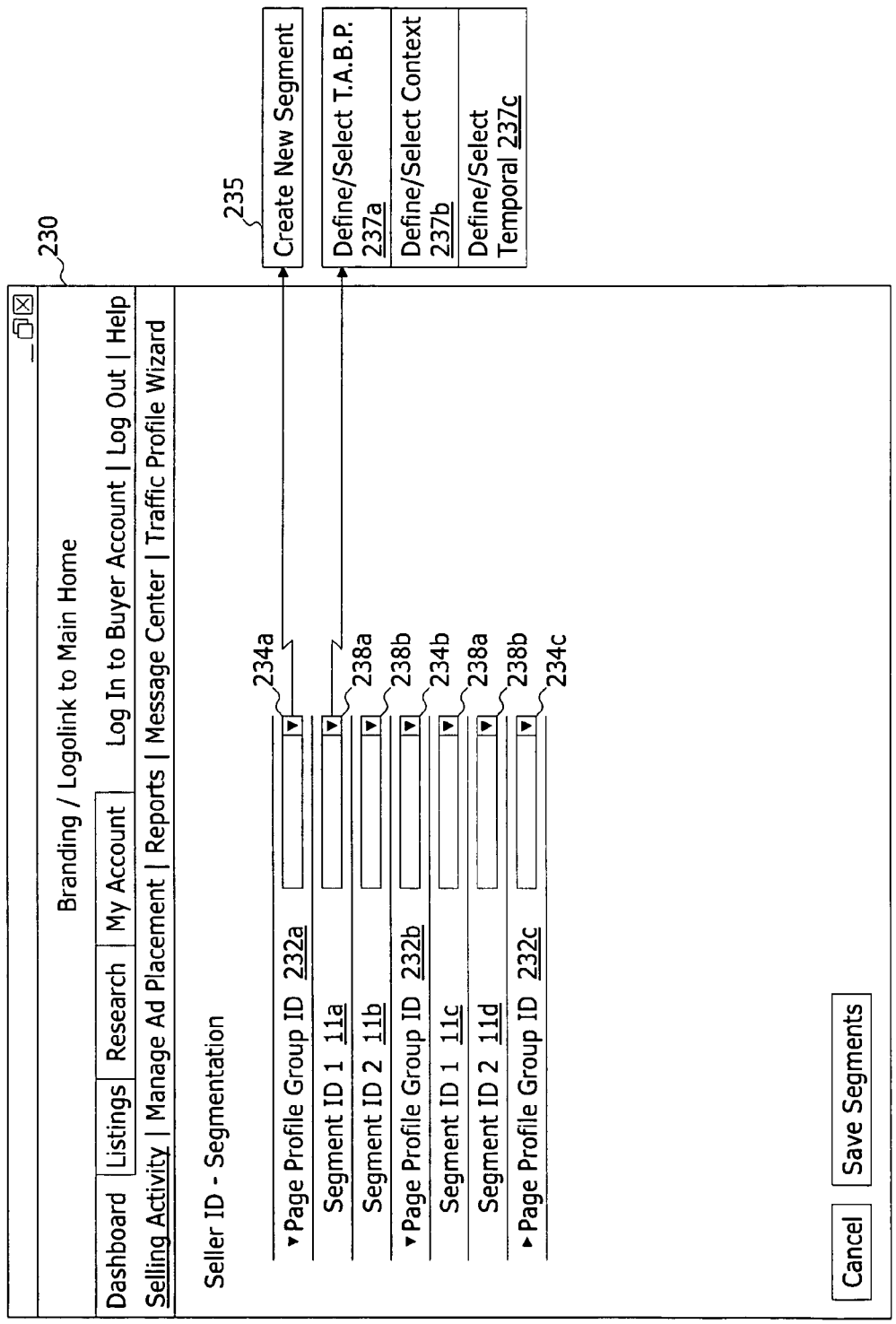
FIG. 15 is a web page diagram representing an exemplary web page useful for obtaining a publisher's segmentation of its page profile groups by combinations of context and attributes in accordance with an embodiment of the present invention.

FIG. 15 represents an exemplary web page 230 that may be stored as a template in the computer readable media 21 (FIG. 1) and accessible by the page profile and segmentation tool 62. The page profile and segmentation tool 62 may be adapted to utilize the template to generate the web page 230 for, amongst other processes: i) obtaining publisher segmentation of the publisher's page profile groups 232 by end user attributes, contextual attributes and/or temporal attributes; and ii) defining distinguishing attributes for each segment.

The web page 230 may include a listing of the publisher's defined page profile group IDs 232a, 232b, and 232c as recorded in the page profile groups table 231 (FIG. 6b) and extracted there from by the tool 62. Associated with the page profile group ID 232a, 232b, and 232c may be a drop down menu control 234a, 234b, and 234c which, as shown for control 234a, includes a selection 235 which is adapted to obtain the publishers 36 identification of a new traffic segment 11 for the page profile group 232.

The web page 230 may be adapted to, upon creation/identification of a new segment, display the identification of the new segment, by segment ID 11a, 11b, 11c, 11d below the applicable page profile group ID 232. Associated with each segment may be a drop down menu control 238a, 238b which, as shown for control 238a includes a selection control 237a which is adapted to obtain the publisher's 36 selection and/or definition of a traffic attribute blue print 28, selection control 237b which is adapted to obtain the publisher's 36 selection and/or definition of a contextual attributes 29 (FIG. 6b), and/or selection control 237c which is adapted to obtain the publisher's selection and/or definition of temporal attributes—in each case, to distinguish such segment from remaining traffic within the page profile group 232.

In an exemplary embodiment, upon selection of 237b, a list of the tags describing the delivery media data 89 for the page profile group may be displayed for user selection of a subset of the tags for definition of the segment—with two segments being distinguished by mutually exclusive subsets of the key word tags of the delivery media data 89/

In an exemplary embodiment, upon selection of 237a, a list of defined traffic attribute blue prints 28 that may already be associated with the publisher or the publisher's page profile group (as described with respect to FIG. 9a and FIG. 9b) may be made available for selection. Upon selection of 237b, a list of defined context patterns 29 which may already be associated with the publisher or the publisher's page profile group (as described with respect to FIG. 10) may be made available for selection. Upon user selection, the segmentation is posted back to the traffic block definition tool 62 such that applicable records may be written within tables implementing the data relationships 84 discussed with respect to FIG. 6b.

As a first alternative, if existing traffic attribute blue prints 28 or defined context patterns 29 are not applicable to the publisher's desired segmentation, the tool 62 may provide a web document object adapted to obtain user definition of a new traffic attribute blue print 28 and/or a new context pattern 29.

As a second alternative, the traffic block definition tool 62 may be adapted to offer a suggested segmentation strategy intended to optimize yield on the sale of segmented ad placements within the page profile group based on historical traffic patterns of both the page profile group and other similar web sites with similar traffic profiles.

Ad Placement Tool

Returning to FIG. 13 in conjunction with FIG. 2, the advertisement placement tool 63 may be adapted to provide web pages for implementing a work flow to obtain a publisher's 36 definition of its advertisement placements within one or more of its web pages—such as advertisement placements 12, 14, 16 within web page 13a of page profile group 232a.

Figure 16:
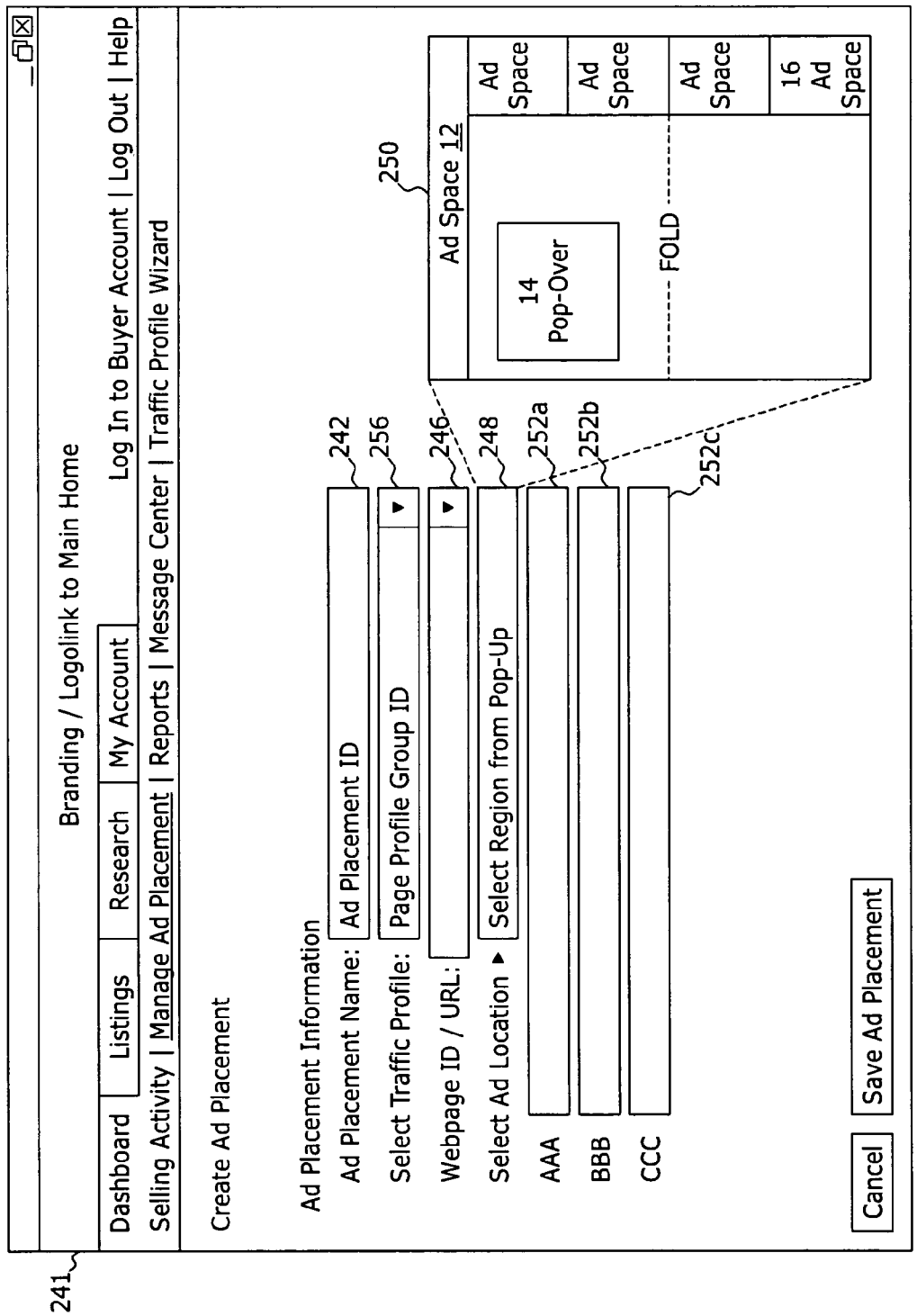
FIG. 16 is a web page diagram representing an exemplary web page useful for obtaining a publisher's definition of an advertisement placement in accordance with an exemplary embodiment of the present invention.

FIG. 16 represents an exemplary web page 241 that may be stored as a template in the computer readable media 21 (FIG. 1) and ad placement tool 63. The ad placement tool 63 may be adapted to utilize the template to generate the web page 241 for, amongst other processes, obtaining the publisher's definition of an advertisement placement within one or more web pages.

Referring to FIG. 16 in conjunction with FIG. 6b, the web page 241 may comprise an advertisement placement control 242, which may be a drop down menu listing the publisher's existing advertisement placements by advertisement placement ID 93 (obtained from the ad placement ID data store 681 and populated into the web page 241 by the tool 63) and include a control or adding an additional advertisement placement—including its name or other identification. Upon selection of an existing advertisement placement, the web page 241 may be adapted to automatically populate the remaining fields of the web page 241 with pre-existing data stored as represented in FIG. 6b to permit modification thereof.

A web page ID control 246, which also may comprise a drop down menu: i) lists the one or more web pages 13, by URL that are associated with the publisher; and ii) for a new advertisement placement, obtains the publisher's identification (e.g. URL) of the web page(s) 13 in which the advertisement placement will exist.

A page profile group control 256, which may be a drop down menu, lists the page profile groups 232a-232f associated with the publisher (obtained from the page profile group storage 231 FIG. 6b and populated to the web page by the tool 63) and obtains publisher input or election of a page profile group 232 to be associated with the advertisement placement.

A region control 248, which may be adapted to provide a pop up map 250 of the web page content and obtain publisher input or election of a specific location of the advertisement placement within the web page 13.

Various controls 252a-252c may be adapted to obtain user input or election of various inventory statistics 94 for the advertisement placement 93. Such controls may be similar to the controls discussed with respect to the web page 240 of FIG. 14.

Following publisher definition of the advertisement placement by use of the above described controls, the web page 241 is adapted to post the publisher input information back to the advertisement placement tool 63 such that applicable records may be written within the advertisement placement tables discussed with respect to FIG. 6b.

Configure Campaign Tool

The configure campaign tool 52 may be adapted to provide web pages to obtain campaign parameters useful for populating the data relationships 180 of the buyer's advertising campaign as discussed with respect to FIG. 11a.

Configure DVN Tool

The configure DVN tool 52 may be adapted to provide web pages to obtain the DVN parameters 671 of the data relationships 665 discussed with respect to FIG. 12.

DVN Inventory Management

Referring to FIG. 13 in conjunction with FIG. 1, the DVN inventory management tool 64 may be adapted to facilitate management of the DVN's purchasing of advertisement orders 20 which, in the aggregate, include a sufficient quantity of saleable events (i.e. impressions, clicks, or other open orders) to fulfill the DVN's requirements to deliver saleable events in fulfillment of network orders 661 (i.e. advertisers purchasing saleable events from the DVN).

Figure 17A:
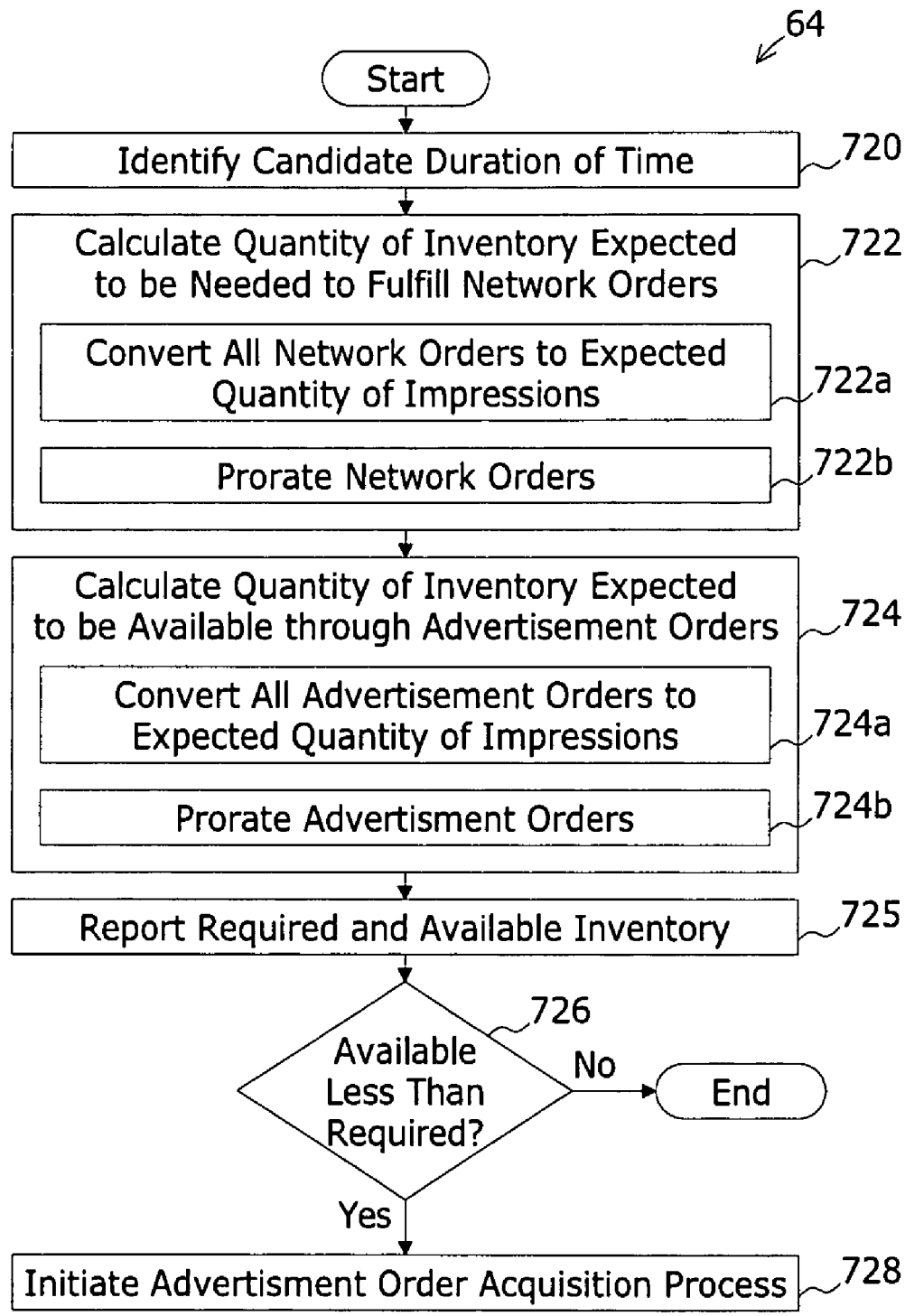
FIG. 17a is a flow chart depicting exemplary steps for performing inventory management in accordance with an embodiment of the present invention.

Turning to FIG. 17a in conjunction with FIG. 1, exemplary steps of the inventory management tool 64 include identifying a candidate duration of time. The candidate duration of time is a duration of time during which the tool 64 is adapted to calculate and/or compare available inventory (i.e. inventory available by way of purchased advertisement orders 20) to required inventory (i.e. inventory required to fulfill network orders 661). The candidate duration of time may be a day, a week, a month, or other period of time with a defined start time and a defined end time. Step 720 represents identifying such candidate duration of time which may include: i) obtaining user selection of the candidate duration of time; ii) looking up a predetermined candidate duration of time from a data store; and/or iii) calculating the predetermined duration of time as a function of the current date/time and a predetermined time period—for example calculating the predetermined duration of by calculating the start time and end time of a predetermined time period (for example one week) commencing at a certain time in the future (for example commencing three days from the then current time.

Step 722 represents calculating, for the candidate duration of time, the quantity of inventory expected to be required to fulfill each network order 661 associated with the DVN. In an exemplary embodiment wherein network orders 661 include orders for different saleable events (i.e. one network order 661a may be for a predetermined quantity of impressions while another network order 661b may be for a predetermined quantity of clicks), the required inventory may be calculated in terms of the total quantity of impressions expected to be required. The quantity of impressions that would be required to fulfill a network order for a predetermined quantity of clicks may be calculated by multiplying the required quantity of clicks by the expected quantity of impressions required to yield each click (i.e. conversion ratio and/or yield factor). Such conversion is represented by sub step 722a.

For network orders 661 which include a start time prior to the start of the candidate duration of time or an end time after the end of the candidate duration of time, the network order may be prorated to determined only the quantity of inventory required for the candidate duration of time. Such proration may be linear (i.e. total quantity of impression expected to be required multiplied by the portion of the network order duration that coincides with the candidate duration of time) and is represented by step 722b.

Step 724 represents calculating, for the candidate duration of time, the quantity of inventory expected to be available through the DVN purchased advertisement orders 20. In an exemplary embodiment wherein advertisement orders include orders for different saleable events (i.e. one advertisement order may be for a predetermined quantity of impressions while another network order may be for a predetermined quantity of clicks), the available inventory may be in terms of the total quantity of impressions expected to be available. The quantity of impressions that would be expected to be available may be calculated by multiplying the quantity of clicks or other saleable events in the advertisement order by the expected quantity of impressions required to yield each click (i.e. conversion ratio and/or yield factor). Such conversion is represented by sub step 724*a*.

For advertisement orders 20 which include a start time prior to the start of the candidate duration of time or an end time after the end of the candidate duration of time, the advertisement order may be prorated to determined the quantity of inventory available for the candidate duration of time. Such proration may be linear (i.e. total quantity of impression expected to be required multiplied by the portion of the network order duration that coincides with the candidate duration of time) and is represented by step 724*b*.

Figure 17B:
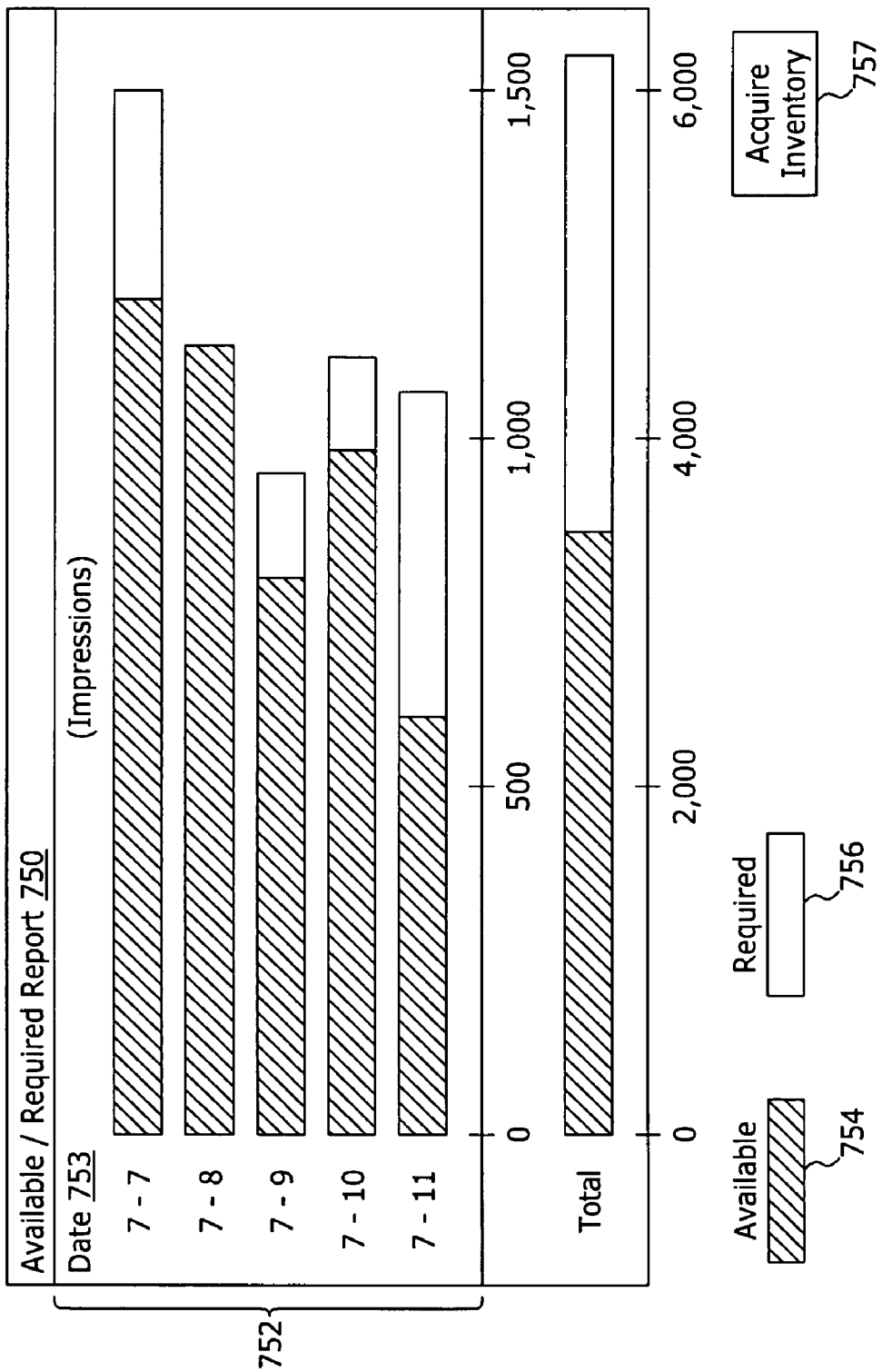
FIG. 17b is a web page diagram depicting an exemplary report of available versus required inventory in accordance with an embodiment of the present invention.

Step 725 may represent the tool 64 generating a report of required inventory versus available inventory over the candidate duration of time. More specifically, turning to FIG. 17*b*, an available/required inventory report template 750 may be stored in the computer readable media 21 (FIG. 1) and be accessible to the tool 64 for generating the report of required inventory versus available inventory over the one or more candidate duration of time(s). The report 750 may be generated by the tool 64 populating calculated values into the report and then providing the report 750 to the DVN as a web page (i.e. HTML or Java Script file).

As depicted in the report 750, the candidate duration of time may be multiple days 752 or the report 750 may depict graphic reports for each of multiple candidate durations of time—each being a day 753 for example.

The exemplary report 750 depicts, for each day 753 (which may be a candidate duration of time for purposes of FIG. 17*a*) a bar chart depicting both available inventory 754 and required inventory 756. Further, for a period of several days (which may be a candidate duration of time for purposes of FIG. 17*a*) a bar chart depicting both available inventory 754 and required inventory 756.

Returning to FIG. 17*a*, step 726 represents determining whether additional inventory is required (i.e. the available inventory over the candidate duration of time is less than the inventory expected to be required). This step may comprise the tool 64 determining whether a gap between available inventory and required inventory is sufficient to justify acquisition of additional inventory (for example if the difference between available inventory and required inventory is greater than a predetermined threshold). This step may also comprise obtaining DVN indication of whether additional inventory is required after rendering of the report 750. For example, a control 757 associated with the report 750 (depicted on FIG. 17*b*) may be adapted to post a DVN indication that additional inventory is required to the tool 64.

If additional inventory is required, an advertisement order acquisition process is commenced as represented by step 728. Commencing an advertisement order acquisition process may include any of: i) sending an email or other notification to an entitled account of the DVN with the email or other notification indicating an expected shortage of available inventory over the candidate duration of time; or ii) launching the ad placement search tool 54 to identify a segmented ad placement with content and traffic attributes corresponding to the subject matter criteria 672 and end user attribute criteria 673 of the DVN.

It should be appreciated that although the exemplary process for performing inventory management utilizes normalizing both required inventory and available inventory to impressions for purposes of comparing and determining whether a shortage exists, those skilled in the art will recognizing that comparison of required inventory and available inventory may be performed for each separate saleable event. Such a comparison in beneficial in that if there is a shortage of any particular saleable event type, the acquisition process commenced at step 728 may be specifically for the type of saleable event for which there was a short fall.

It should also be appreciated that the exemplary process for performing inventory management may be performed utilizing only available inventory for a selected one of the plurality of search criteria sets (i.e. advertisement orders for segmented ad placements that match the selected search criteria set) and only network orders that have end user, contextual, or temporal restraints such that requirement is required via a such inventory of the selected search criteria set. In which case, initiating of the ad placement search tool would be for purposes of locating additional inventory for the selected search criteria set.

Ad Placement Search Tool

In general, the ad placement search tool 54 may be adapted to match a buyers search criteria with publisher's distinguishing traffic attributes and other relevant factors segmenting its segmented ad placements 95 (FIG. 6*d*) to identify those segmented ad placements 95 which exactly match, or best match, the search criteria.

Figure 18:
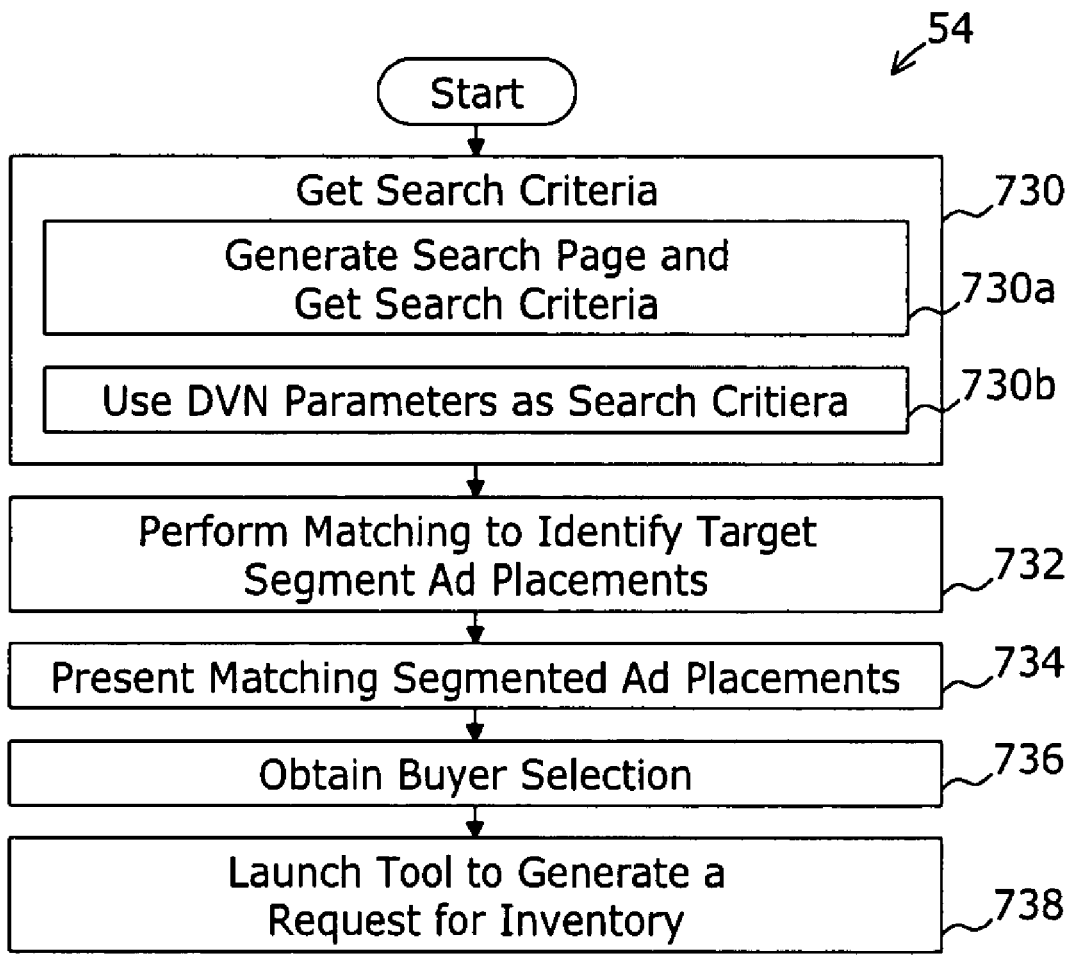
FIG. 18 is a flow chart depicting exemplary steps for searching segmented ad placements in accordance with an embodiment of the present invention.

In more detail, referring to FIG. 18 in conjunction with FIG. 6*d*, the listing search tool 54 comprises work flows adapted to: i) obtain the buyer's search criteria; ii) determine targeted segmented ad placements by matching segmented ad placements 95 with the buyer's search criteria; iii) displaying such targeted segmented ad placements; and iv) launching the request for inventory tool upon the buyer selecting a segmented ad placement 95 for potential purchase of a discrete traffic block/advertisement order 20.

Step 730 represents obtaining search criteria to use for matching segmented ad placements. Obtaining search criteria may, as represents by subset 730*a*, include generating a search web page to a user of an account associated with the DVN. The search web page may comprises controls for buyer entry of the key words comprising search criteria and/or buyer entry of an identification of a search criteria set of the buyer's target attributes—and returning the search criteria or the identification of the search criteria set to the listing search tool 54.

Alternatively, as represented by sub step 730*b*, obtaining search criteria may comprise obtaining the DVN target traffic attributes 671 (or the DVN target traffic attributes of the particular search criteria set identified by the user) from the DVN buyer data relationships 665 as discussed with respect to FIG. 12 or the target attributes 144 of the campaign data relationships 180 as discussed with respect to FIG. 11, in each case for use as the search criteria.

After obtaining the search criteria, the tool 54 may match segmented ad placements 95 (FIG. 6*c*) with the search criteria, as represented by step 732, to determine a subset of the group 409 of segmented ad placements 95 which are target segmented ad placements.

More specifically, each segmented ad placement 95 is tested, as a candidate segmented ad placement, against the search criteria to determine if it is a target segmented ad placement. A candidate segmented ad placement is a target segmented ad placement only if its distinguishing attributes 27 (FIG. 6*b*) correspond to or match the search criteria. The degree of match of each such comparison can be calculated and an overall degree of match calculated using, for example, a weighted average of the degree of match of each comparison. For example, matching end user attributes may be weighted with a higher degree of weight within a weighted average calculation than matching contextual attributes.

In response to identifying at least one target segmented ad placement, the ad placement search tool 54 generate a results web page for presentment of matching results to the buyer.

Figure 19:
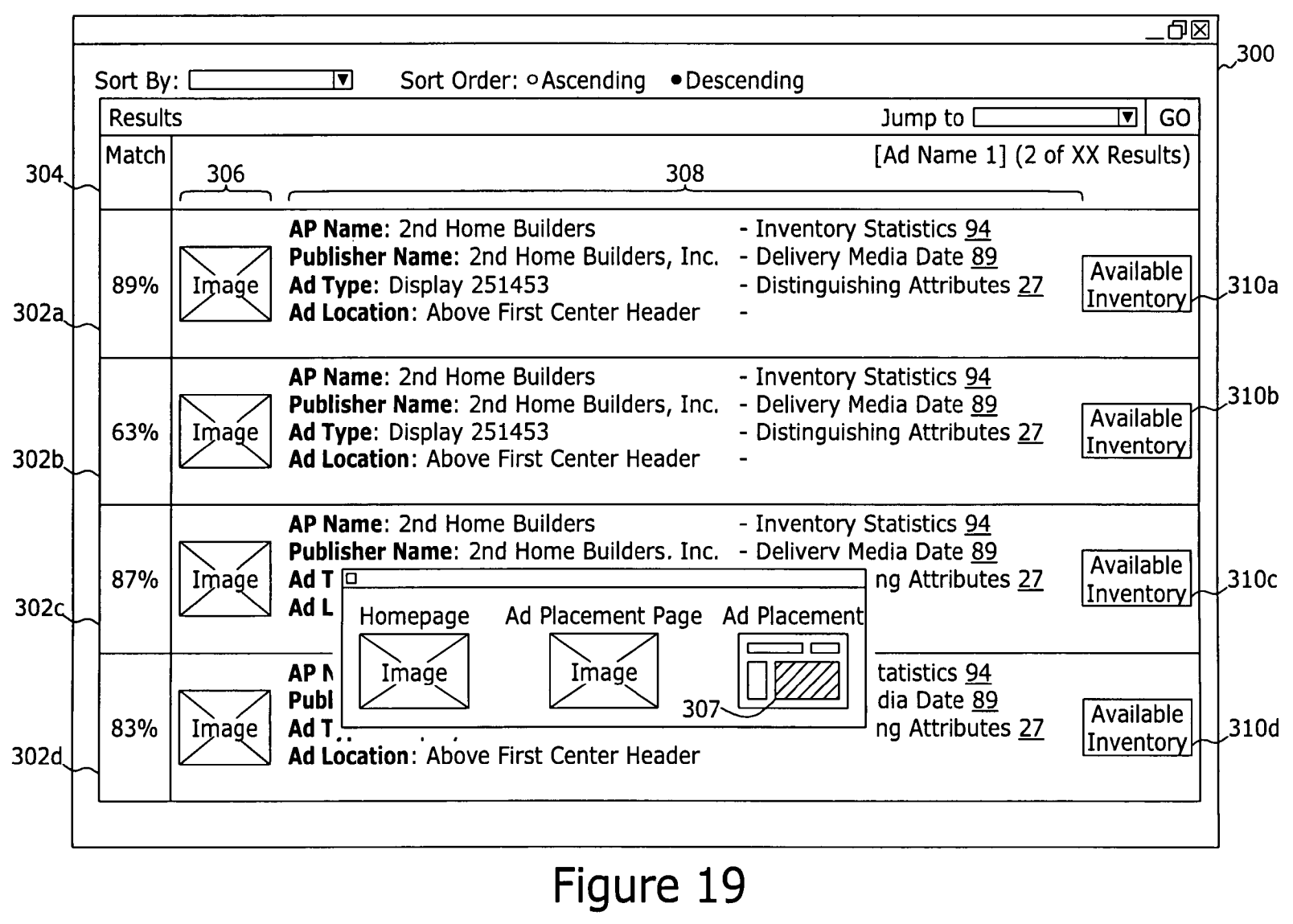

Referring briefly to FIG. 19 in conjunction with FIG. 18, an exemplary results web page 300 may be stored as a template in the computer readable media 21 (FIG. 1) and accessible to the ad placement search tool 54. The ad placement search tool 54 may be adapted to utilize the template to generate the web page results web page 300.

The results web page 300 may comprise a result listing 302a-302d for each target segmented ad placement. Each listing result 302 may includes: i) an indicator identifying how closely the discrete traffic block matches the buyer's advertisement campaign (e.g. how closely the various parameters match as determined at step 732, FIG. 18); ii) a thumb nail image 306 of the publisher's website content 13 inclusive of identification 307 (for example by highlighting or hashing) of the advertisement placement therein; and iii) various other information about the discrete traffic block.

Such other information may include identification of the inventory statistics 94 (as discussed with respect to FIG. 6b), identification of the delivery media data 89 (as discussed with respect to FIG. 6b), and identification of distinguishing attributes 27 for various segments (as discussed with respect to FIG. 6b).

Each results listing 302 may further includes an available inventory control 310 which, if selected by the buyer, initiates operation of the request for inventory/response tools 58 to enable the buyer to request inventory as represented by step 738. More specifically, the web page 300 may be adapted to post an indication of the buyer's selected target segmented ad placement back to the tool 54 and the tool 54 may be further adapted to initiate operation of the request for inventory/response tools 58—by providing identification of the publisher associated with the target segmented ad placement available to the request for inventory/response tools 58.

Request for Inventory/Response Tools

Returning to FIG. 13, the request for inventory/response tools 58 are adapted to broker the sale of a discrete traffic block/advertisement order between a publisher and a buyer following buyer selection of a segmented ad listing at step 736 of FIG. 18.

Figure 20:
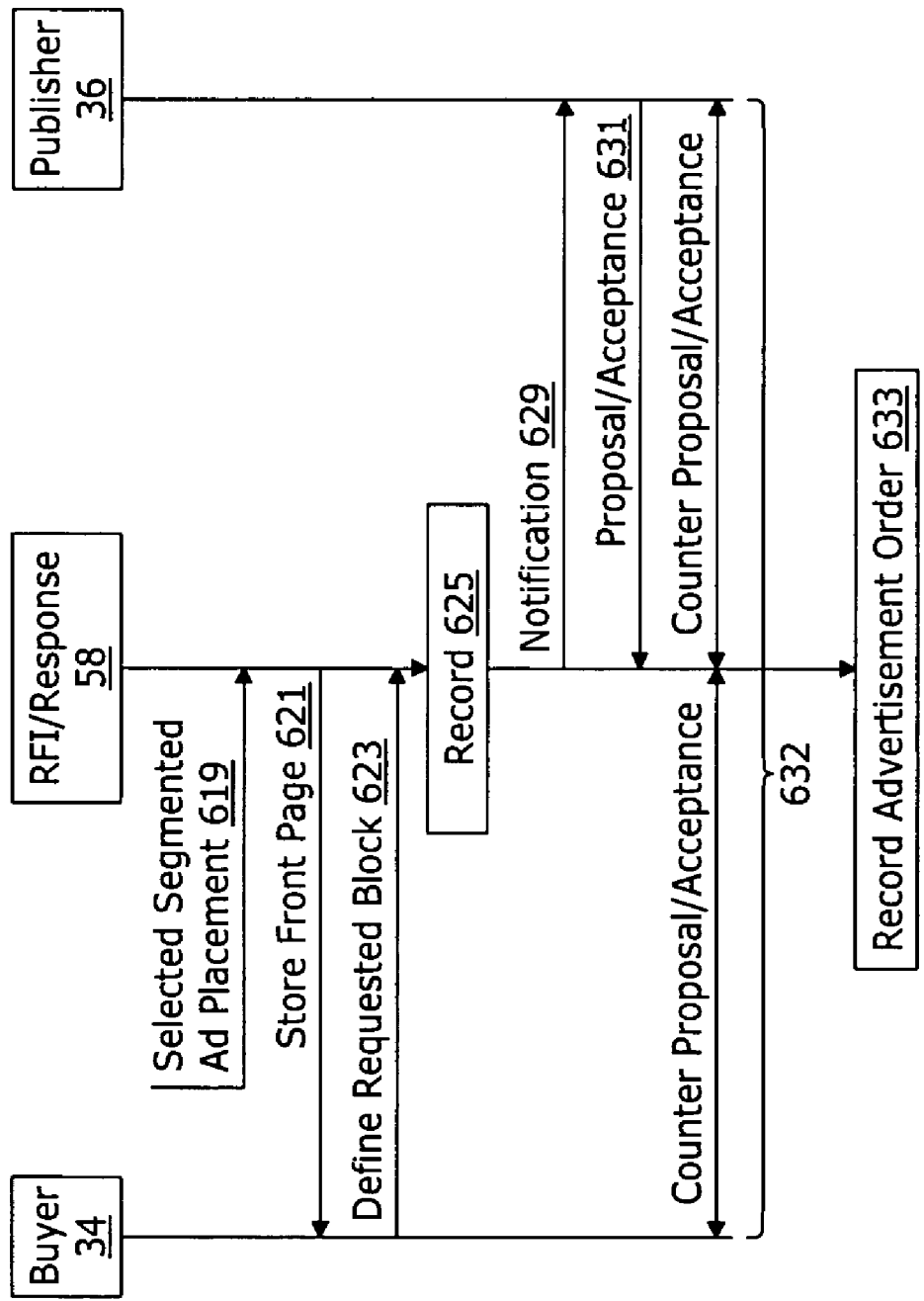
FIG. 20 is a ladder diagram depicting exemplary operation of a request for inventory (RFI) response tools in accordance with an embodiment of the present invention.

Turning to FIG. 20, following selection of a segmented ad placement from the results display 304 (FIG. 19), step 619 represents receiving identification of the target segmented ad placement 95 or the publisher having the web page in which the target selected segmented ad placement 95 exists.

Figure 21A:
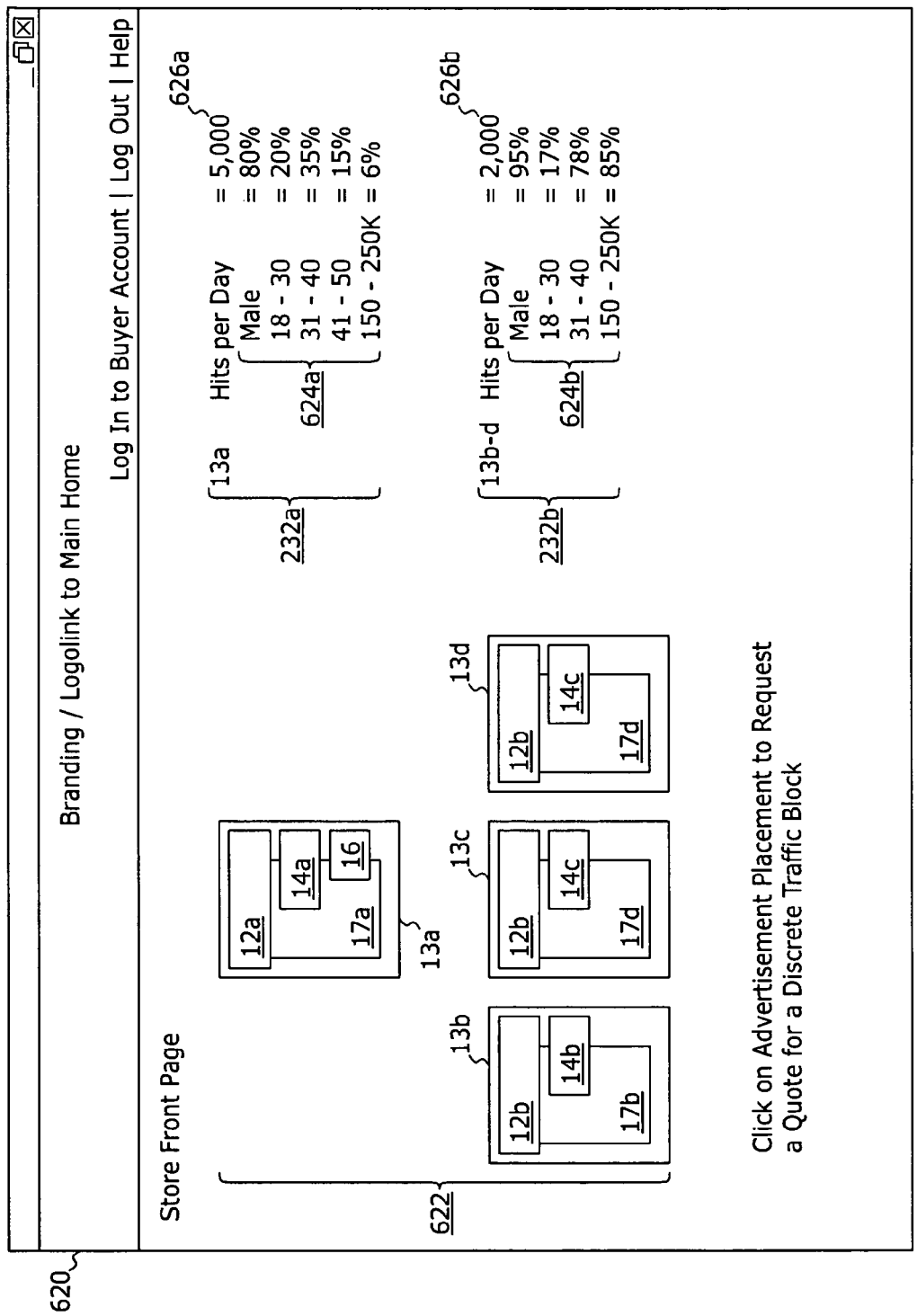
FIG. 21a is a diagram representing an exemplary web page for show-casing a publisher's inventory of advertisement impressions and facilitating a buyer requesting to purchase a discrete traffic block in accordance with an embodiment of the present invention.

In response thereto, the request for inventory tool 58 may provide a store front page to the buyer 34 at step 621. Turning to FIG. 21a, an exemplary store front web page 620 may be stored as a template in the computer readable media 21 (FIG. 1) and accessible to the request for inventory tool 58. The request for inventory tool 58 may be adapted to utilize the template to generate the store front web page 620 which showcases the publisher's inventory—inclusive of the selected ad placement 95.

The exemplary store front page 620 may include a graphical depiction 622 of the various web pages 13a-13d of the publisher's web site and, within each page 13a-13d, a graphical depiction of the various advertisement placements 12, 14 and 16 therein (which the tool 58 may extract from the ad placement data store 681 associated with the publisher 36 as depicted in FIG. 6a).

The store front page 620 may also include, for each page profile group 232a, 232b associated with the publisher 36 in the page profile group storage 231 (FIG. 6b): i) an indication of volume, such as "hits per day" from unique end users 624a, 624b; and ii) traffic profile parameters 626a, 626b identifying characteristics of at least a portion of the end users comprising at least a portion of the publisher's internet traffic. The traffic profile parameters 626a, 626b may represent percentages of the end user which are within each of a selected subset of the traffic attributes 72 from the attribute library 70 (FIG. 8). Such data may be extracted from the various data stores of FIGS. 6a, 6b and 6c and populated to the store front web page 620 by the tool 58.

The store front page 620 may also include one or more controls adapted to obtain the buyer's identification of an advertisement placement for which the buyer desires to purchase a discrete traffic block, to define the discrete traffic block, and to either make and offer or request a quote for the discrete traffic block.

Figure 21B:
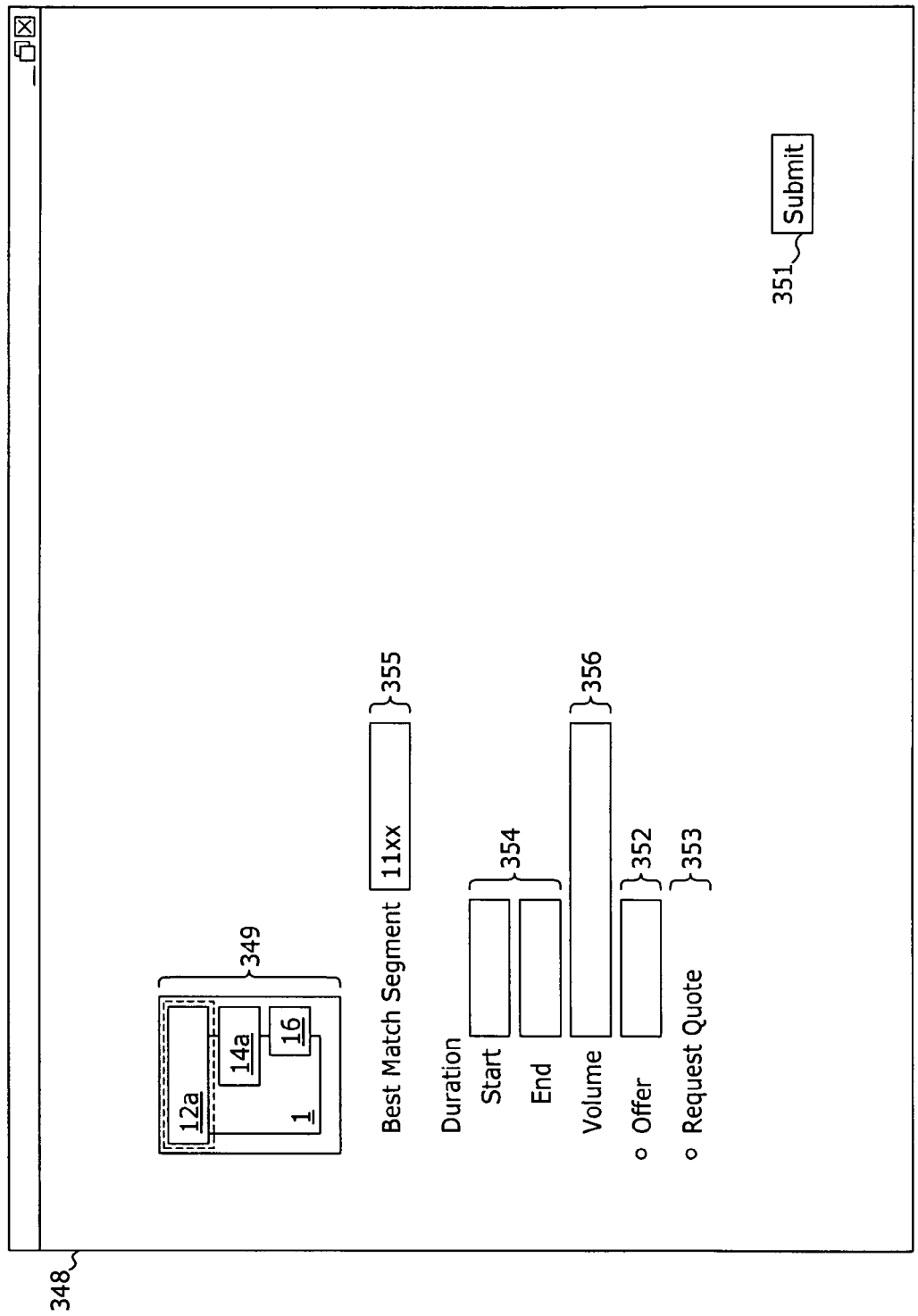
FIG. 21b is a diagram depicting an exemplary pop up window for obtaining buyer definition of a requested discrete traffic block in accordance with an embodiment of the present invention.

More specifically, referring to FIG. 21b in conjunction with FIG. 21a, in the exemplary store front page 620, each graphical image of an advertisement placement 12, 14, and 16 may be a control which, if activated, may be adapted to generate the pop up window 348 of the store front page 620. The pop up window 348 may be adapted to obtain the buyer's identification of a segment of the ad placement which the buyer desires to purchase a discrete traffic block, to define the discrete traffic block, and to either make and offer or request a quote for the discrete traffic block.

The pop up window 348 may include a depiction of the selected ad placement 349 within the publisher web page 13, an indication of the segment of the ad placement (i.e. the segmented ad placement) matching the search criteria or best matching the search criteria, a control 354 adapted to obtain buyer entry of a duration for the requested discrete traffic block, a control 356 adapted to obtain buyer entry of a desired volume for the request discrete traffic block (in terms of impressions, clicks, or other saleable events), a control 352 for obtaining the buyer's offer of a fee for the discrete traffic block (if the buyer is offering a fee), and a control 353 for obtaining an indication that the buyer desires the publisher to quote the requested discrete traffic block (as opposed to the buyer offering a fee). The window 348 may further be adapted to post, to the request for listing tool 58 upon buyer activation of the submit control 351a response message.

The response message may include identification of at least: i) identification of the segmented ad placement 95, ii) a target volume parameter defining a volume of at least two saleable events included in the requested discrete traffic block; and ii) a target duration parameter defining an active time period during which the volume of saleable events included in the requested discrete traffic block will be provided. The response 623 may further include an offered compensation for the requested discrete traffic block in an embodiment where the buyer proposes a fee for the delivery of the volume of saleable events in the proposed discrete traffic block.

It should be appreciated that the above described embodiment includes provision of the store front page 621 (FIG. 20) available to the buyer to enable the buyer to see all segmented ad placements 95 of the publisher—which typically includes more segmented ad placements 95 than just the one selected by the buyer from the results listing 304. This is useful in that it is likely that the publisher has other segmented ad placements 95 with similar delivery media data 89, inventory statistics, 94 and distinguishing attributes 27—inclusive of traffic attributes 28 and context attributes 29. Provision of the store front page 620 provides additional ad placement options to the buyer 34.

However, those skilled in the art will recognize that provision of the store front page 620 is not required for practice of the present invention and the pop up window 348 may also be included in the results page 300 as depicted in FIG. 19 whereby the pop-up window activates directly upon user selection of a result listing 302—thereby adapting the results page 300 to obtain buyer definition of a discrete traffic block without the intermediate step of rendering the store front web page 620 to the buyer.

Returning to FIG. 20, the response posted by the pop up window 348, whether from the store front web page 620 or from the results web page 300, may represent the request for listing tool 58 obtaining the buyer definition of the requested traffic block as represented by step 623.

Returning briefly to FIG. 12 in conjunction with FIG. 20, step 625 may represent writing a record 712 representing the requested discrete traffic block 711 to the RFI table 710. The requested discrete traffic block 711 may be associated with the buyer (buyer ID 34) and include: i) identification of the segmented ad placement 95, the target volume 716, the target duration 714, and optionally the offered compensation 718.

After writing the request 711 to the RFI table 710, the RFI/request tool 58 may send, at step 629, a notification to the publisher 36 that is making the segmented ad placement 95 available.

Figure 22:
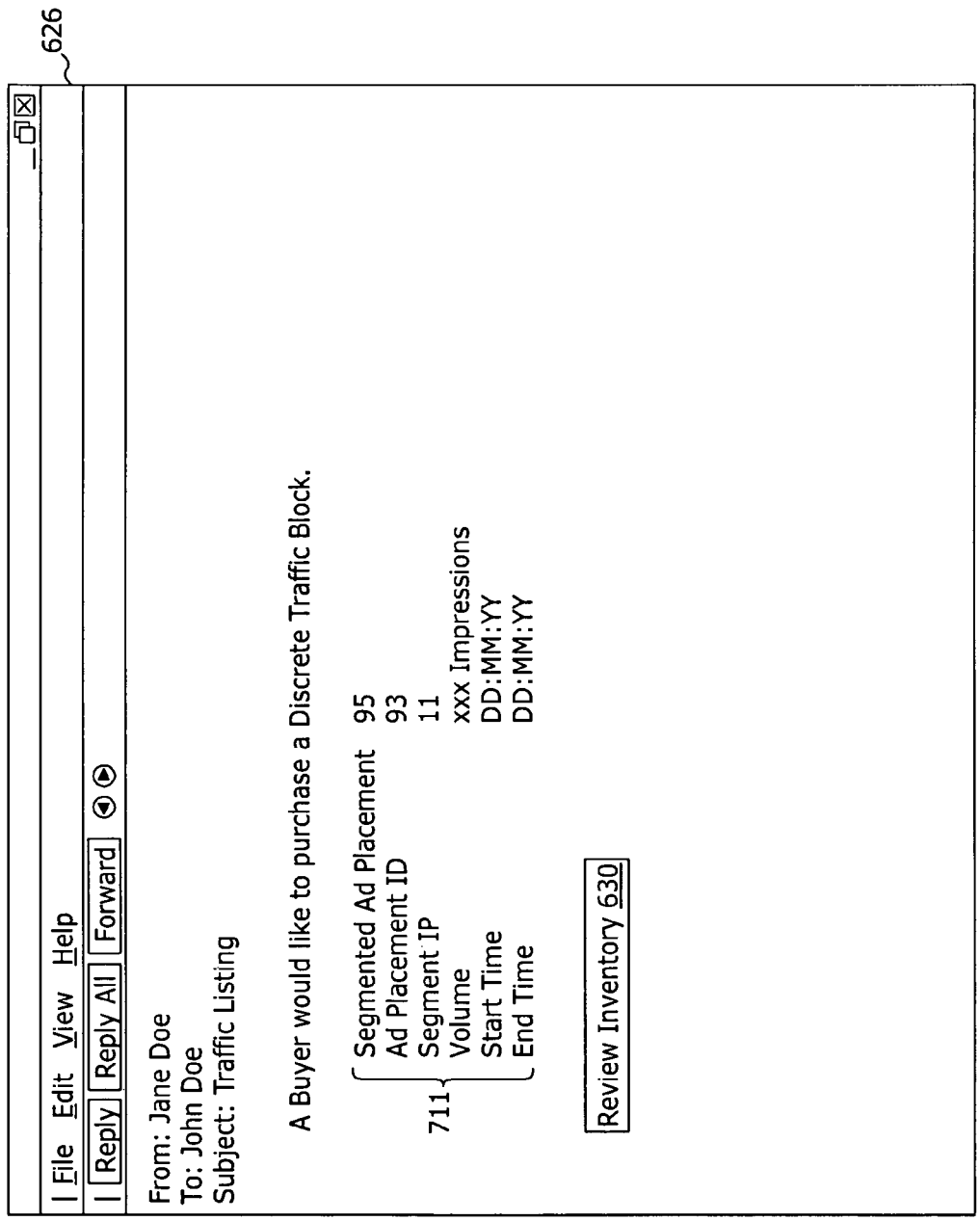
FIG. 22 is a diagram depicting an exemplary notification to a publisher making a target segmented ad placement available in accordance with an embodiment of the present invention.

Turning to FIG. 22, an exemplary notification 626 may be an email or a web page within the selected publisher's workflow that includes identification of the segmented ad placement 95, the target volume, and the target duration. For purposes of providing the notification 626, each segmented ad placement 95 may be associated with notification identifier 362 which provides a means for proving the notification 626 to the publisher. Such notification identifier 362 may be by way of associating an email address 362 associated with a representative of the publisher 36 ad depicted in FIG. 6a.

Returning to FIG. 22, the notification 626 may include a control 630 enabling the publisher 36 to view available inventory for purposes of deciding whether to commit the requested inventory.

Figure 23:
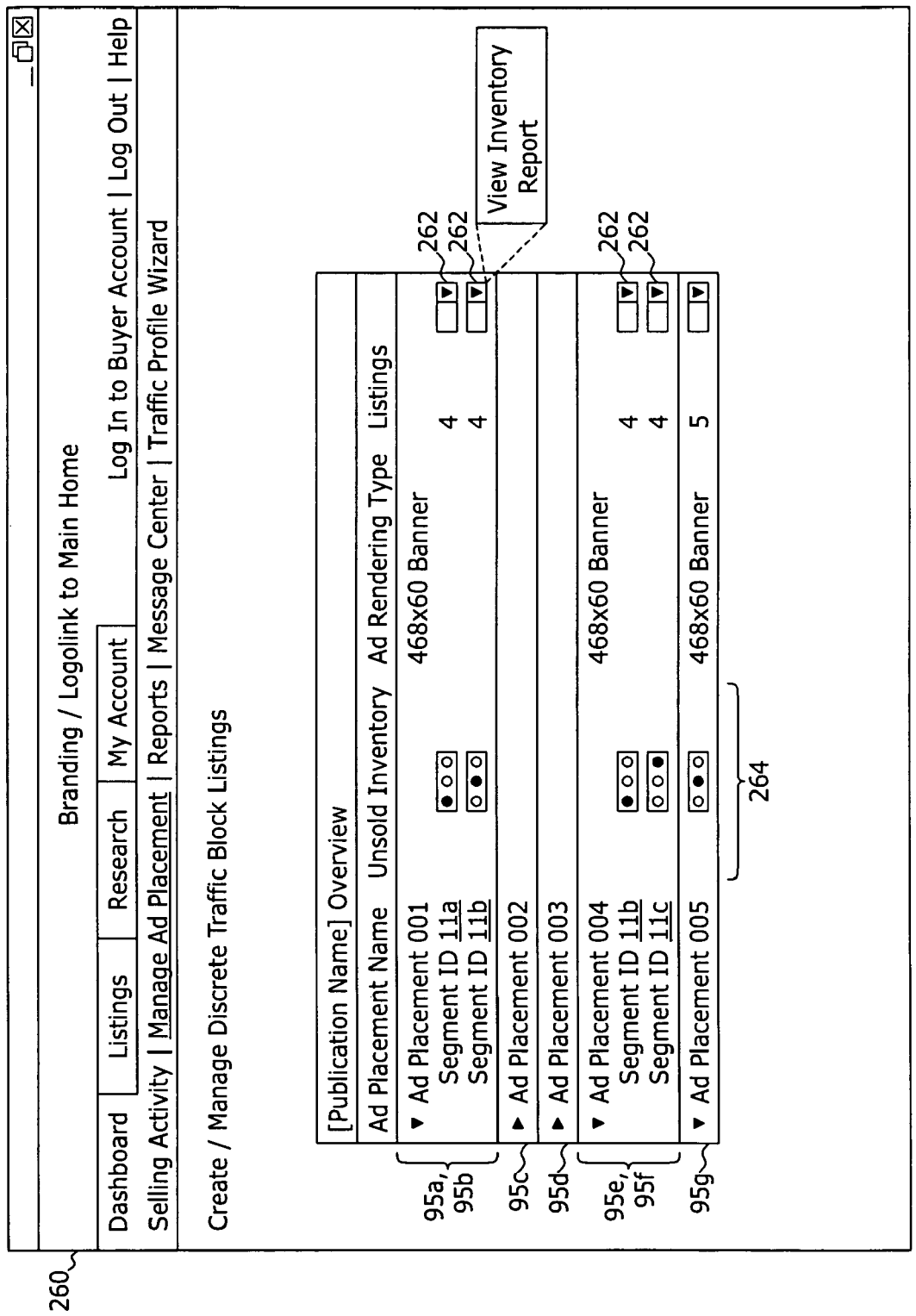
FIG. 23 is a diagram representing an exemplary web page depicting facilitating a publisher's management of its inventory in accordance with an embodiment of the present invention.

Referring to FIG. 23 in conjunction with FIG. 6c, a first exemplary inventory management web page 260 may be stored as a template in the computer readable media 21 (FIG. 1) and accessible to the tool 58. The tool 58 may be adapted to utilize the template to generate the inventory management web page 260 which, amongst other processes, may be provided for purposes of providing an overview of the publishers segmented ad placements 95 and management thereof.

The exemplary web page 260 may display, for each advertisement placement 95, the segments 11 associated therewith. If a particular advertisement placement, for example advertisement placement 005, is associated with all segments of the page profile group (or the only segment of an un-segmented page profile group), it may be represented as a single inventory listing 95g and be referred to as un-segmented.

An unsold inventory alert icon 264 may associate each segment of each inventory listing 95. The unsold inventory alert icon 264 may appear as a traffic light of a red, yellow, or green color, and may alert the user to whether significant unsold inventory exists. In more detail, if available traffic volume (meaning volume that is both unsold and not committed for sale) in the aggregate, are below a predetermined threshold of the expected volume for the inventory listing 95 (meaning not much of such inventory exists), the icon 264 may appear "green light" indicating that the projected available inventory has been listed for sale, otherwise committed and/or sold. Similarly, if excess expected volume of the inventory listing 95 has not been defined and listed as discrete traffic blocks, or otherwise sold or committed, the icon 246 may appear "red light" indicating that available inventory exists.

A drop down menu control 262 may link to separate web pages useful for viewing more detailed inventory reports for the segmented ad placement.

FIG. 24a represents an inventory report 376 web page which may be stored as a template in the computer readable media 21 (FIG. 1) and accessible to the ad tool 58. The tool 58 may be adapted to utilize the template to generate the inventory report 376 for displaying, to the publisher, inventory associated with an inventory listing 95. In an exemplary embodiment, the inventory report 376 may, for each of a plurality of days 378, associate, for the inventory listing, data related to delivery of volume against orders 380, data related to volume ordered but not yet delivered 382, total committed inventory 384, listed inventory 386 (if listed for sale but un-purchased), and the total portion of projected inventory that is not yet sold 388. Such an inventory report 376 may be useful in assisting a publisher in determining to list additional inventory as well as monitor progress of delivery of volume against orders.

Figure 24B:
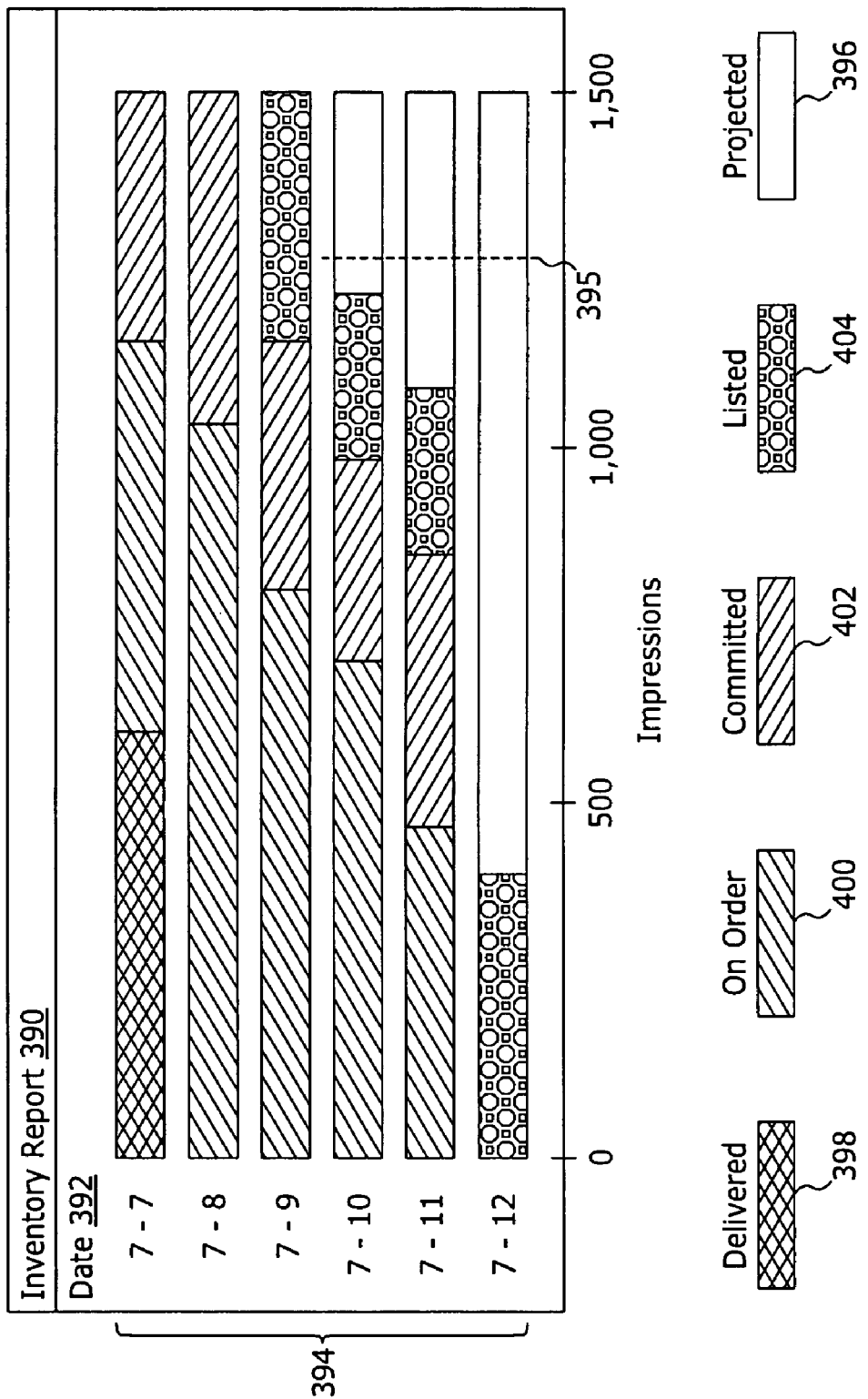
FIG. 24b is a diagram representing an exemplary inventory report in accordance with an embodiment of the present invention.

FIG. 24b represents an alternative inventory report 390 which also may be stored as a template in the computer readable media 21 (FIG. 1) and accessible to the tool 58. The alternative inventory report 390 may be in the form of a bar chart. For each day 392, a single bar 394 graphically depicts total projected inventory 396, volume delivered against orders 398, volume ordered, but not delivered 400, additional committed volume 402, and listed volume 404.

Although both of the inventory report of FIG. 24a and the alternative inventory report of FIG. 24b represent reporting of inventory on the basis of days, comparable embodiments may include similar reports wherein the data is reported on the bases of weeks, months, or other useful time periods.

Returning to FIG. 20 in conjunction with FIG. 12, step 631 represents: i) if the request for inventory 711 proposed by the buyer includes offered compensation 718 and the entire proposal is acceptable to the publisher 36, receipt of an acceptance from the publisher 36; ii) if any part of the request for inventory 711 is unacceptable to the publisher 36, receipt of a counter proposal from the publisher 36; and iii) if the request for inventory 711 is only a request without offered compensation 718, receipt of an initial proposal from the publisher 631.

In the event step 631 represents acceptance from the publisher, an indication of acceptance 720 may be written to the record 712 of the RFI table representing the request 711.

In the event step 631 represents a publisher proposal or counter proposal (either of which may be referred to as a publisher offering 722), the publisher offering 722 may be written to the record 712 of the RFI table representing the request 711. The publisher offering 722 may comprise a start time 722a, and end time 722b, which in combination define a publisher offered duration, a publisher offered volume 22c (in the form of impressions, clicks, or other saleable events), and a publisher offered fee 722d for delivery of the volume of saleable events 22c.

Step 632 represents negotiation for sale/purchase of the advertisement order 20 between the buyer 34 and the publisher 36. More specifically, in the event the buyer accepts the publisher offering 722, an indication of such acceptance 720 may be written to the record 712 of the RFI table representing the request 711 and the publisher offering 722.

Alternatively, if the buyer rejects the publisher offering 722, an indication of such rejection 720 may be written to the record 712 of the RFI table representing the request 711 and the publisher offering 722—and any counterproposal by the buyer 34 may be in the form of a new request for inventory records 712 being written to the table and steps 623 through 632 of FIG. 20 being repeated.

Upon receipt of acceptance indicating agreement to the terms of a sale/purchase of an advertisement order for the segmented ad placement 95 from either the publisher accepting the buyer's request for inventory or the buyer accepting the publisher offering, an additional record 650 representing the advertisement order 20 is written, at step 633, to the advertisement orders table 652 as depicted in FIG. 7.

The additional record comprises: i) a buyer ID identifying the DVN as the buyer of the advertisement order; ii) a volume parameter defining a volume of saleable events required for fulfillment of the advertisement order; iii) at least one duration parameter defining an active time period during which the volume of saleable events are scheduled to occur; and iv) a fee identifier defining a fee chargeable to the advertiser for fulfillment of the advertisement order.

Order Fulfillment

Returning to FIG. 13, the order fulfillment system 40 selects advertisement content for rendering, as an advertisement impression, for at least a portion of the ad placements within the publisher's web pages.

The order fulfillment system 40 may comprise at least a segment determination system 53, a context determination system 47, an order balancing system 44, a network order balancing system 46, an expected revenue model 45, and a serving system 57.

Figure 25:
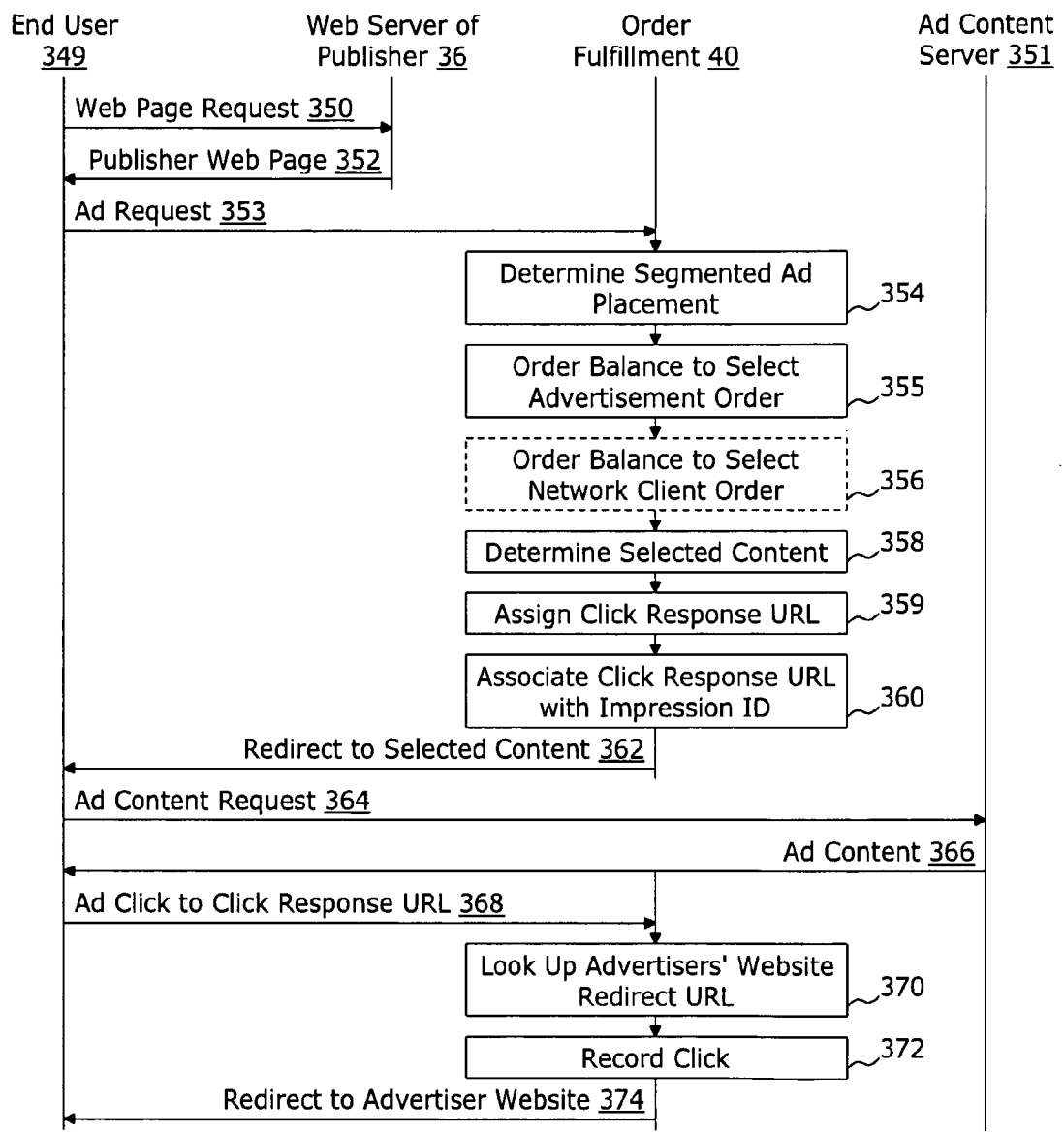
FIG. 25 is a ladder diagram representing exemplary steps performed for serving advertisement content in accordance with an embodiment of the present invention.

These components, in combination, are adapted to operate an exemplary process for selecting advertisement content for rendering to an end user as depicted in the ladder diagram of FIG. 25.

Turning to FIG. 25, the exemplary process for selecting ad content for rendering within an ad placement comprises interaction between an end user system 349 (e.g. a web browser), a web server of the publisher 36 providing a web page 13, the order fulfillment system 40, and an advertisement content server 351—which may be under common control with the order fulfillment system 40, the publisher 36, or the buyer 34.

Step 350 represents the end user browser system 349 generating an HTTP connection over the Internet to the URL of the web server of the publisher 36 for purposes of obtaining the publisher's web page 13.

Step 352 represents the web server of the publisher 36 serving the web page 13 (i.e. providing an HTML, Java Script, or other file in a format capable of rendering as an image on the end user's computer system by the web browser installed thereon). As discussed with respect to FIG. 2, included within the web page 13 are a plurality of ad placements 12, 14, 16 into which advertisement content will be rendered.

Within each advertisement placement within the publisher's web page 13, for example advertisement placement 16, is advertisement request script adapted to drive the end user's browser to generate an advertisement request to the order fulfillment system 40, obtain an ad impression (i.e. advertisement content), and render such ad impression within the advertisement placement 16.

Step 353 represents the end user browser 349 executing such advertisement request script to generate the advertisement request to the order fulfillment system 40.

Figure 26:
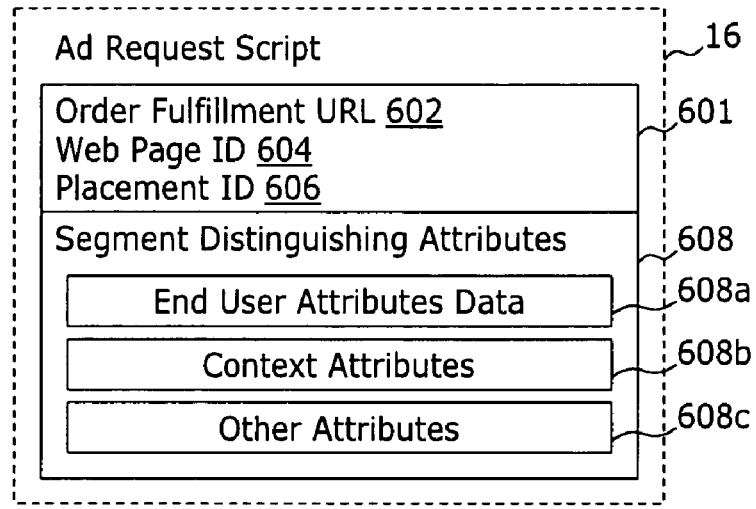
FIG. 26 is a diagram depicting exemplary elements of advertisement request script populated by a publisher's web server upon serving a web page to an end user in accordance with an embodiment of the present invention.

Turning to FIG. 26 exemplary advertisement request script 601 may include the URL of the order fulfillment system 40, an identifier of the advertisement placement (e.g. web page ID 604 and an placement identifier 606) which is, or which may be uniquely associated with, the ad placement ID 93 as describe with respect to FIG. 6a and FIG. 6c.

Further yet, appended to the advertisement request script 601 provided by the publisher's web server to the end user client system may be segment distinguishing attribute data 608 dynamically generated by the publisher's web server. Such segment distinguishing attribute data 608 may be referred to as request attribute data. The segment distinguishing attribute data 608 may be end user attribute data 608a, context attribute data 608b, or other attribute data defining to whom, with what, where, when (i.e. temporal attribute data) or how the impression will be rendered as represented by box 608c.

End user attribute data 608a may be a group of attributes known about the end user (i.e. maintained in a database managed by the publisher 36 or a cookie managed by the publisher 36) such as geographic, demographic, and/or behavioral information describing traits or characteristics of the end user and being available to the publisher by way of user registration, a publisher controlled cookie on the user's system, or other methods utilized by web site operators for collecting end user information.

Figure 27:
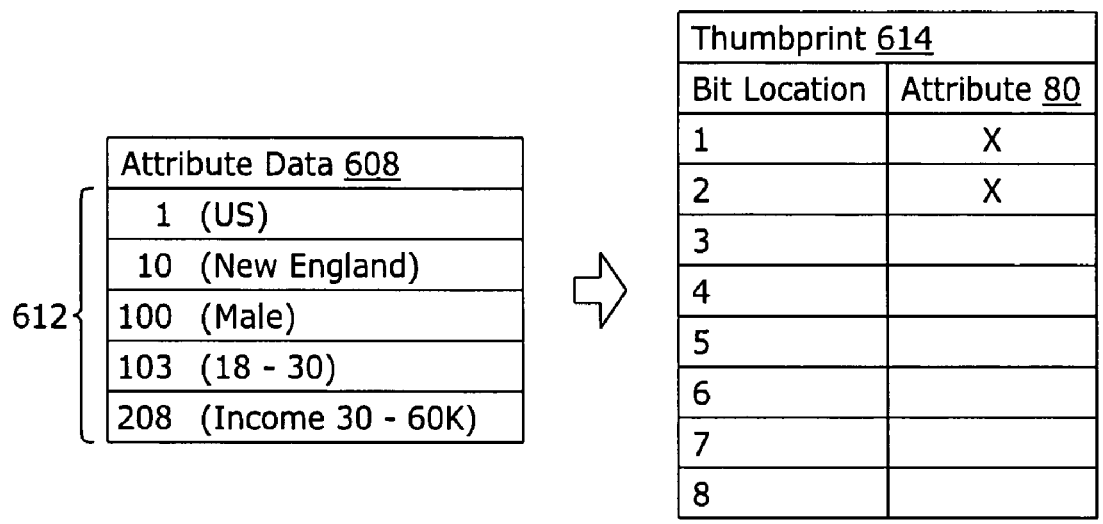
FIG. 27 is a diagram depicting exemplary mapping of end user attributes to a traffic attribute blue print for determining a traffic segment in accordance with an embodiment of the present invention.

In one example, referring briefly to FIG. 27 in conjunction with FIG. 8, the attribute data 608 may be provided as an extension to the URL. In an embodiment useful wherein the attribute data 608 include end user attribute data 608a, the extension to the URL may include identification of each attribute of an attribute subset 612 of the global list of attributes 80 described in the attribute library 70. The subset 612 is as subset that includes only those attributes which are known to be true of the end user (i.e. determined to be true by the publisher's web server by way of looking up end user attributes in a publisher controlled database (i.e. database of registration information about end users), a publisher controlled cookie on the end user system 349, or other means for storing attribute data 608).

For example, the attribute data 608 as depicted in FIG. 27 indicates that the end user may be a male, 18 to 30, income 30K to 60K, in New England, US—as such, the URL extension may represent the attribute data 608 as a sequence, or comma delaminated sequence, of the attribute index numbers 1, 10, 100, 103 and 208 (i.e. the index numbers for those "true" attributes 80 from the attribute library 70).

As discussed, other attributes, for example, certain commonly used contextual attributes may also be represented by attributes 80 within the attribute library and may be includes in the extension to the URL in the same manner. Alternatively, certain attributes 608, such as context attributes 608b may be represented by word tags within the URL extension indicating a context segment (as defined with respect to FIG. 6b).

Returning to FIG. 25, step 354 represents the segment determination system 53 determining the selected segmented ad placement 95 (FIG. 6c) for which an advertisement is to be served.

Figure 29:
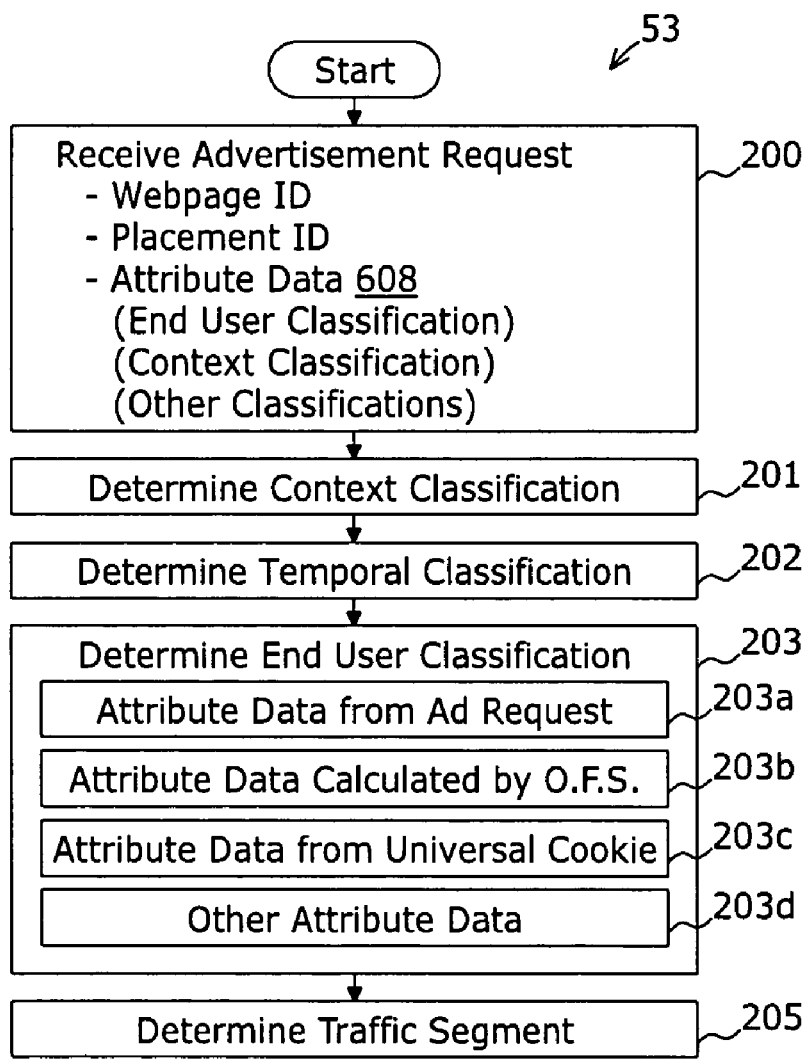
FIG. 29 is a flow chart representing exemplary steps performed by a segment determination system for determining a selected segmented ad placement in accordance with an embodiment of the present invention.

FIG. 29 represents an exemplary process the segment determination system 53 is adapted to operate. Turning to FIG. 29 in conjunction with FIG. 25, step 200 represents receiving the advertisement request 353. As discussed, the advertisement request 353 may include the web page ID 604 and the ad placement ID 606 (which itself may include a web page if and a placement ID) identifying the publisher's advertisement placement 12, 14, 16 (FIG. 2) as well as request attribute data 608.

Steps 201 through 203 represent comparing distinguishing attributes of each segment of the page profile group with which the ad placement is associated to attribute data associated with the ad request (i.e. both request attribute data and other attribute data looked up, calculated, extracted from a cookie on the end user system controlled by the order fulfillment system, or otherwise determined by the order fulfillment system) to determine which segment most closely matches (or exactly matches) the attribute data associated with the ad request.

Step 201 represents determining a context classification if the ad placement is contextually segmented. This may comprise: i) identifying the ad placement ID 93 which is, or is uniquely associated with, the ad placement ID 606 identified in the request 353; ii) identifying the page profile group 232 associated with the ad placement ID 93 utilizing the ad placement table 681 of FIG. 6*a*; and iii) determining whether the identified page profile group 232 is contextually segmented (i.e. identified segments 11 distinguished utilizing a contextual attributes 29).

If the identified page profile group 232 is contextually segmented, then the ad placement may be contextually segmented. If the ad placement ID 93 is contextually segmented, the segment determination system 53 determines the current context classification of the content of the publisher's web page.

In one exemplary embodiment, the context classification may be identified by the context attributes 608*b* of the advertisement request 353. More specifically, the context attributes 608*b* may be compared to the contextual attributes 29 of each segment 11 of the page profile group 232 to determine which segment has contextual attributes that exactly match, or best match, the context attributes 608*b*. The segment with matching contextual attributes may be referred to as the context matching segment.

In another exemplary embodiment, the context determination system 47 (FIG. 13) may periodically "page scan" the publisher's web page for context. More specifically, turning briefly to FIG. 30, the context determination system 47 (of the order fulfillment system 40) (FIG. 13) may maintain a context table 460 which associates the URL of the web page with its current contextual classification (identification of the segment 11 with contextual attributes that best match the current subject matter of the publisher's web page content).

Figures 30, 31:
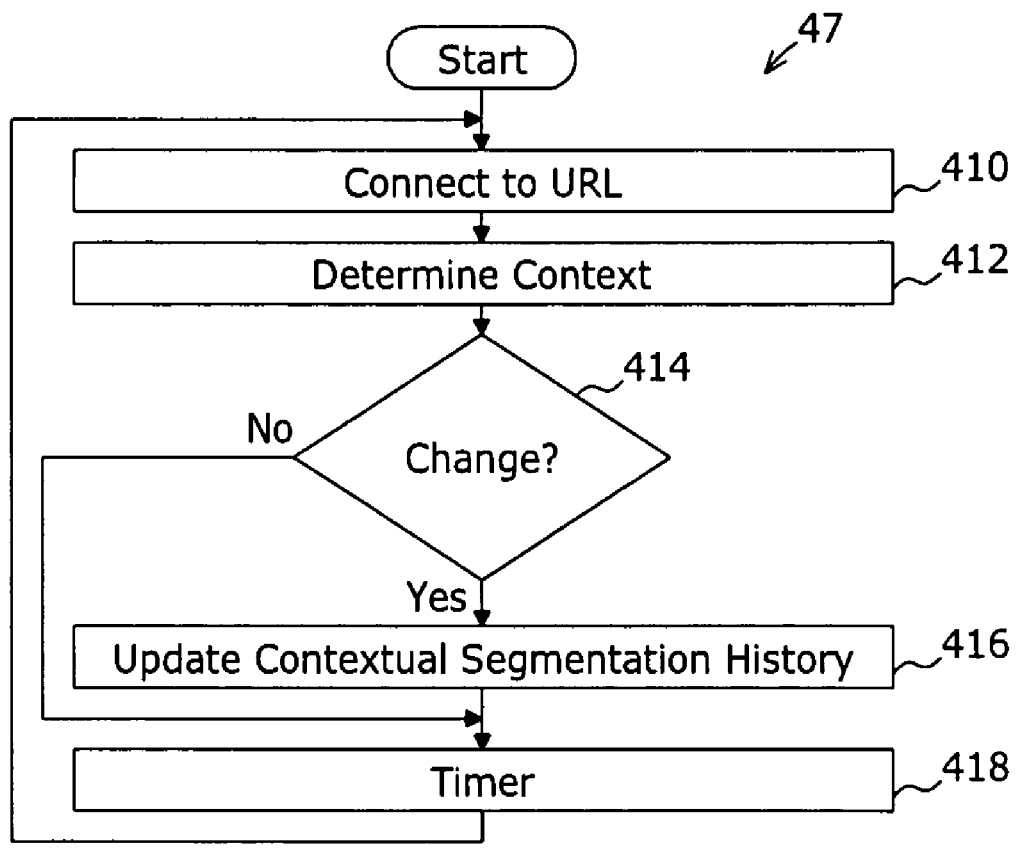
FIG. 30 is a table depicting an exemplary data structure useful for recording classification of web content for a web page wherein the content is periodically altered between at least a first classification and a second classification in accordance with an embodiment of the present invention.
FIG. 31 is a flow chart representing exemplary operation of a content determination system for determining a classification of web content of a web site wherein the content is periodically altered between at least a first classification and a second classification in accordance with an embodiment of the present invention.

More specifically, referring to FIG. 31 in conjunction with FIG. 30 and FIG. 10, an exemplary implementation of the context determination system 47, may, at step 410 periodically connect to the URL of the publisher's web site and obtain the web content 17 (FIG. 2).

Step 412 represents comparing the content obtained from the publisher's web site to the contextual attributes 29 (which may be context pattern tags 407*a*-407*c*) of each segment 11 of the page profile group 232 to determine which segment 11 has contextual attributes that exactly match, or best match, the current subject matter of the web page. Most closely matching may mean the most frequent occurrence of the pattern tags within the content. Again, the segment with matching contextual attributes may be referred to as the context matching segment.

If, at step 414, the context classification of the web page has changed since the system last connected to the URL, the context table 460 is updated, at step 416, to include the date and time of the change 466, and the current context classification 464. Thereafter, timer step 418 represents a step of waiting a certain period of time and then reverting back to step 410 to re-connect to the URL to determine if there has been a context change.

Returning to FIG. 29 in conjunction with FIG. 30, determining the context matching segment at step 201 may comprise looking up the most recent context classification of the web page in the context table 460 and determining the segment(s) 11 of the page profile group 232 (FIG. 6*b*) associated with the context.

Step 202 may represent determining a temporal classification if the ad placement is temporally segmented. This may comprise: i) identifying the ad placement ID 93 which is, or is uniquely associated with, the ad placement ID 606 identified in the request 353; ii) identifying the page profile group 232 associated with the ad placement ID 93 utilizing the ad placement table 681 of FIG. 6*a*; and iii) determining whether the identified page profile group 232 is temporally segmented (i.e. identified segments 11 distinguished utilizing temporal attributes 30).

In the event the ad placement ID 93 is temporally segmented, the segment 11 with temporal attributes 30 (i.e. a time period) encompassing the then current date and time is determined by comparing the then current date and time (in the time zone in which the end user is located—determined by a time value provided within the request attribute data, mapping the IP address of the advertisement request to a table that associated IP address with geographic location or time zone) to the temporal attributes 30. The segment with a temporal attribute 30 encompassing such then current period of time may be the temporally identified segment.

Step 203 represents determining the end user attribute segment if the ad placement is end user attribute segmented. Referring to FIG. 29 in conjunction with FIG. 27, step 203 represents building an end user attribute record, or thumbprint 614, for purposes of determining an attribute segment of the ad placement. Generating the thumbprint 613 may comprise mapping available end user attribute data 608 into the traffic attribute template 76 used for segmenting the page profile group 232 to which the advertisement placement 93 is assigned.

More specifically, the traffic template (the sequenced list of attributes utilized for segmentation—for example traffic template 76*b* of FIG. 9*b*) which is utilized for creating the traffic attribute blueprints 28*a*-28*f* defining the segments of the traffic profile group 232 is identified.

Available end user attribute information 608 about the end user is then populated into each bit location of the traffic template 76*b* to generate the end user attribute record or thumbprint 614. More specifically, to generate the end user attribute record 614, each bit location of the traffic template 76*b* is set to represent whether the corresponding attribute 80 applies to the end user (i.e. populating the bit location with a specified value such a "1" if the described attribute associated with the bit location is true of the end user while populating a second specified value such as "0" if the described attribute is other than true about the end user (i.e. false or unknown).

As represented by sub step 203*a*, a portion of the attribute information about the end user may be the request attribute data 608 (FIG. 26) appended to the ad request script 601 by the publisher's web server.

As represented by sub step 203*b*, a portion of the attribute information about the end user may be end user attribute data determined by the order fulfillment system 40 from, for example, the end user's IP address. An example of such data may be a geographic location that can be calculated from an IP address.

As represented by sub step 203*c*, a portion of the attribute information about the end user may be end user attribute data read from a cookie on the end user system controlled by the order fulfillment system 40 (e.g. referred to as a universal cookie).

Figure 32:
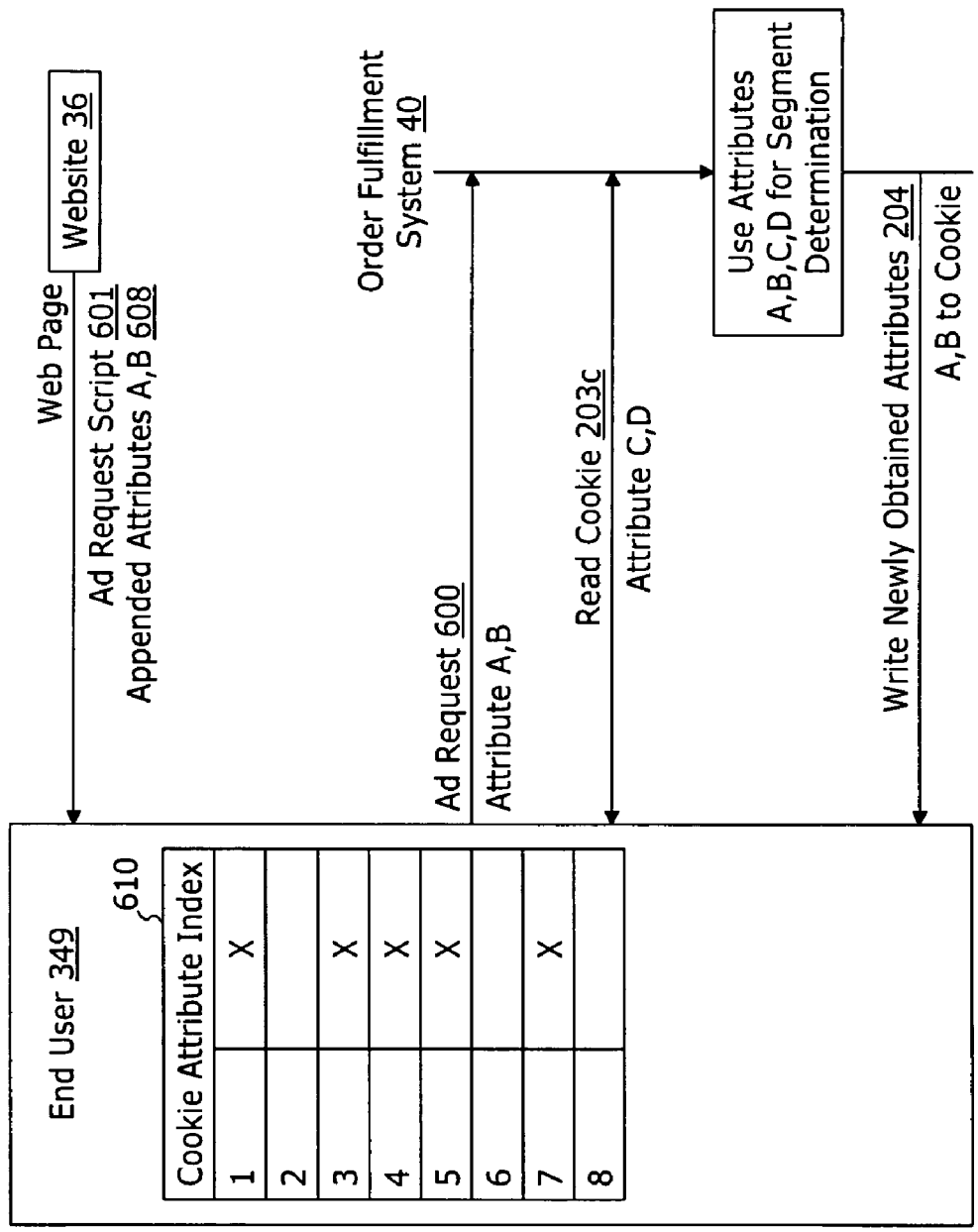
FIG. 32 is a ladder diagram representing exemplary interaction between an order fulfillment system and a universal cookie in accordance with an embodiment of the present invention.

More specifically, turning briefly to FIG. 32, a universal cookie 610 may be stored by the order fulfillment system on the user's system and may store, for a large quantity or even all, attributes 80 of the attribute library 70 (FIG. 8) an indication of whether the attribute applies to the end user. As discussed, such attributes may be geographic, demographic, and/or behavioral.

As an end user browses the internet, each time the end user browser 349 makes an advertisement request to the order fulfillment system 40, the order fulfillment system 40 may: i) read those end user attributes stored in the universal cookie 610 (i.e. request the cookie data from the end user's system) and ii) write any additional end user attributes known about the end user to the cookie 610—such as geographic, demographic, or behavioral attributes provided to the order fulfillment system 40 by the publisher's web server as end user attribute data 608 within the advertisement request 600.

More specifically, when the end user browser 349 obtains a web page from a publisher's web site 36, the web site 36 provides the web page in conjunction with the advertisement request scripts 601 and appended request attribute data 608 (if any) that the web site has recorded as discussed with respect to FIG. 32. In this example it is assumed that the appended end user attributes include attributes "A" and "B". As discussed, the end user browser 349 provides an advertisement request 600 inclusive of the attributes "A" and "B" to the order fulfillment system 40 at step 354.

Returning to FIG. 29, step 203c represents reading additional end user attributes from the universal cookie 610. For purposes of this example, those attributes are attributes "C" and "D". As such, after step 202c, the order fulfillment system has access to attributes "A", "B", "C", and "D" for use determining the attribute segment of the end user.

Step 204 (FIG. 32) represents updating the universal cookie 610 by writing the newly obtained attributes (e.g. attributes "A" and "B" obtained in the advertisement request 600) to the universal cookie 610. As such, the next time the end user browser 349 makes an advertisement request to the order fulfillment system 40, regardless of whether any attributes are included in the advertisement request, the order fulfillment system 40 will be able to utilize each of attributes "A", "B", "C", and "D" from the universal cookie 610 for attribute segmentation.

Returning to FIG. 29, sub step 203d represents any other means available for determining end user attributes for population to the end user attribute record.

Step 205 represents determining the selected segmented ad placement 95 (FIG. 6c) based on end user attributes by comparing the end user attribute record (i.e. thumbprint 614) to the traffic attribute blue print 28 of each segment 11 of the page profile group 232 to identify the segments 11 that include a traffic attribute blue print 28 best matching the thumbprint 614.

Referring again to FIG. 9b as an example, such comparison may be by way of comparing, for each traffic segment, a bit register representing the end user attribute records to a bit register representing the traffic segment. The closest matching bit register represents the best fit attribute segment. Ideally the match should be exact.

The selected segment is then determined to be the segment with distinguishing attributes that best matches the attribute data (request attribute data 608 plus other attributed data) as determined from steps 201-205. A weighted average system may be used as sell as a priority determination. The priority determination system may indicate that a near perfect or perfect match to a first segment based on matching end user attributes may override or control over a similar match to a different segment based on context. Similarly, if there is not a perfect or near perfect match on end user attributes, matching based on context may override or control.

Returning to FIG. 25, after determining the selected segmented ad placement 95, step 355 represents the order balancing system 44 selecting an advertisement order 20 from which advertisement content will be selected (i.e. determining which open order 20 meets fulfillment criteria).

Figure 33:
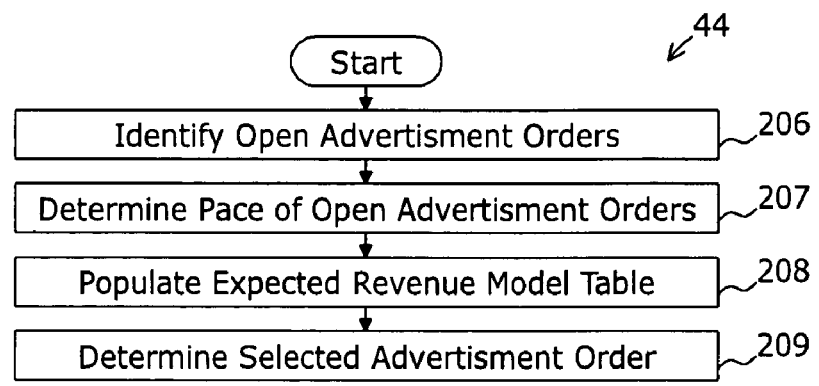
FIG. 33 is a flow chart representing exemplary operation of an order balancing system determining a selected advertisement order in accordance with an embodiment of the present invention.

Turning to FIG. 33, exemplary steps performed by the order balancing system 44 may include, at step 206, identifying those open advertisement orders 20 for the selected segmented ad placement 95. With brief reference to FIG. 7, the open advertisement orders 20 may include those advertisement orders 20 which: i) are for the selected segmented ad placement 95, ii) have a start time 96a that has already elapsed, iii) have an end time 96b that hat not yet elapsed, and iv) have not yet been fulfilled (i.e. actual fulfillment status 104 is less than the volume 101 included in the order).

Step 207 represents determining which open advertisement order 20 is farthest behind (or least ahead) on its target pace in an embodiment wherein being farthest behind (or least ahead) of a target base is the fulfillment criteria. An order's target pace may be equal to the volume (e.g. the purchased quantity of impressions or clicks) divided by the time period over which the volume is to be delivered. An order is ahead of the target pace if its actual aggregate fulfillment volume (either clicks or impressions) is greater than a target volume. The target volume is the target pace multiplied by the number of days that have already elapsed since the start date of the period during which the volume is to be delivered. Similarly, an order is behind the target pace if the actual aggregate fulfillment volume is less than the target volume.

In a second embodiment, the order balancing system 44 may determine which open order is farthest behind a low fulfillment threshold (or least ahead of a high fulfillment threshold) wherein begin farthest behind a low fulfillment threshold (or least ahead of a high fulfillment threshold is the fulfillment criteria.

Figure 34:
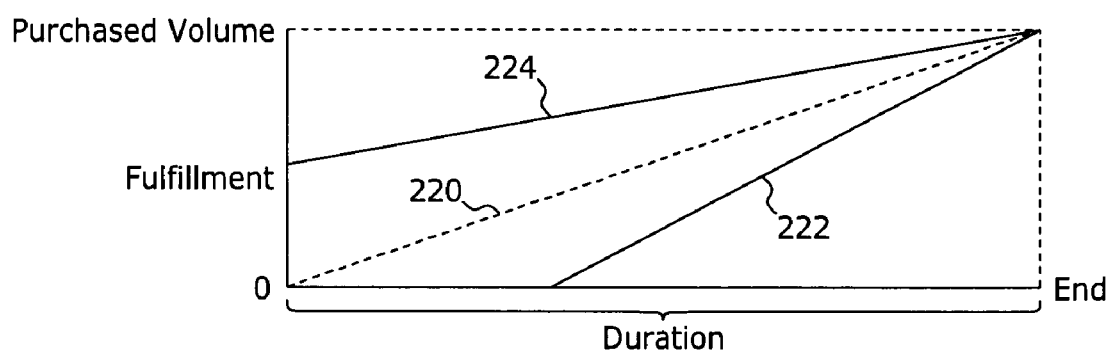
FIG. 34 is a diagram depicting pacing and deviation from pace in accordance with a minimum fulfillment threshold and a maximum fulfillment threshold in accordance with an embodiment of the present invention.

Turning briefly to FIG. 34, target pace 220 of a particular traffic block campaign (e.g. the purchased volume divided by the duration) is represented a graph with: i) a horizontal access representing time between the start time and end time of the duration of the discrete traffic block; and ii) a vertical access representing fulfillment between zero actual impressions/clicks and the purchased volume of impressions/clicks. As such, the target pace 220 may be represented by a straight line from the vertex of the two axes and a coordinate representing full fulfillment of the purchased volume at the end date of the duration.

The low fulfillment threshold 222 represents a fulfillment pace less than the target pace—but approaching the target pace at the end of the duration. Similarly, the high fulfillment threshold 224 represents a fulfillment pace greater than the target pace—but approaching the target base at the end of the duration.

The range between the low fulfillment threshold 222 and the high fulfillment threshold 224 represents an acceptable deviation from the target pace—and such acceptable deviation becomes narrower, and approaches zero, at the end of the duration.

The fulfillment pace threshold 220 may be a function of the volume of saleable events included in the discrete traffic block divided by the active time period of the discrete traffic block and multiplied by a portion of the active time period that has elapsed. The low fulfillment threshold may be the fulfillment pace threshold 220 multiplied by a function of the portion of the active time period that has elapsed that yield a value less than one for the entire duration of the active time period and approaches one at termination of the active time period.

In this embodiment, an open order is behind the low fulfillment threshold 222 if its actual fulfillment volume (at the particular time during the duration) is less than the low fulfillment threshold 222. Similarly, an open order is ahead of the high fulfillment threshold if its actual fulfillment volume (at the particular time during the duration) is greater than the high fulfillment threshold 224.

Figures 35, 36:
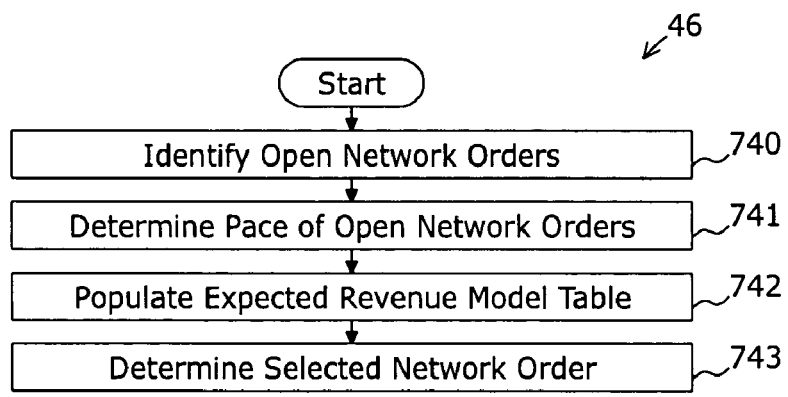
FIG. 35 is a table depicting an exemplary data structure useful for load balancing and maximizing yield in accordance with an embodiment of the present invention.
FIG. 36 is a flow chart representing exemplary operation of an order balancing system determining a selected advertisement order in accordance with an embodiment of the present invention.

Turning briefly to FIG. 35 in conjunction its FIG. 33, the expected revenue module 45 may be used for determining the selected advertisement order in an embodiment where expected revenue is at least a portion of the fulfillment criteria. More specifically, step 208 may represent populating certain parameters into an expected revenue module 45. Those parameters may include: i) a value representing pace 472; ii) a value representing fulfillment deviation from low threshold 474; iii) a revenue per impression 476 (if the revenue is based on delivery of an impression); and iv) a revenue per event 478 (if the revenue is based on some other event other than delivery of the impression).

The expected revenue module 45 may further calculate, for each order 20 for the segmented ad placement, an expected revenue value 480 which: i) if the order is based on delivery of an impression, comprises the revenue per impression 476; and ii) if the order is based on some other event, the revenue per event 487 multiplied by the fraction of impressions estimated to yield the event.

After calculating expected revenue 480 the order balancing system 44 determines which of the open advertisement orders 20 meets fulfillment/selection criteria to be the selected advertisement order 20. The selection criteria may specify: i) selection of the order 20 farthest behind its low fulfillment threshold if any orders 20 are behind low fulfillment threshold; ii) select the order with the highest expected revenue 480 if all orders are above low fulfillment threshold; or iii) select the order with the highest expected revenue 480 if all orders are above pace.

Returning to FIG. 25, if the selected advertisement order 20 is associated with a DVN buyer 34x, 34y, 34z in the advertisement orders table 652 (FIG. 7) that is associated with multiple network client orders, and/or is otherwise an advertisement order 20 that requires network client order balancing, step 356 represents the network client order balancing system 46 determining a selected network order.

Turning to FIG. 36 exemplary steps performed by the network order balancing system 46 may include, at step 740, identifying those open network orders 661 for the selected segmented ad placement 95. With brief reference to FIG. 12, the open network orders 661 may include those network orders 661 which: i) are associated with the DVN buyer 34 purchasing the advertisement order 20; ii) have a start time 665a that has already elapsed, iii) have an end time 665b that has not yet elapsed, and iv) are not yet fulfilled (i.e. actual fulfillment status 669 is less than the volume ordered 667).

Step 741 represents determining which open network orders 661 is farthest behind (or least ahead) on its target pace. Again, an order's target pace may be equal to the volume (e.g. the purchased quantity of impressions or clicks) divided by the time period over which the volume is to be delivered. An order is ahead of the target pace if its actual aggregate fulfillment volume (either clicks or impressions) is greater than a target volume. The target volume is the target pace multiplied by the number of days that have already elapsed since the start date of the period during which the volume is to be delivered, subject to any predetermined pacing variations. Similarly, an order is behind the target pace if the actual aggregate fulfillment volume is less than the target volume.

Again, in a second embodiment, the network order balancing system 46 may determine which open network order is farthest behind a low fulfillment threshold (or least ahead of a high fulfillment threshold)—using the same models as discussed with respect to FIG. 34.

Turning briefly to FIG. 35 in conjunction with FIG. 36, the expected revenue module 45 may be used for determining the selected network order. More specifically, step 742 may represent populating certain parameters into an expected revenue module 45. Those parameters may include: i) a value representing pace 472; ii) a value representing fulfillment deviation from low threshold 474; iii) a revenue per impression 476 (if the revenue is based on delivery of an impression); and iv) a revenue per event 478 (if the revenue is based on some other event other than delivery of the impression).

The expected revenue module 45 may further calculate, for each network order 661 for the segmented ad placement, an expected revenue value 480 which: i) if the order is based on delivery of an impression, comprises the revenue per impression 476; and ii) if the order is based on some other event, the revenue per event 478 multiplied by the fraction of impressions estimated to yield the event.

After calculating expected revenue 480 the network order balancing system 46, at step 743, determines which of the open network orders 661 meets network order selection criteria to be the selected network order 661. The network order selection criteria may specify: i) selection of the network order 661 farthest behind its low fulfillment threshold if any network orders 661 are behind low fulfillment threshold; ii) select the order with the highest expected revenue 480 if all network orders 661 are above low fulfillment threshold; or iii) select the network order 661 with the highest expected revenue 480 if all network orders 661 are above pace.

Returning to FIG. 25, if the selected advertisement order 20 at step 355 is an order associated with an advertising buyer 34a, 34b, 34c in the advertisement orders table 652 (FIG. 7) and/or there is a content identifier 654 associated with the selected advertisement order 20, no network order balancing is required and advertisement content associate with the content identifier 564 may be the selected content served to the end user.

Step 359 represents the serving system 57 assigning a unique click response URL to the advertisement impression. The unique click response URL includes a domain name associated with the order fulfillment system 40 and a unique extension associated with the particular advertisement impression or the selected advertisement order from which the advertisement content is selected such that if the end user clicks on the advertisement impression, such end user's browser is redirected to the click response URL. The serving system 57 may: i) further redirect the end user's browser to the advertiser's landing page associated with the content; and ii) record the impression and response in fulfillment of the advertisement order and, if applicable, the network order; and iii) if applicable, upon the occurrence of the applicable saleable event, debit an account associated with the buyer (whether an advertisement buyer or a DVN buyer) and, if applicable, debit an account associated with the DVN client.

Step 360 represents associating a unique identification of the advertisement impression (or the selected advertisement order with which the selected advertisement content is included) with the click response URL. This association may be recorded in an impression database such that when an end user clicks on the advertisement impression and is linked to the click response URL, such end user action may be associated with the open order associated with the advertisement content and the order fulfillment system can redirect the end user's browser to the advertiser's web page.

Figure 28:
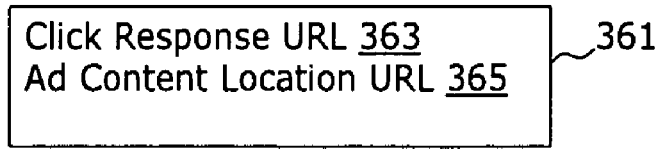
FIG. 28 is a diagram depicting exemplary elements of an advertisement redirect provided by an order fulfillment system in accordance with an embodiment of the present invention.

Turning to FIG. 28 in conjunction with FIG. 25, step 362 represents returning, to the end user's browser 349, a redirect 361 which includes the click response URL to associate with the advertisement impression and an ad content location URL 365 for purposes of instructing the end user browser 349 to connect to an ad content location URL 365 (e.g. an ad server 351) to obtain the ad content for rendering. Such ad content location URL 365 may be associated with the order fulfillment system 40, the publisher (for example if a fail over advertisement), the buyer (if the buyer is serving its own advertisement content), or an independent advertisement content server.

Step 364 represents the end user's browser 349 connecting to the ad content server 351 for purposes of obtaining the selected advertisement content. This step may further include passing the click response URL to such ad content server 351 such that it may be associated with the advertisement content to be returned for rendering. This step may further include recording the impression by updating data related to fulfillment of the discrete traffic block.

Step 366 represents the advertisement content server 351 returning the advertisement content (with the click response URL) to the end user's browser for rendering in the advertisement placement.

Step 368 represents the end user browser 349 establishing a connection to the click response URL at the order fulfillment system 40 in response to the user clicking on the advertisement content.

Step 370 represents the order fulfillment system 40 looking up the URL of the advertiser's web site and step 372 represents recording the "click". Advertisement order 20, fulfillment of the network order 661, and updating historical records associated with the effectively of the segmented ad placement 95 (FIG. 6c) and the advertisement content.

Step 374 represents providing a redirect to the end user's browser identifying the advertiser's landing page such that the end user's browser may connect to the advertiser's website.

It should be appreciated that although the steps of FIG. 25 represent the end user browser 349 obtaining advertisement content directly from the ad content server 351, those skilled in the art will recognize that the order fulfillment system 40 may obtain selected advertisement content from an ad content server 351 and, in response to the ad request 354, return the selected advertisement content (with the click response URL) to the end user browser at step 362. Such embodiment would eliminate the need for steps 364 and 366, but create additional processing and connectivity burdens on the order fulfillment system 40.

Reporting Tools

Returning to FIG. 13, as discussed, the management system 10 may further include reporting tools 41 which provide workflows for executing buyer and/or publisher defined queries against the data relationships discussed herein for purposes of accessing and evaluating historical data.

Exemplary reporting may include access to historical transaction data by advertisement placement, individual listing and/or by publisher in general with respect to (i) past winning bid prices (both for such individual buyer and all other buyers), (ii) fulfillment of open orders following the closing of an auction for a listing with a winning bid (both for such individual buyer and all other buyers), (iii) average CPM, CPC, CPL, CPA or other transactional unit winning bid prices per listing (both for such individual buyer and all other buyers), (iv) historical conversion data, including, among others, click-through rate (i.e., total click-throughs received per thousand impressions), acquisition rate (i.e., total sales or completion of other actions per thousand impressions), average value of a conversion (e.g., average dollar amount of a sale in a CPA transaction) (both for such individual buyer and all other buyers), and (v) relative comparisons of (i) through (iv) above among other publishers of similar listings (based on listing attributes provided by publishers at the time of creation of a listing). Further, an embodiment of the present invention will allow the additional sorting and narrowing of the historical transaction data available above by reference to either such individual buyer's campaign(s), or all buyers' campaigns that (i) are associated with a particular offering (e.g., performance of cell phone offers), (ii) have particular attributes associated with such buyer campaigns (e.g., performance of a publisher with respect to women aged 18 to 34 years old), and/or (iii) are compared to an individual campaign created by a buyer.

Other historical transaction data with respect to buyers relating to (i) past winning bid prices, (ii) average CPM, CPC, CPL, CPA or other transactional unit winning bid prices per buyer creative ad unit or campaign, (iii) historical conversion data, including, among others, click-through rate, acquisition rate, average value of a conversion (both for individual buyers and all buyers in the aggregate), and (iv) relative comparisons of (i) through (iii) above among other buyers of similar listings (based on product or service offerings or the creative ad unit provided by buyers at the time of creation of a campaign). Further, an embodiment of the present invention will advantageously allow the additional sorting and narrowing of the historical transaction data available above by reference to either such individual buyer's campaign(s), or all buyers' campaigns, (i) associated with a particular offering (e.g., performance of cell phone offers), (ii) having particular attributes associated with such buyer campaigns (e.g., performance of a publisher with respect to women aged 18 to 34 years old), and (iii) by comparison to an individual campaign created by a buyer.

Although the invention has been shown and described with respect to certain exemplary embodiments, it is obvious that equivalents and modifications will occur to others skilled in the art upon the reading and understanding of the specification. For example, the data relationships represented in various Figures are exemplary only. Those skilled in the art will appreciate that database design for implementation may utilize other data relationships to achieve the objectives of the present invention. The present invention includes all such equivalents and modifications, and is limited only by the scope of the following claims.

What is claimed is:

1. A computerized dynamic vertical network ("DVN") management system comprising data structures encoded onto a computer readable media and a processor for executing computer code encoded onto the computer readable media for brokering, between each publisher of a group of publishers and each advertiser of a group of advertisers, sale of at least a portion of the each publisher's inventory of advertisement impressions that the publisher can render within renderings of the publishers web pages to end users, the data structures and computer code comprising:

a publisher data store, wherein the publisher data store is adapted to store, for each publisher of the group of publishers, a group of segmented ad placements, wherein each segmented ad placement comprises:
a placement ID, the placement ID identifying a web page and an advertisement placement region within the web page within which a selected advertisement impression is to be rendered;

an advertisement order data store, wherein the advertisement order data store is adapted to store, for each segmented ad placement, a group of advertisement orders, wherein each advertisement order comprises:
  a buyer ID, wherein the buyer ID identifies a buyer of the advertisement order, the buyer being one of: i) an advertiser; and ii) a DVN buyer;
  a volume parameter, wherein the volume parameter defines a volume of saleable events required for fulfillment of the advertisement order;
  at least one duration parameter, wherein the at least one duration parameter defines an active time period during which the volume of saleable events are scheduled to occur; and
  if the buyer ID is an advertiser, an advertisement content identifier, wherein the advertisement content identifier identifies the advertiser's content to be rendered to end users for generation of the saleable events in fulfillment of the advertisement order;
  a fulfillment value, wherein the fulfillment value identifies the quantity of saleable events resulting from the impressions rendered to end users;
  a fee identifier, wherein the fee identifier defines a fee chargeable to the buyer for fulfillment of the advertisement order;

a DVN client data store, wherein the DVN client data store is adapted to associate, with each DVN buyer of a group of DVN buyers, a group of network orders for fulfillment through the DVN buyer, wherein each network order comprises:
  a network order volume parameter, wherein the network order volume parameter defines a volume of saleable events required for fulfillment of the network order;
  at least one network order duration parameter, wherein the network order duration parameter defines an active time period during which the volume of saleable events are scheduled to occur;
  a network order advertisement content identifier, wherein the network order advertisement content identifier identifies network client content to be rendered to end users for generation of the saleable events in fulfillment of the network order;

an advertisement request, wherein the advertisement request is received from an end user system on which the web page will be rendered to the end user and wherein the advertisement request comprises an advertisement placement identifier;

order fulfillment code comprising:
  segment determination code, wherein the segment determination code identifies a selected segmented ad placement, wherein the selected segmented ad placement is the segmented ad placement of the group of segmented ad placements with its placement ID matching the advertisement placement identifier of the advertisement request;
  order balancing code, wherein the order balancing code determines a selected advertisement order, wherein the selected advertisement order is the advertisement order of the group of advertisement orders that is associated with the selected segmented ad placement which meets fulfillment criteria;
  network balancing code, wherein the network balancing code, if the buyer ID of the selected advertisement order indicates that the buyer is the DVN buyer, determines a selected network order, wherein the selected network order is the network order of the group of network orders that is associated with the DVN buyer and which meets network order selection criteria;
  serving code, wherein the service code provides a reply to the advertisement request, wherein the reply identifies selected advertisement content, wherein the selected advertisement content is: i) if the buyer ID of the selected advertisement order indicates that the buyer is the advertiser, the advertiser's content; and ii) if the buyer ID of the selected advertisement order indicates that the buyer is the DVN buyer, the network client content.

2. The dynamic vertical network management system of claim 1, wherein:
each segmented ad placement further comprises at least one distinguishing traffic attribute:
  wherein the distinguishing traffic attribute comprises identification of at least one of an end user attribute, a contextual attribute, and a temporal attribute;
  wherein the end user attribute comprises identification of one of a geographic, a demographic, and a behavioral attribute of end users associated with the segmented ad placement;
  wherein the contextual attribute identifies subject matter of the web page;
at least two segmented ad placements comprise the same placement ID and comprise mutually exclusive distinguishing traffic attributes;
the segment determination code further:
  determines attribute data related to the advertisement request,
    wherein the attribute data related to the advertisement request comprises identification of at least one of a request end user attribute, a request contextual attribute, and a request temporal attribute;
    wherein the request end user attribute comprises identification of one of a geographic, a demographic, and a behavioral attribute of the end users of the system generating the advertisement request
  compares the attribute data related to the advertisement request to the distinguishing traffic attributes of each segment to identify the selected segmented ad placement; and
  the selected segmented ad placement is the segmented ad placement of the group of segmented ad placements with both i) its placement ID matching the advertisement placement identifier of the advertisement request; and ii) its distinguishing attributes corresponding to the attribute data related to the advertisement request.

3. The system of claim 2, wherein:
each segmented ad placement is associated with at least one notification identifier, wherein the notification identifier defines a means for providing a notification to the publisher of the web page;
the system further comprises ad placement search code, wherein the ad placement search code
  obtains search criteria, wherein the search criteria is one of end user search criteria, contextual search criteria, and temporal search criteria;
  executes, for each of a plurality of candidate segmented ad placements, a comparison function comparing the distinguishing attributes of the candidate segmented ad placement to the search criteria to determine a degree of match;

determines whether the candidate segmented ad placement is the a target segmented ad placement only if the degree of match is within a predetermined threshold;

generates a results display, wherein the results display comprises, for each target segmented ad placement:
identification of one of: i) the target segmented ad placement; and ii) the publisher of the web page of the target segmented ad placement;
a control adapted to post user selection of a selected target segmented ad placement to the ad placement search system;

generates a request notice to the notification identifier associated with the publisher offering the selected target segmented ad placement; and upon receipt of an indication that a discrete traffic block of the target segmented ad placement has been committed to the DVN buyer, writing an additional advertisement order for the selected target segmented ad placement in the advertisement order data store, the additional advertisement order comprising:
an additional buyer ID, wherein the additional buyer ID identifies the DVN buyer;
an additional volume parameter, wherein the additional volume parameter defines a volume of saleable events required for fulfillment of the additional advertisement order;
at least one additional duration parameter, wherein the additional duration parameter defines an active time period during which the volume of saleable events required for fulfillment of the additional advertisement order are scheduled to occur; and
an additional fee identifier, the additional fee identifier defining a fee chargeable to the advertiser for fulfillment of the additional advertisement order.

4. The system of claim 3, wherein:
the system further comprises a DVN data store, wherein the DVN data store associates, for each DVN buyer of a group of DVN buyers, DVN target traffic attributes;
wherein the DVN target traffic attributes comprise identification of at least one of a target end user attribute, a target contextual attribute, and a target temporal attribute;
wherein the target end user attribute comprises identification of one of a geographic, a demographic, and a behavioral attribute of end users to which the DVN desires to render advertisement impressions;
wherein the contextual attribute identifies target subject matter of web pages win which the DVN desires to render advertisement impressions;
the ad placement search code obtains the search criteria by looking up the DVN target traffic attributes in from the DVN data store; and
the search criteria comprises at least a portion of the DVN target traffic attributes.

5. The system of claim 3, wherein:
the system further comprises a DVN data store, wherein the DVN data store associates, for each DVN buyer of a group of DVN buyers, at least two search criteria sets, a first search criteria set comprising first DVN target traffic attributes and a second search criteria set comprising second DVN target traffic attributes;
wherein the first DVN target traffic attributes comprise identification of at least one of a first target end user attribute, a first target contextual attribute, and a first target temporal attribute;
wherein the first target end user attribute comprises identification of one of a geographic, a demographic, and a behavioral attribute of end users to which the DVN desires to associate with the first search criteria set;
wherein the first contextual attribute identifies target subject matter of web pages with which the DVN desires to associate with the first search criteria set;
wherein the first temporal attribute defines a time period within a time cycle, wherein the time cycle is of a duration greater than the time period, during which the DVN desires to render advertisement impressions associated with the first search criteria;
wherein the second target end user attribute comprises identification of one of a geographic, a demographic, and a behavioral attribute of end users to which the DVN desires to associate with the second search criteria set;
wherein the second contextual attribute identifies target subject matter of web pages with which the DVN desires to associate with the second search criteria set;
wherein the second temporal attribute define a time period within a time cycle, wherein the time cycle is of a duration greater than the time period, during which the DVN desires to render advertisement impressions associated with the second search criteria;
the ad placement search code obtains the search criteria by:
sending a web page to the DVN buyer, wherein the web page is adapted to obtain user identification of selected search criteria, the selected search criteria being one of the first search criteria and the second search criteria;
identifying a selected DVN target traffic attribute;
wherein the selected DVN target traffic attribute is the first DVN target traffic attribute if the selected search criteria is the first search criteria, and
wherein the selected DVN target traffic attribute is the second DVN target traffic attribute if the selected search criteria is the second search criteria, and
wherein the search criteria is the selected DVN target traffic attributes.

6. The system of claim 3, wherein:
the ad placement code obtains the search criteria by sending a web page to the DVN buyer, wherein the web page is adapted to obtain user entry of at least one key word tag and post the key word tags back to the ad placement code, and
the search criteria comprises the key word tags.

7. The system of claim 2, wherein:
each segmented ad placement is associated with at least one notification identifier, wherein the notification identifier defines a means for providing a notification to the publisher of the web page;
the system further comprises inventory control and ad placement search code, wherein the inventory control and ad placement search code:
calculates, for a candidate duration of time, the quantity of advertisement inventory expected to be required to fulfill each network order associated with the DVN buyer;
calculates, for the candidate duration of time, the quantity of advertisement inventory expected to be available through the advertisement orders associated with the DVN in the advertisement order data store;
if, for the candidate duration of time, the quantity of advertisement inventory expected to be available is less than the quantity of advertisement inventory expected to be required, initiates the following ad placement search steps:
   obtains search criteria, wherein the search criteria is one of end user search criteria, contextual search criteria, and temporal search criteria;
   executes, for each of a plurality of candidate segmented ad placements, a comparison function comparing the distinguishing attributes of the candidate segmented ad placement to the search criteria to determine a degree of match;
   determines whether the candidate segmented ad placement is the a target segmented ad placement only if the degree of match is within a predetermined threshold;
   generates a results display, wherein the results display comprises, for each target segmented ad placement:
      identification of one of: i) the target segmented ad placement; and ii) the publisher of the web page of the target segmented ad placement;
      a control adapted to post user selection of a selected target segmented ad placement to the ad placement search system;
   generates a request notice to the notification identifier associated with the publisher offering the selected target segmented ad placement; and
   upon receipt of an indication that a discrete traffic block of the target segmented ad placement has been committed to the DVN buyer, writing an additional advertisement order for the selected target segmented ad placement in the advertisement order data store, the additional advertisement order comprising:
      an additional buyer ID, wherein the additional buyer ID identifies the DVN buyer;
      an additional volume parameter, wherein the additional volume parameter defines a volume of saleable events required for fulfillment of the additional advertisement order;
      at least one additional duration parameter, wherein the additional duration parameter defines an active time period during which the volume of saleable events required for fulfillment of the additional advertisement order are scheduled to occur; and
      an additional fee identifier, the additional fee identifier defining a fee chargeable to the advertiser for fulfillment of the additional advertisement order.

8. The system of claim 7, wherein:
the system further comprises a DVN data store, wherein the DVN data store associates, for each DVN buyer of a group of DVN buyers, DVN target traffic attributes;
wherein the DVN target traffic attributes comprise identification of at least one of a target end user attribute, a target contextual attribute, and a target temporal attribute;
wherein the target end user attribute comprises identification of one of a geographic, a demographic, and a behavioral attribute of end users to which the DVN desires to render advertisement impressions;
wherein the contextual attribute identifies target subject matter of web pages win which the DVN desires to render advertisement impressions;
the ad placement search code obtains the search criteria by looking up the DVN target traffic attributes in from the DVN data store; and
the search criteria comprises at least a portion of the DVN target traffic attributes.

9. The system of claim 7, wherein:
the system further comprises a DVN data store, wherein the DVN data store associates, for each DVN buyer of a group of DVN buyers, at least two search criteria sets, a first search criteria set comprising first DVN target traffic attributes and a second search criteria set comprising second DVN target traffic attributes;
wherein the first DVN target traffic attributes comprise identification of at least one of a first target end user attribute, a first target contextual attribute, and a first target temporal attribute;
wherein the first target end user attribute comprises identification of one of a geographic, a demographic, and a behavioral attribute of end users to which the DVN desires to associate with the first search criteria set;
wherein the first contextual attribute identifies target subject matter of web pages with which the DVN desires to associate with the first search criteria set;
wherein the first temporal attribute defines a time period within a time cycle, wherein the time cycle is of a duration greater than the time period, during which the DVN desires to render advertisement impressions associated with the first search criteria;
wherein the second target end user attribute comprises identification of one of a geographic, a demographic, and a behavioral attribute of end users to which the DVN desires to associate with the second search criteria set;
wherein the second contextual attribute identifies target subject matter of web pages with which the DVN desires to associate with the second search criteria set;
wherein the second temporal attribute defines a time period within a time cycle, wherein the time cycle is of a duration greater than the time period, during which the DVN desires to render advertisement impressions associated with the second search criteria;
the ad placement search code obtains the search criteria by:
   determining identification of selected search criteria, the selected search criteria being one of the first search criteria and the second search criteria;
   identifying a selected DVN target traffic attribute;
      wherein the selected DVN target traffic attribute is the first DVN target traffic attribute if the selected search criteria is the first search criteria, and
      wherein the selected DVN target traffic attribute is the second DVN target traffic attribute if the selected search criteria is the second search criteria, and
      wherein the search criteria is the selected DVN target traffic attributes.

10. The system of claim 7, wherein:
the ad placement code obtains the search criteria by sending a web page to the DVN buyer, wherein the web page is adapted to obtain user entry of at least one key word tag and post the key word tags back to the ad placement system, and
the search criteria comprises the key word tags.

11. A method for operating a computerized dynamic vertical network management system for brokering, between each publisher of a group of publishers and each advertiser of a group of advertisers, sale of at least a portion of the each publisher's inventory of advertisement impressions that the publisher can render within renderings of the publishers web pages to end users, the method comprising encoding, to a computer readable media for driving operation of the computerized dynamic vertical network management system computer code executable by a processor, the computer code being adapted to:

storing, in a publisher data structure, for each publisher of the group of publishers, a group of segmented ad placements, wherein each segmented ad placement comprises a placement ID identifying a web page and an advertisement placement region within the web page within which a selected advertisement impression is to be rendered;

storing, in an advertisement order data structure, for each segmented ad placement, a group of advertisement orders, each advertisement order comprising:
 a buyer ID identifying a buyer of the advertisement order, the buyer ID indicating one of: i) a one of the advertisers; and ii) a DVN;
 a volume parameter defining a volume of saleable events required for fulfillment of the advertisement order;
 at least one duration parameter defining an active time period during which the volume of saleable events are scheduled to occur; and
 if the buyer ID indicates one of the advertisers, an advertisement content identifier identifying the advertiser's content to be rendered to end users for generation of the saleable events in fulfillment of the advertisement order;
 a fulfillment value identifying the quantity of saleable events resulting from the impressions rendered to end users;
 a fee identifier defining a fee chargeable to the advertiser for fulfillment of the advertisement order;

storing, in a DVN client data structure and in association with each DVN of a group of DVNs, a group of network orders for fulfillment through the DVN, each network order comprising:
 a network order volume parameter defining a volume of saleable events required for fulfillment of the network order;
 at least one network order duration parameter defining an active time period during which the volume of saleable events are scheduled to occur;
 a network order advertisement content identifier identifying advertisement content to be rendered to end users for generation of the saleable events in fulfillment of the network order;

receiving an advertisement request from an end user system on which the web page will be rendered to the end user, the request comprising an advertisement placement identifier;

identifying a selected segmented ad placement, the selected segmented ad placement being the segmented ad placement of the group of segmented ad placements with its placement ID matching the advertisement placement identifier of the advertisement request;

order balancing to determine a selected advertisement order, the selected advertisement order being the advertisement order associated with the selected segmented ad placement which meets fulfillment criteria;

if the buyer ID of the selected advertisement order indicates that the buyer is a DVN buyer, network order balancing to determine a selected network order, the selected network order being the network order associated with the DVN which meets network order selection criteria; and providing, in response to the advertisement request, the reply identifying selected advertisement content, the selected advertisement content being: i) if the selected advertisement order comprises a buyer ID identifying the buyer of the advertisement order, content associated with the advertisement content identifier of the advertisement order; and ii) if the selected advertisement order comprises a buyer ID identifying a DVN, content associated with an advertisement content identifier of the selected network order.

12. The method of claim 1, wherein:
each segmented ad placement further comprises at least one distinguishing traffic attribute:
 wherein the distinguishing traffic attribute comprises identification of at least one of an end user attribute, a contextual attribute, and a temporal attribute;
 wherein the end user attribute comprises identification of one of a geographic, a demographic, and a behavioral attribute of end users associated with the segmented ad placement;
 wherein the contextual attribute identifies subject matter of the web page;
at least two segmented ad placements comprise the same placement ID and comprise mutually exclusive distinguishing traffic attributes; and
the method further comprises encoding to the computer readable media computer code adapted for:
 determining attribute data related to the advertisement request,
  wherein the attribute data related to the advertisement request comprises identification of at least one of a request end user attribute, a request contextual attribute, and a request temporal attribute;
  wherein the request end user attribute comprises identification of one of a geographic, a demographic, and a behavioral attribute of the end users of the system generating the advertisement request
 comparing the attribute data related to the advertisement request to the distinguishing traffic attributes of each segment to identify the selected segmented ad placement; and
 the selected segmented ad placement is the segmented ad placement of the group of segmented ad placements with both i) its placement ID matching the advertisement placement identifier of the advertisement request; and ii) its distinguishing attributes corresponding to the attribute data related to the advertisement request.

13. The method of claim 12, wherein the method further comprises encoding to the computer readable media computer code adapted for:
associating each ad placement with at least one notification identifier, wherein the notification identifier defines a means for providing a notification to the publisher of the web page;
obtaining search criteria, wherein the search criteria is one of end user search criteria, contextual search criteria, and temporal search criteria;
executing, for each of a plurality of candidate segmented ad placements, a comparison function comparing the distinguishing attributes of the candidate segmented ad placement to the search criteria to determine a degree of match;
determining whether the candidate segmented ad placement is the a target segmented ad placement only if the degree of match is within a predetermined threshold;

generating a results display, wherein the results display comprises, for each target segmented ad placement:
identification of one of: i) the target segmented ad placement; and ii) the publisher of the web page of the target segmented ad placement;
a control adapted to post user selection of a selected target segmented ad placement to the ad placement search system;
generating a request notice to the notification identifier associated with the publisher offering the selected target segmented ad placement; and
upon receipt of an indication that a discrete traffic block of the target segmented ad placement has been committed to the DNV buyer, writing an additional advertisement order for the selected target segmented ad placement in the advertisement order data structure, the additional advertisement order comprising:
an additional buyer ID, wherein the additional buyer ID identifies the DVN buyer;
an additional volume parameter, wherein the additional volume parameter defines a volume of saleable events required for fulfillment of the additional advertisement order;
at least one additional duration parameter, wherein the additional duration parameter defines an active time period during which the volume of saleable events required for fulfillment of the additional advertisement order are scheduled to occur; and
an additional fee identifier, the additional fee identifier defining a fee chargeable to the advertiser for fulfillment of the additional advertisement order.

14. The method of claim 13, wherein:
the method further comprises encoding to the computer readable media computer code adapted for:
associating, in a DVN data structure, for each DVN buyer of a group of DVN buyers, DVN target traffic attributes;
wherein the DVN target traffic attributes comprise identification of at least one of a target end user attribute, a target contextual attribute, and a target temporal attribute;
wherein the target end user attribute comprises identification of one of a geographic, a demographic, and a behavioral attribute of end users to which the DVN desires to render advertisement impressions;
wherein the contextual attribute identifies target subject matter of web pages win which the DVN desires to render advertisement impressions;
obtaining the search criteria comprises looking up the DVN target traffic attributes in from the DVN data structure; and
the search criteria comprises at least a portion of the DVN target traffic attributes.

15. The method of claim 13, wherein:
the method further comprises encoding to the computer readable media computer code adapted for:
associating, in a DVN data structure, for each DVN buyer of a group of DVN buyers, at least two search criteria sets, a first search criteria set comprising first DVN target traffic attributes and a second search criteria set comprising second DVN target traffic attributes;
wherein the first DVN target traffic attributes comprise identification of at least one of a first target end user attribute, a first target contextual attribute, and a first target temporal attribute;
wherein the first target end user attribute comprises identification of one of a geographic, a demographic, and a behavioral attribute of end users to which the DVN desires to associate with the first search criteria set;
wherein the first contextual attribute identifies target subject matter of web pages with which the DVN desires to associate with the first search criteria set;
wherein the first temporal attribute defines a time period within a time cycle, wherein the time cycle is of a duration greater than the time period, during which the DVN desires to render advertisement impressions associated with the first search criteria;
wherein the second target end user attribute comprises identification of one of a geographic, a demographic, and a behavioral attribute of end users to which the DVN desires to associate with the second search criteria set;
wherein the second contextual attribute identifies target subject matter of web pages with which the DVN desires to associate with the second search criteria set;
wherein the second temporal attribute defines a time period within a time cycle, wherein the time cycle is of a duration greater than the time period, during which the DVN desires to render advertisement impressions associated with the second search criteria;
obtaining the search criteria comprises:
sending a web page to the DVN buyer, wherein the web page is adapted to obtain user identification of selected search criteria, the selected search criteria being one of the first search criteria and the second search criteria;
identifying a selected DVN target traffic attribute;
wherein the selected DVN target traffic attribute is the first DVN target traffic attribute if the selected search criteria is the first search criteria, and
wherein the selected DVN target traffic attribute is the second DVN target traffic attribute if the selected search criteria is the second search criteria, and
wherein the search criteria is the selected DVN target traffic attributes.

16. The method of claim 13, wherein:
obtaining the search criteria comprises sending a web page to the DVN buyer, wherein the web page is adapted to obtain user entry of at least one key word tag and post the key word tags back to the ad placement system, and
the search criteria comprises the key word tags.

17. The system of claim 12, wherein the method further comprises encoding to the computer readable media computer code adapted for:
associating, with each segmented ad placement, least one notification identifier, wherein the notification identifier defines a means for providing a notification to the publisher of the web page;
determining a candidate duration of time;
calculating, for the candidate duration of time, the quantity of advertisement inventory expected to be required to fulfill each network order associated with the DVN buyer;
calculating, for the candidate duration of time, the quantity of advertisement inventory expected to be available through the advertisement orders associated with the DVN in the advertisement order data structure;
if, for the candidate duration of time, the quantity of advertisement inventory expected to be available is less than the quantity of advertisement inventory expected to be required, initiate the following ad placement search steps:

obtain search criteria, wherein the search criteria is one of end user search criteria, contextual search criteria, and temporal search criteria;

execute, for each of a plurality of candidate segmented ad placements, a comparison function comparing the distinguishing attributes of the candidate segmented ad placement to the search criteria to determine a degree of match;

determine whether the candidate segmented ad placement is the a target segmented ad placement only if the degree of match is within a predetermined threshold;

generate a results display, wherein the results display comprises, for each target segmented ad placement:
identification of one of: i) the target segmented ad placement; and ii) the publisher of the web page of the target segmented ad placement;
a control adapted to post user selection of a selected target segmented ad placement to the ad placement search system;

generate a request notice to the notification identifier associated with the publisher offering the selected target segmented ad placement; and upon receipt of an indication that a discrete traffic block of the target segmented ad placement has been committed to the DVN buyer, writing an additional advertisement order for the selected target segmented ad placement in the advertisement order data store, the additional advertisement order comprising:
an additional buyer ID, wherein the additional buyer ID identifies the DVN buyer;
an additional volume parameter, wherein the additional volume parameter defines a volume of saleable events required for fulfillment of the additional advertisement order;
at least one additional duration parameter, wherein the additional duration parameter defines an active time period during which the volume of saleable events required for fulfillment of the additional advertisement order are scheduled to occur; and
an additional fee identifier, the additional fee identifier defining a fee chargeable to the advertiser for fulfillment of the additional advertisement order.

18. The method of claim 17, wherein:
the method further comprises encoding to the computer readable media computer code adapted for:
associating, in a DVN data structure, for each DVN buyer of a group of DVN buyers, DVN target traffic attributes;
wherein the DVN target traffic attributes comprise identification of at least one of a target end user attribute, a target contextual attribute, and a target temporal attribute;
wherein the target end user attribute comprises identification of one of a geographic, a demographic, and a behavioral attribute of end users to which the DVN desires to render advertisement impressions;
wherein the contextual attribute identifies target subject matter of web pages win which the DVN desires to render advertisement impressions;
obtaining the search criteria comprises looking up the DVN target traffic attributes in from the DVN data store; and
the search criteria comprises at least a portion of the DVN target traffic attributes.

19. The method of claim 17, wherein:
the method further comprises encoding to the computer readable media computer code adapted for:
associating, in a DVN data structure, for each DVN buyer of a group of DVN buyers, at least two search criteria sets, a first search criteria set comprising first DVN target traffic attributes and a second search criteria set comprising second DVN target traffic attributes;
wherein the first DVN target traffic attributes comprise identification of at least one of a first target end user attribute, a first target contextual attribute, and a first target temporal attribute;
wherein the first target end user attribute comprises identification of one of a geographic, a demographic, and a behavioral attribute of end users to which the DVN desires to associate with the first search criteria set;
wherein the first contextual attribute identifies target subject matter of web pages with which the DVN desires to associate with the first search criteria set;
wherein the first temporal attribute defines a time period within a time cycle, wherein the time cycle is of a duration greater than the time period, during which the DVN desires to render advertisement impressions associated with the first search criteria;
wherein the second target end user attribute comprises identification of one of a geographic, a demographic, and a behavioral attribute of end users to which the DVN desires to associate with the second search criteria set;
wherein the second contextual attribute identifies target subject matter of web pages with which the DVN desires to associate with the second search criteria set;
wherein the second temporal attribute defines a time period within a time cycle, wherein the time cycle is of a duration greater than the time period, during which the DVN desires to render advertisement impressions associated with the second search criteria;
obtaining the search criteria comprises:
sending a web page to the DVN buyer, wherein the web page is adapted to obtain user identification of selected search criteria, the selected search criteria being one of the first search criteria and the second search criteria;
identifying a selected DVN target traffic attribute;
wherein the selected DVN target traffic attribute is the first DVN target traffic attribute if the selected search criteria is the first search criteria, and
wherein the selected DVN target traffic attribute is the second DVN target traffic attribute if the selected search criteria is the second search criteria, and
wherein the search criteria is the selected DVN target traffic attributes.

20. The method of claim 17, wherein:
obtaining the search criteria comprises sending a web page to the DVN buyer, wherein the web page is adapted to obtain user entry of at least one key word tag and post the key word tags back to the ad placement system, and
the search criteria comprises the key word tags.

* * * * *